(12) United States Patent
Gramza

(10) Patent No.: US 9,038,572 B2
(45) Date of Patent: May 26, 2015

(54) MICROCOSM TERRESTRIAL AND AQUATIC LANDSCAPE HABITAT: A FREESTANDING "MINIATURE MOUNTAIN" CHAIN, TOPIARY, UPPER POOL, WATERFALL AND POND-AQUARIUM HYBRID HABITAT WITH NATURAL CURVES

(75) Inventor: Nicholas Joseph Gramza, West Seneca, NY (US)

(73) Assignee: Nicholas J. Gramza, West Senera, NY (US)

( * ) Notice: Subject to any disclaimer, the term of this patent is extended or adjusted under 35 U.S.C. 154(b) by 517 days.

(21) Appl. No.: 13/317,707

(22) Filed: Oct. 26, 2011

(65) Prior Publication Data

US 2012/0103272 A1 May 3, 2012

Related U.S. Application Data

(63) Continuation-in-part of application No. 11/445,984, filed on Jun. 2, 2006, now abandoned.

(51) Int. Cl.
*A01K 63/00* (2006.01)

(52) U.S. Cl.
CPC ............. *A01K 63/003* (2013.01); *A01K 63/006* (2013.01)

(58) Field of Classification Search
USPC ........... 119/246, 253; D30/101–107; 248/146
See application file for complete search history.

(56) References Cited

U.S. PATENT DOCUMENTS

| | | | | | |
|---|---|---|---|---|---|
| 2,751,880 | A | * | 6/1956 | Markowski | 119/246 |
| 3,901,439 | A | * | 8/1975 | Willis | 239/12 |
| D250,865 | S | * | 1/1979 | Finch | D6/434 |
| 4,788,938 | A | * | 12/1988 | Davenport | 119/246 |
| 5,083,528 | A | * | 1/1992 | Strong | 119/257 |
| 5,501,178 | A | * | 3/1996 | Kemp | 119/74 |
| D383,570 | S | * | 9/1997 | Lin | D30/102 |
| 6,029,936 | A | * | 2/2000 | Senese | 248/146 |
| 6,149,991 | A | * | 11/2000 | Okuda | 428/13 |
| 6,405,937 | B1 | * | 6/2002 | Stukenberg | 239/12 |
| 6,450,122 | B1 | * | 9/2002 | Frank | 119/259 |
| 6,651,586 | B2 | * | 11/2003 | Horth et al. | 119/246 |
| 7,754,072 | B2 | * | 7/2010 | Kelly et al. | 210/167.23 |
| 2007/0107664 | A1 | * | 5/2007 | Wittstock et al. | 119/246 |

* cited by examiner

*Primary Examiner* — Rob Swiatek
*Assistant Examiner* — Ebony Evans

(57) ABSTRACT

The "Microcosm Terrestrial and Aquatic Landscape Habitat" is a Main Basin Pond 4 surrounded on three sides by artificial rock, "Miniature Mountains" 3 *a,* 3 *b,* 3 *c* or Natural Looking Imitation Rocks. The fourth, front side has no "Miniature Mountains" or Natural Looking Imitation Rocks to enclose the Main Basin Pond. Instead, here I adhere on a Pane of Glass 2 *a* to the imitation rock surface using Silicon Sealant 2 *b* or other sealants 2 *c*: A pond-aquarium hybrid! The "Miniature Mountains" are higher than the water level in the Main Basin Pond. On the top or sides of the "Miniature Mountains" is an Upper Pool 5. Water in the Main Basin Pond is circulated up to the Upper Pool using a Submersible; Electric, Aquatic, Pump 8. From the Upper Pool, the Water then flows down a Water Course to the Waterfalls and back to the Main Basin Pond to oxygenate the water.

1 Claim, 50 Drawing Sheets

MICROCOSM TERRESTRIAL AND AQUATIC LANDSCAPE HABITAT: A FREESTANDING "MINIATURE MOUNTAIN" CHAIN, TOPIARY, UPPER POOL, WATERFALL AND POND-AQUARIUM HYBRID HABITAT WITH NATURAL CURVES

This application is a Continuation-in-Part of application Ser. No. 11/445,984, filing date Jun. 2, 2006 now abandoned. It is an Amended Version of my patent application filed Jun. 2, 2006 (Amended through August 2006.) This Continuation-in-Part seeks to establish co pendency between the Parent Application and this Continuation in Part.

I now know that my device is not a topiary; rather, it is an unique garden habitat for Bonsai Trees 9a, 9b, 9c, 9d, 9 etc. and other terrestrial plants 9a, 9b, 9c, 9d 9 etc.

I may refer to the invention simply as the "Microcosm Terrestrial and Aquatic Landscape Habitat" for short or as the "MTALH" which is short for "Microcosm Terrestrial and Aquatic Landscape Habitat."

Note: Anywhere that I mention "Miniature Mountains" 3a, 3b, 3c, Natural Looking Imitation Rocks 3a, 3b, 3c may be understood to be substituted, because they fulfill the same purpose; hybrids of "Miniature Mountains" and Natural Looking Imitation Rocks may also be understood to be interchangeable with "Miniature Mountains" and Natural Looking Imitation Rocks; ANY IMITATION ROCK STRUCTURES may be referred to as "Miniature Mountains" 3a, 3b, 3c. The only differences are aesthetic; structurally, they are all the same. Knowing this substitution is very useful because it makes the specification flow more comprehensibly; it does not read well for me to write "Miniature Mountains" 3a, 3b, 3c, or/and Natural Looking Imitation Rocks 3a, 3b, 3c and/or hybrids thereof 3a, 3b, 3c' and/or any Imitation Rock Structures 3a, 3b, 3c every time I need to mention the variably shaped Elements 3a, 3b, 3c.

Note: Anywhere I describe an Element made out of clay, with Mold Rubber and Rubber Molds and with Press Molding that Element and the whole device of which it is a part may be made of polymer resins, fiber glass, plastics, polyester resins, cast stone, polyethylene resins and other waterproof materials.

This invention was made without any Federal, United States government sponsorship. This invention was made without any governments' sponsorship.

BACKGROUND OF THE INVENTION

1. Field of the Invention

The tropical fish industry has many plastic, polymer resin, fiber glass, polyethylene resins, polyurethane structures which go inside a fish tank aquarium. They are terrestrial/aquatic amphibious platforms that go inside of an aquarium. This invention of mine is NOT something you just put in an aquarium. It does not go into an aquarium. It is important to note that my "Miniature Mountains" and Natural Looking Imitation Rocks or other Imitation Rock Structures (Each being designated 3a, 3b, 3c) slope up, out and away from the Main Basin Pond 4 to form summits that may be as wide or wider, as long or longer and higher than the Main Basin Pond 4 which they surround; this is unique in the world of artificial rock waterfalls. My "Miniature Mountains" 3a, 3b, 3c or Natural Looking Imitation Rocks 3a, 3b, 3c provide the structural support for the rest of my device: the Upper Pool 5, Water Course 6, Waterfalls 7, the Main Basin Pond 4, the Water 15, the Pane of Glass 2a, the Frames 1a, 1b, 1c, the Pots 9a, 9b, 9 etc. for Bonsai Trees and other Terrestrial Plants, the optional Mechanical Box Filter 11, the Submersible, Electric, Aquatic, Fountain Pump 8. Other peoples' inventions rely upon a fish tank aquarium to support their devices. My "Miniature Mountains" 3a, 3b, 3c and Natural Looking Imitation Rocks 3a, 3b, 3c do not go inside a fish tank aquarium nor rely on a fish tank aquarium in any way. My "Miniature Mountains" 3a, 3b, 3c or Natural Looking Imitation Rocks 3a, 3b, 3c or hybrids thereof 3a, 3b, 3c (Imitation Rock Structures 3a, 3b, 3c) are free standing and support the whole device.

DETAILED DESCRIPTION OF THE INVENTION

Figure 3:
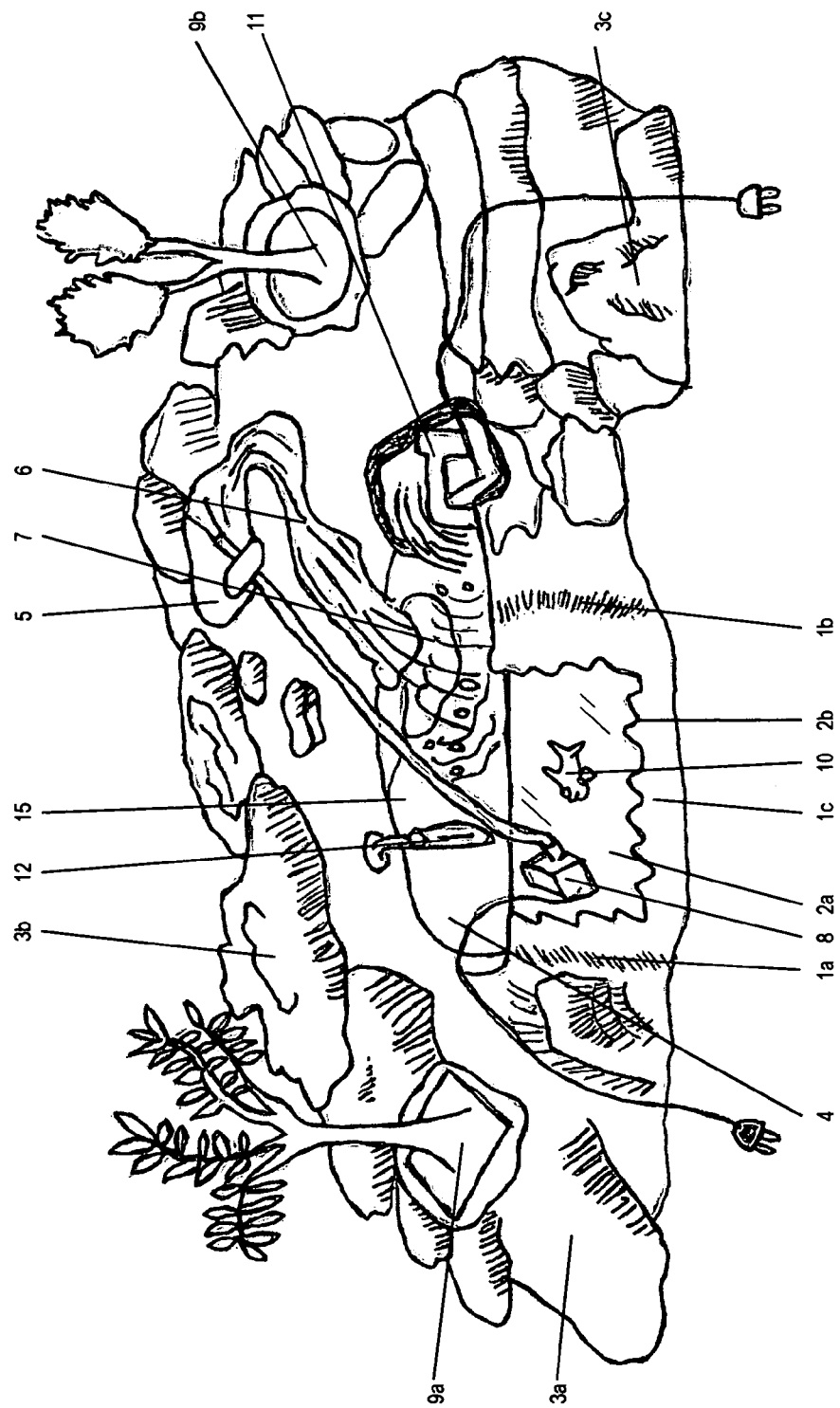
FIG. 3 shows the invention from the front; the upper pool is seen located on the rear Miniature Mountain.
Figure 4:
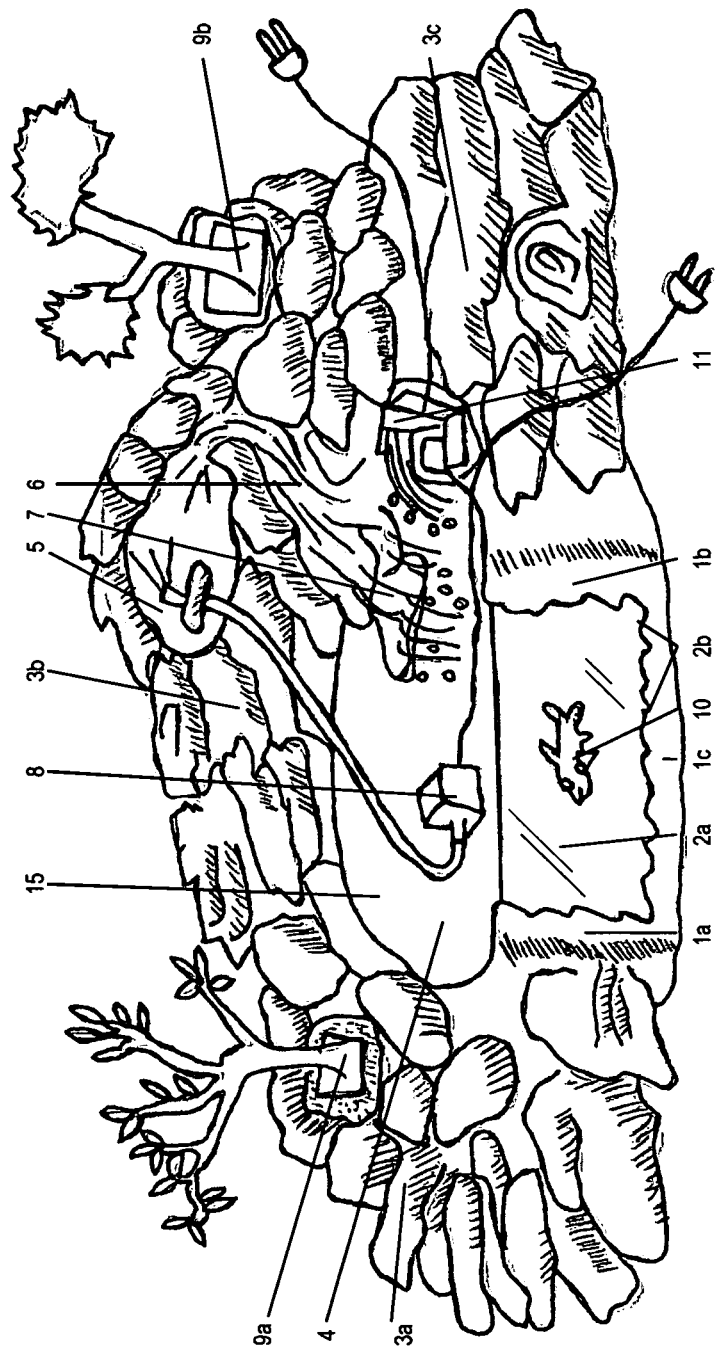
FIG. 4 shows the invention from the front; the upper pool is seen located on the rear Miniature Mountain.
Figure 5:
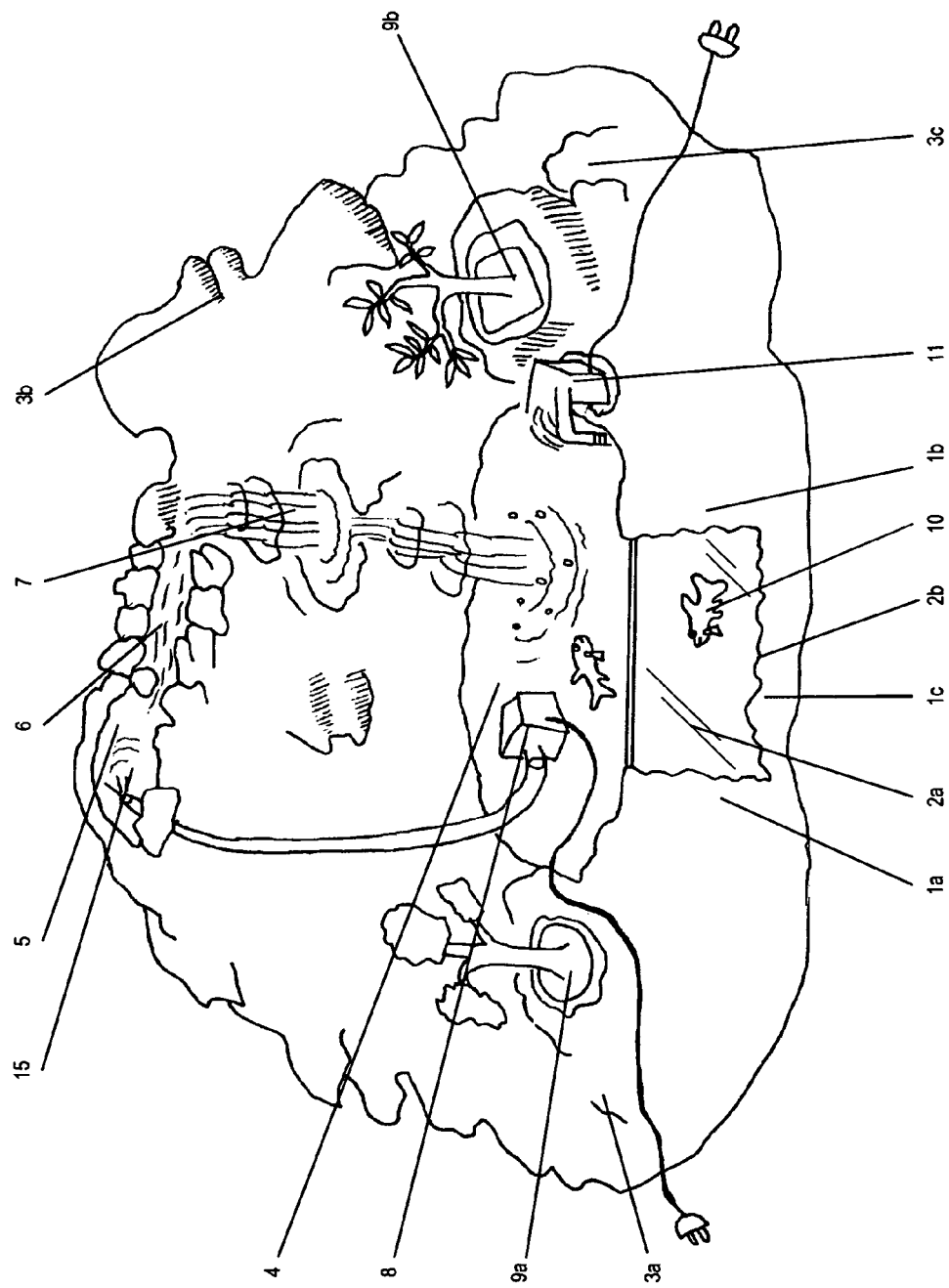
FIG. 5 shows the invention from the front; the upper pool is seen located on the rear Miniature Mountain.
Figure 6:
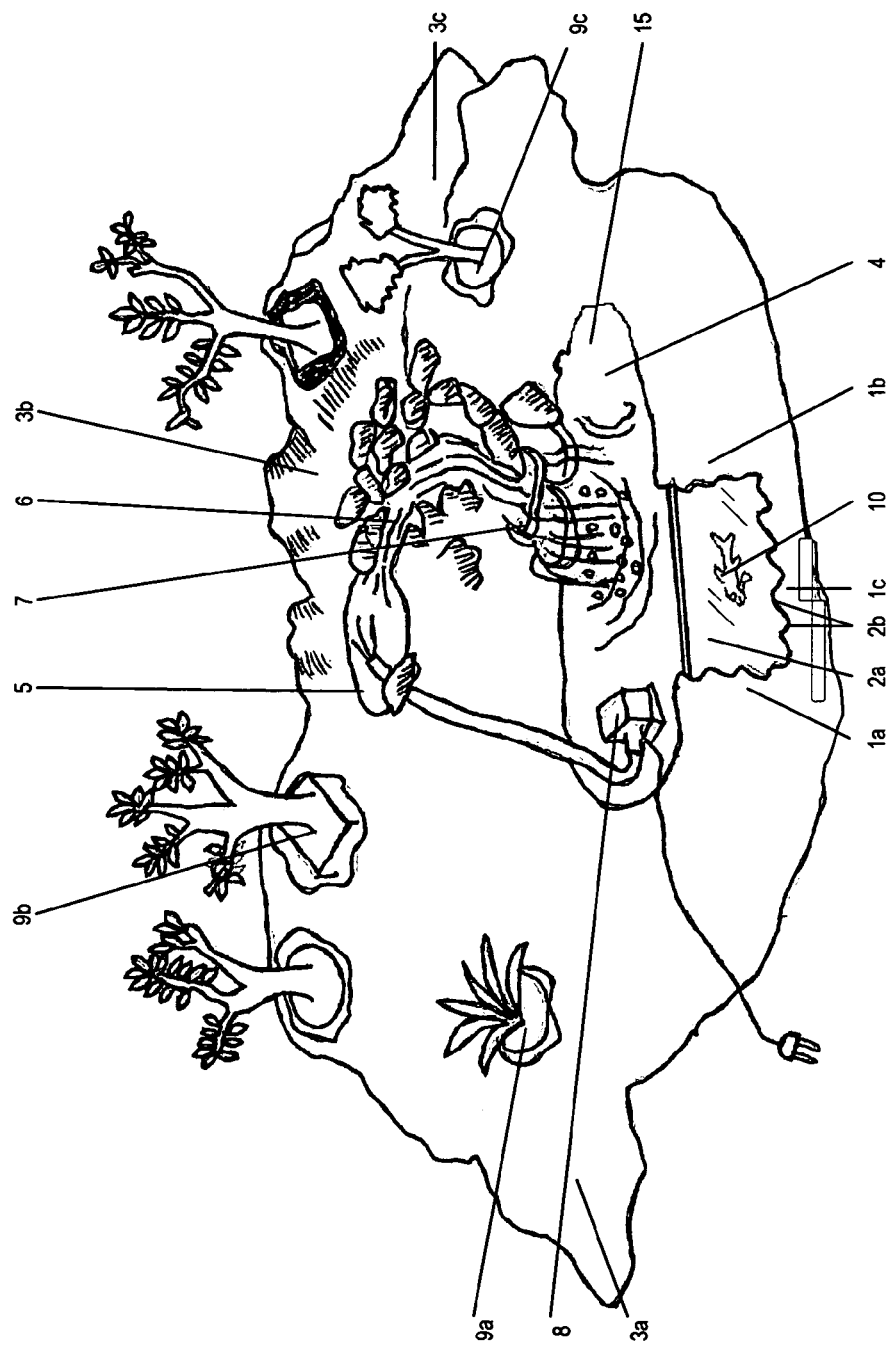
FIG. 6 shows the invention from the front; the upper pool is seen located on the rear Miniature Mountain.
Figure 7:
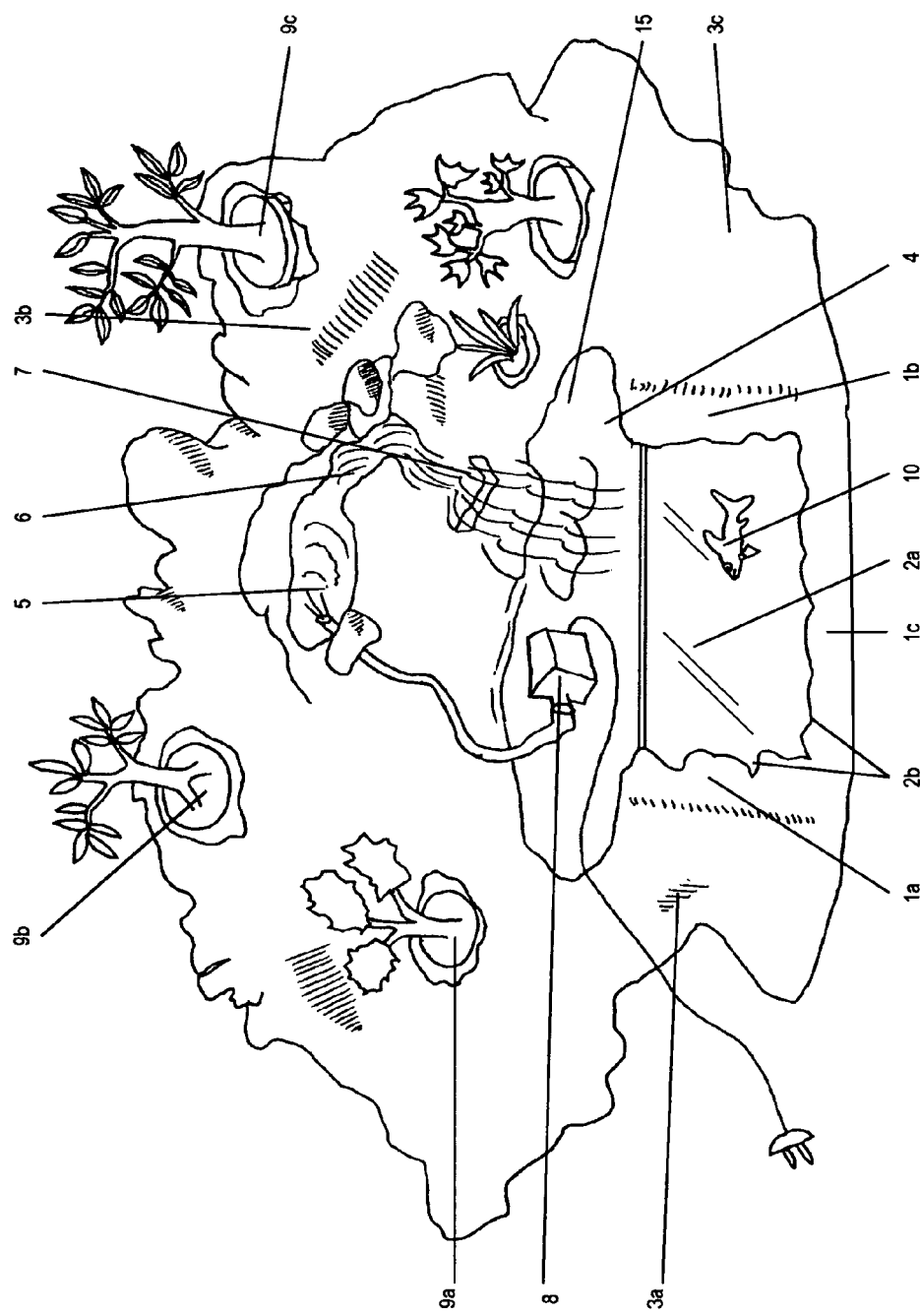
FIG. 7 shows the invention from the front; the upper pool is seen located on the rear Miniature Mountain.
Figure 8:
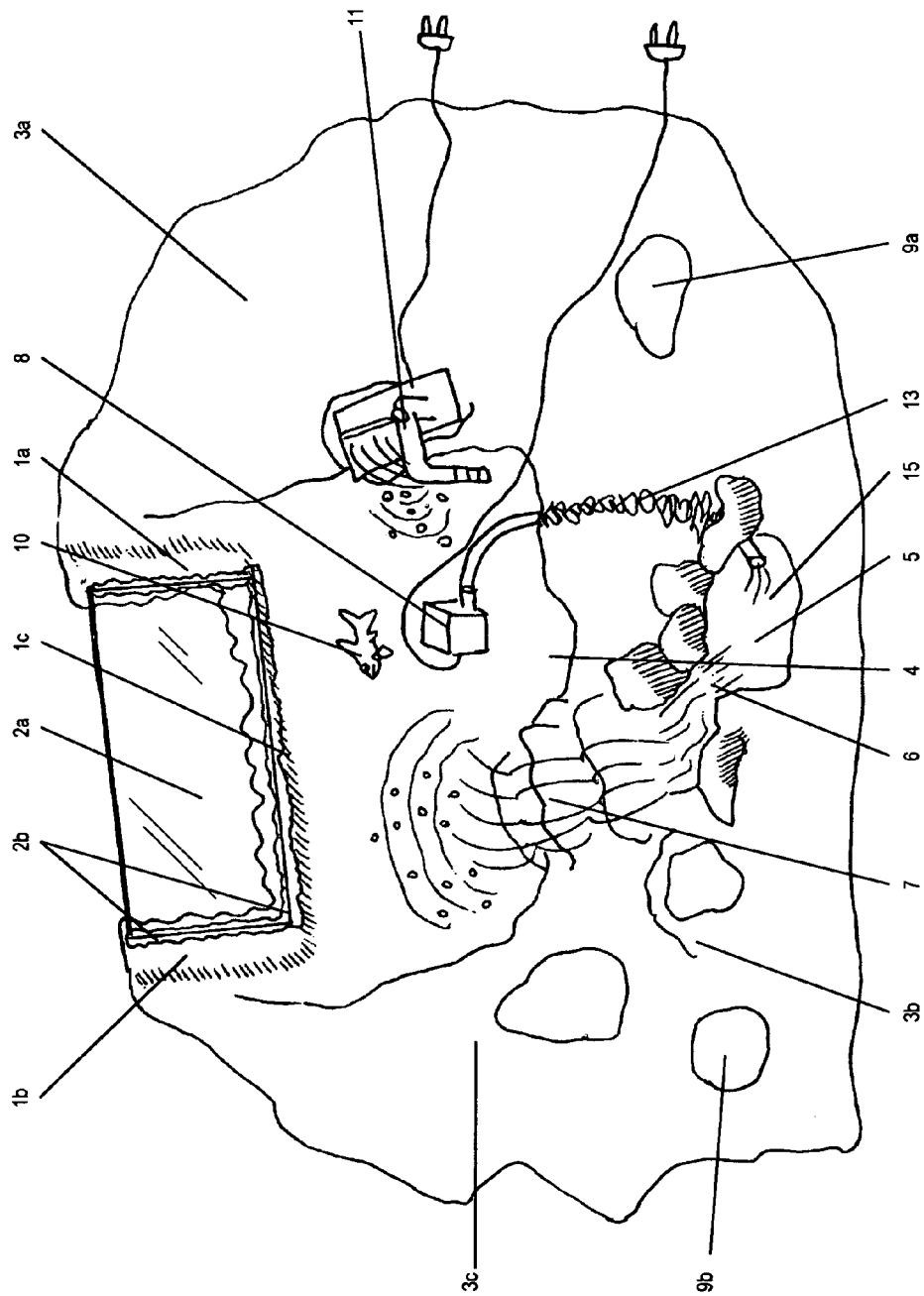
FIG. 8 shows the invention from the above rear; the upper pool is seen located on the rear Miniature Mountain.
Figure 9:
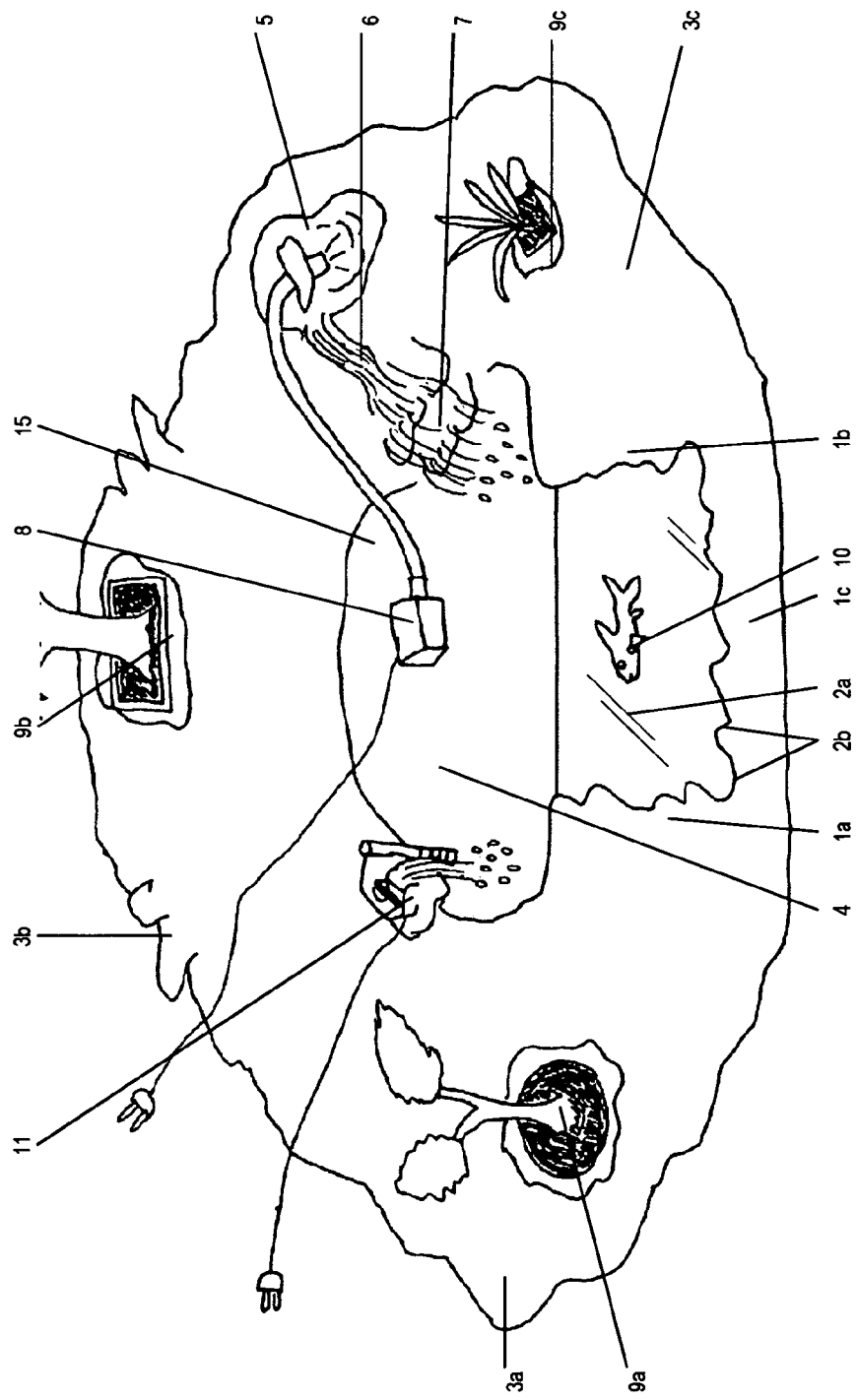
FIG. 9 shows the invention from the front; the upper pool is seen located on the right side Miniature Mountain.
Figure 10:
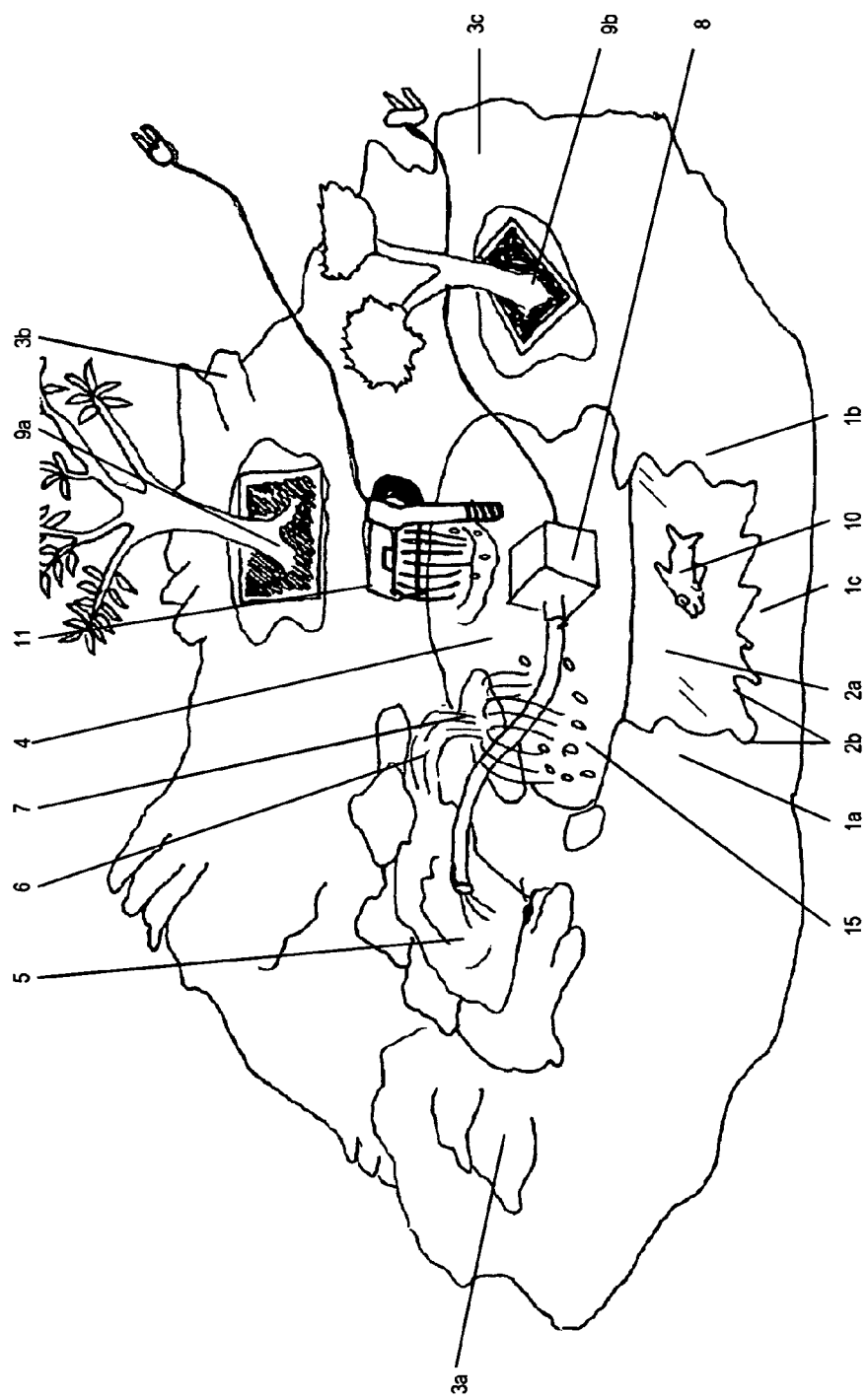
FIG. 10 shows the invention from the front; the upper pool is seen located on the left side Miniature Mountain.
Figure 11:
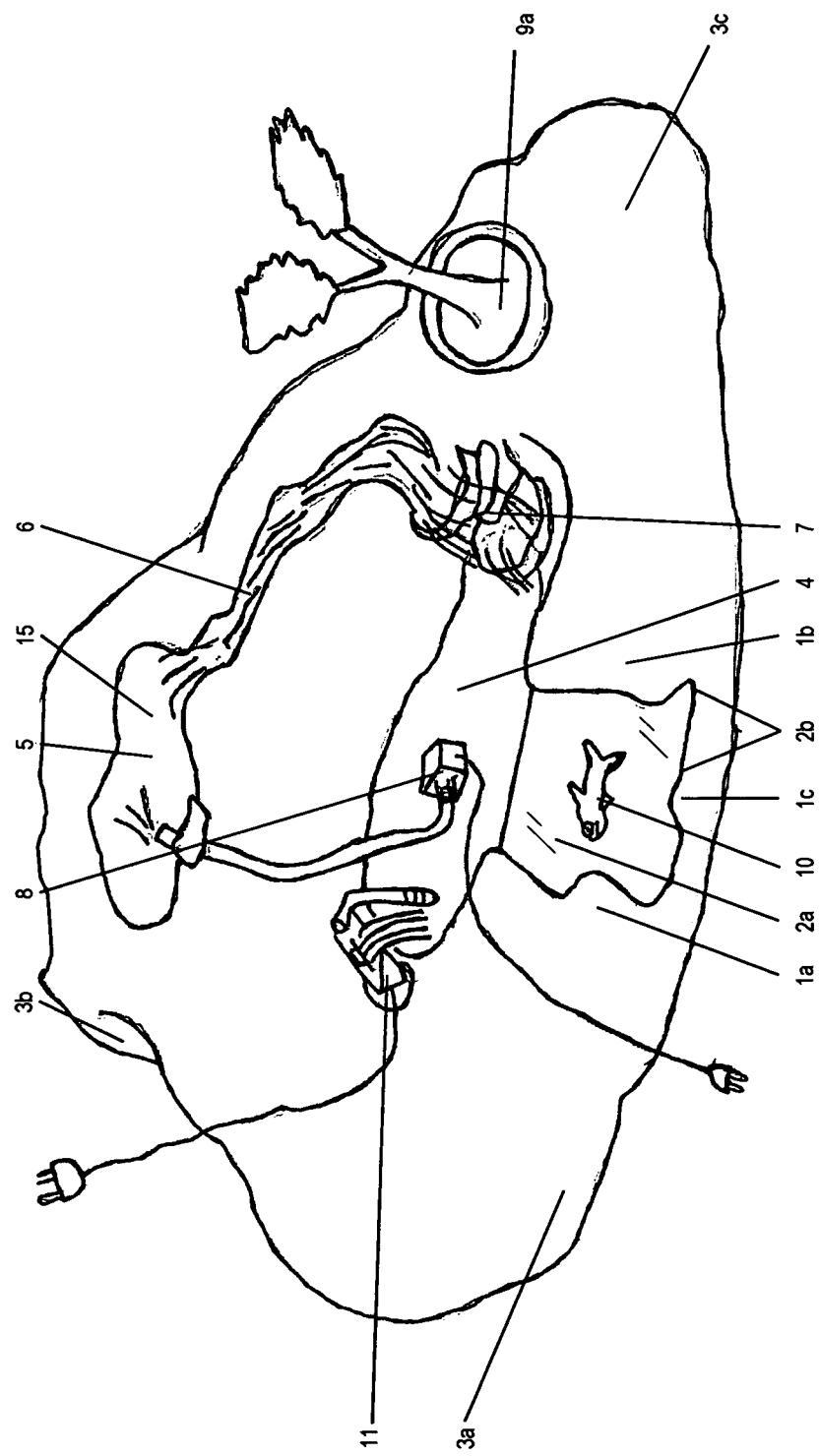
FIG. 11 shows the invention from the front; the upper pool is seen located on the rear Miniature Mountain.
Figure 12:
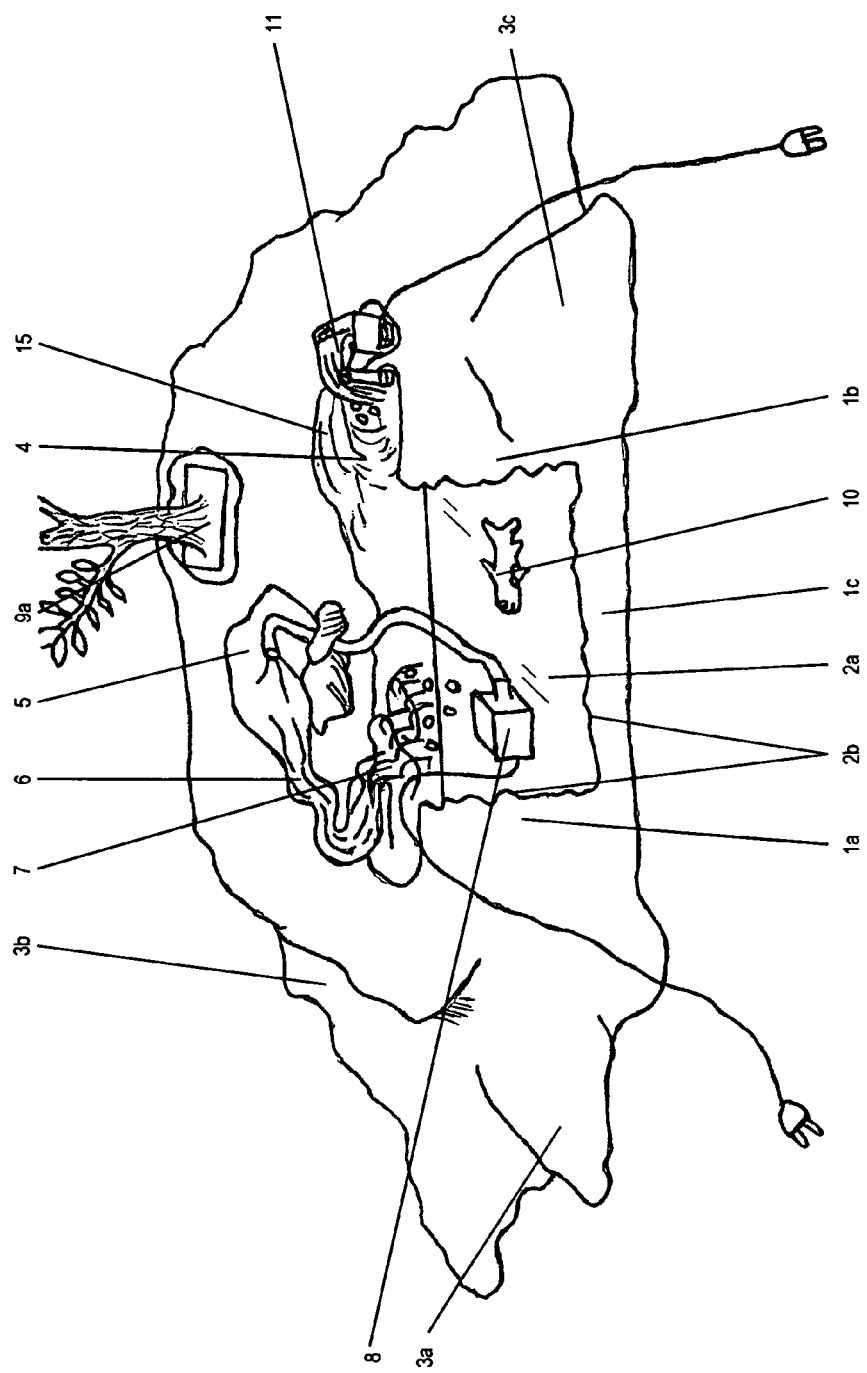
FIG. 12 shows the invention from the front; the upper pool is seen located on the rear Miniature Mountain.
Figure 13:
FIG. 13 shows the invention from the front; the upper pool is seen located on the rear Miniature Mountain.
Figure 14:
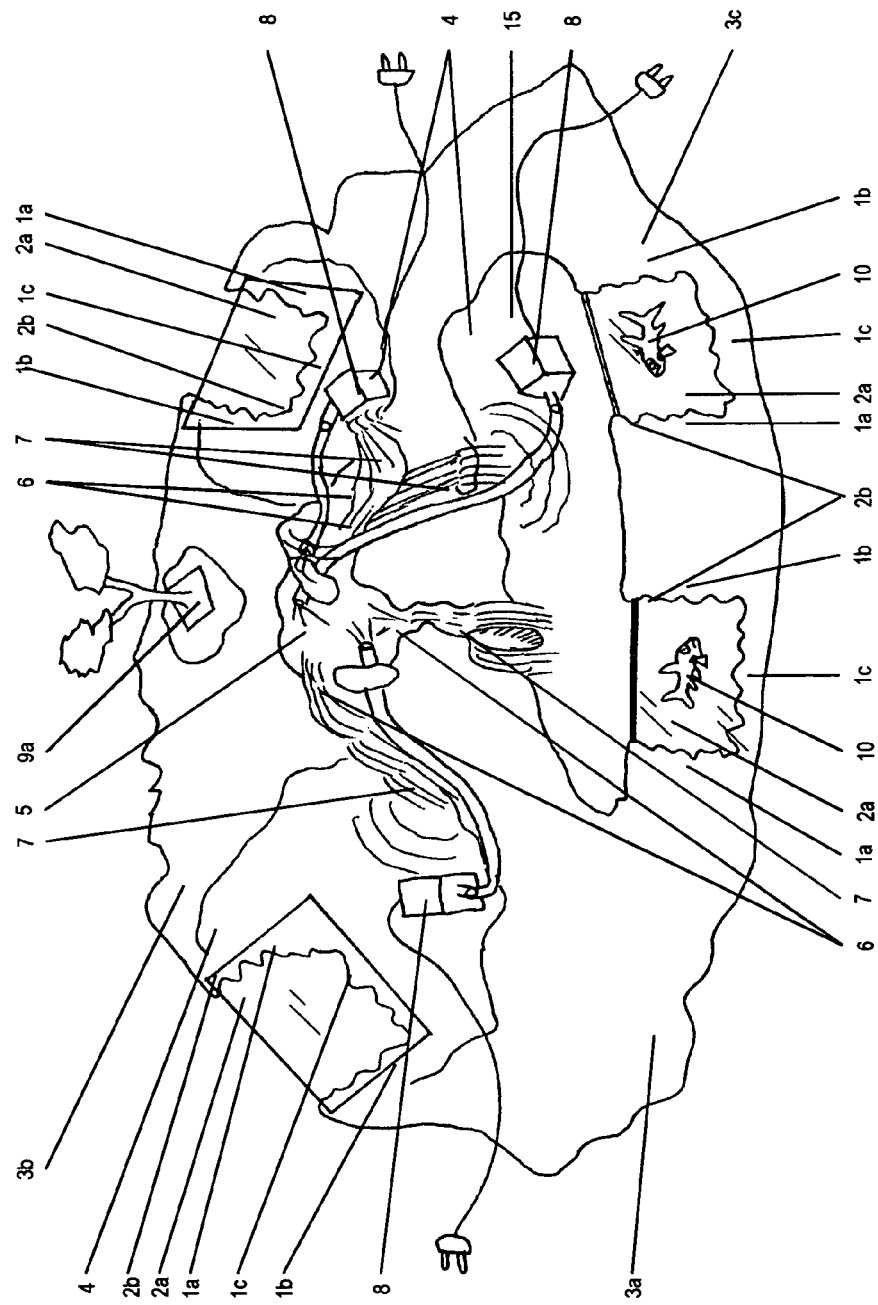
FIG. 14 shows the invention from the front; this version shows three Main Basin Ponds.
Figure 15:
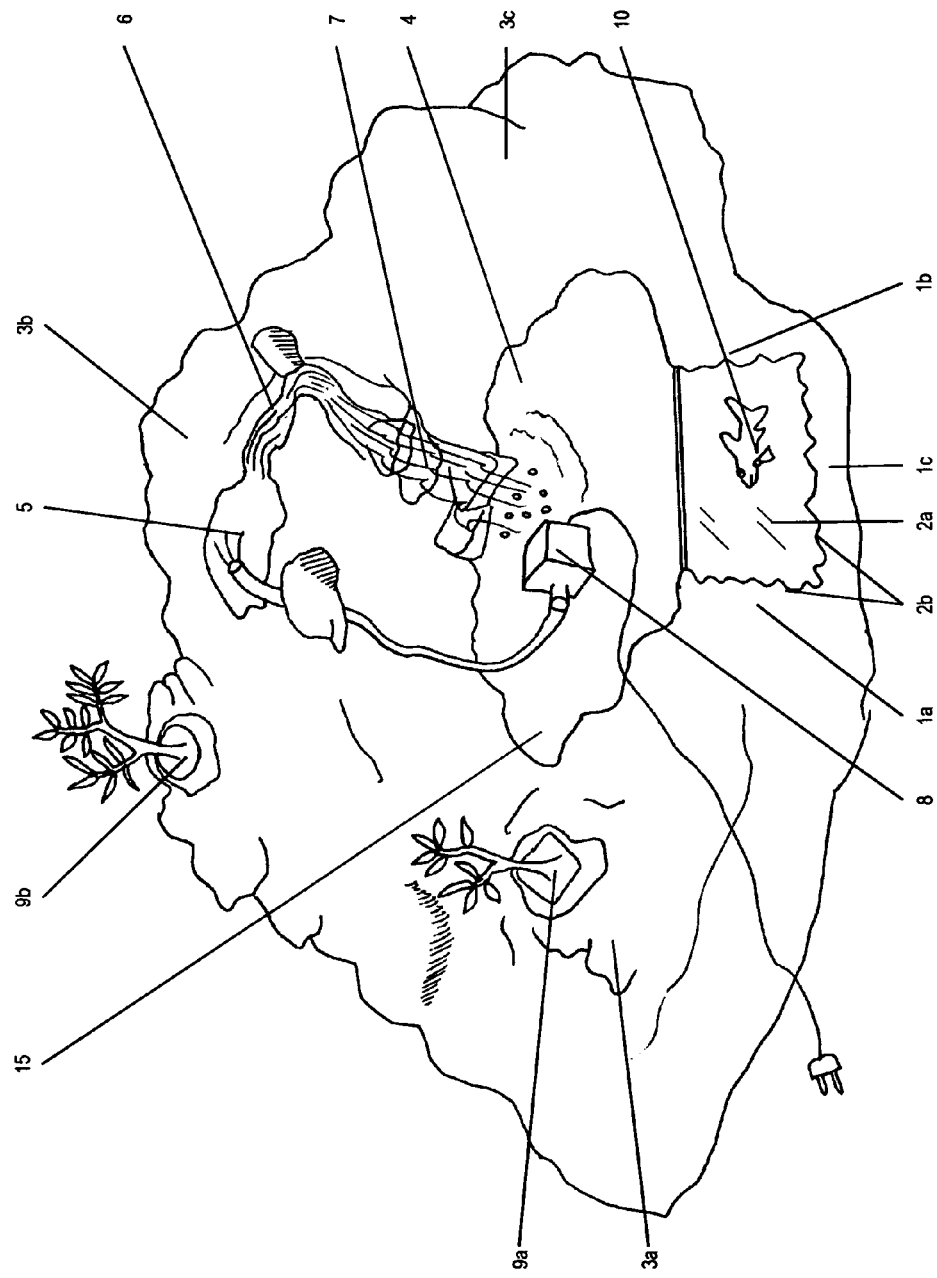
FIG. 15 shows the invention from the front; the upper pool is seen located on the rear Miniature Mountain.
Figure 16:
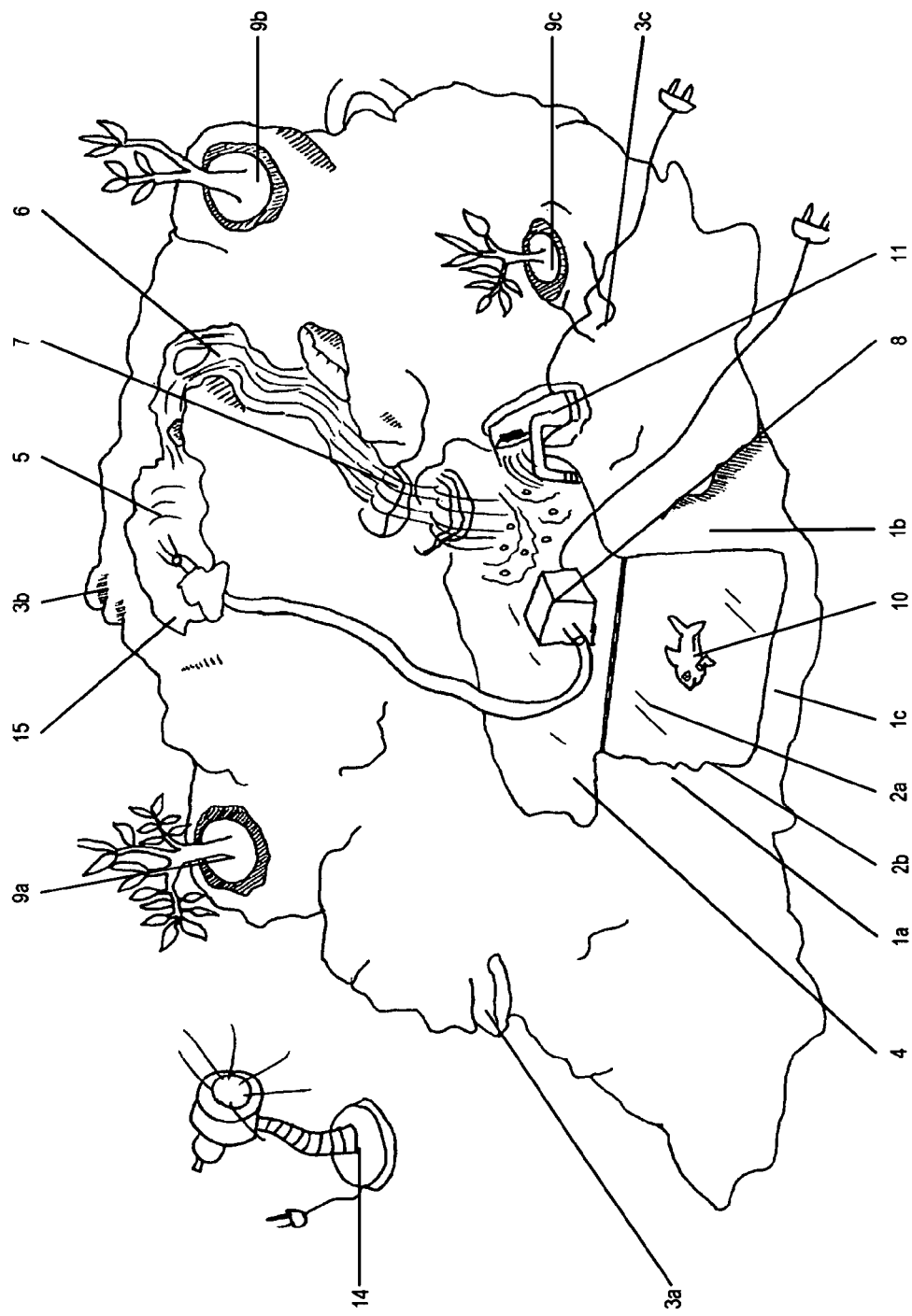
FIG. 16 shows the invention from the front; the upper pool is seen located on the rear Miniature Mountain.
Figure 17:
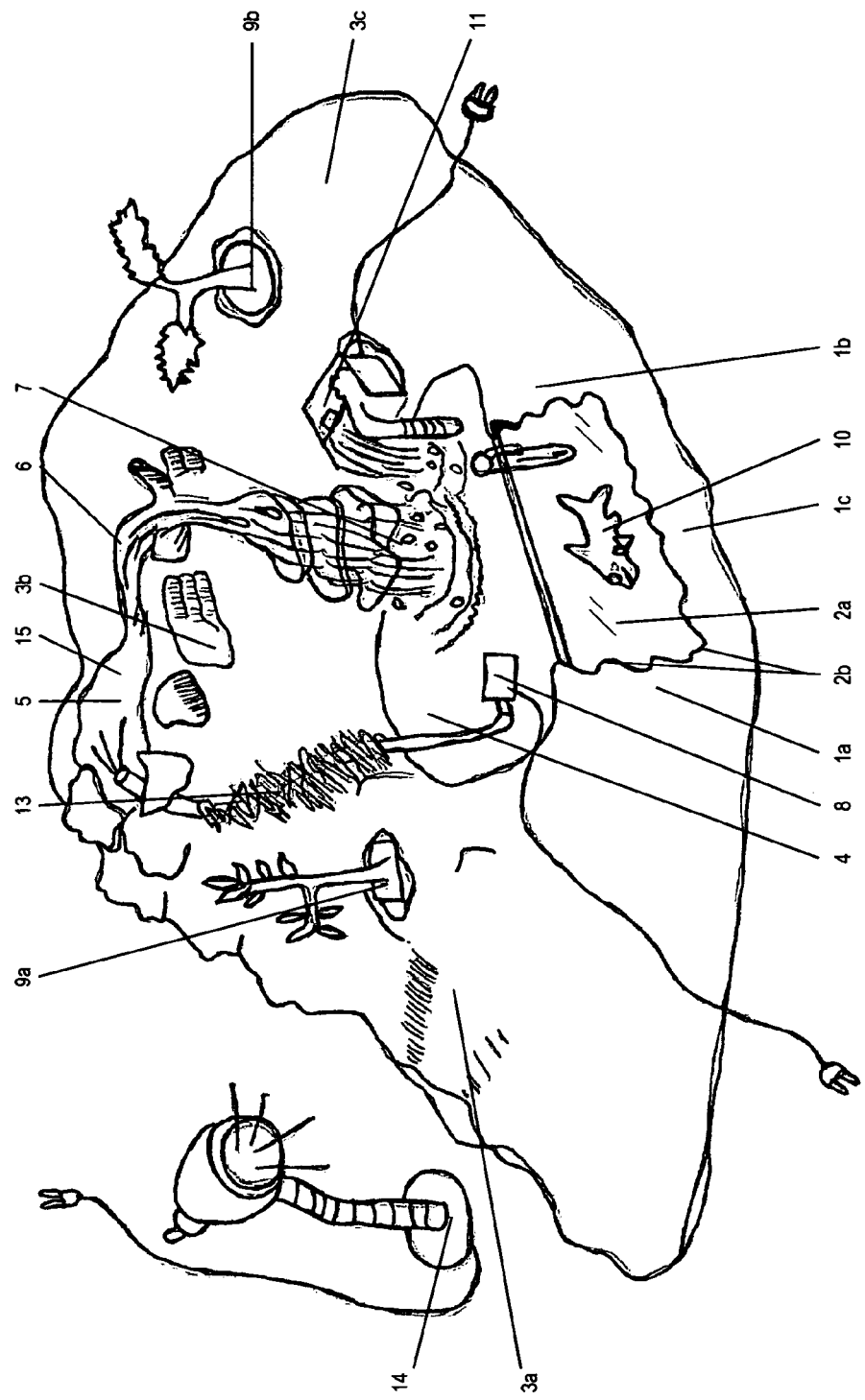
FIG. 17 shows the invention from the front; the upper pool is seen located on the rear Miniature Mountain.
Figure 18:
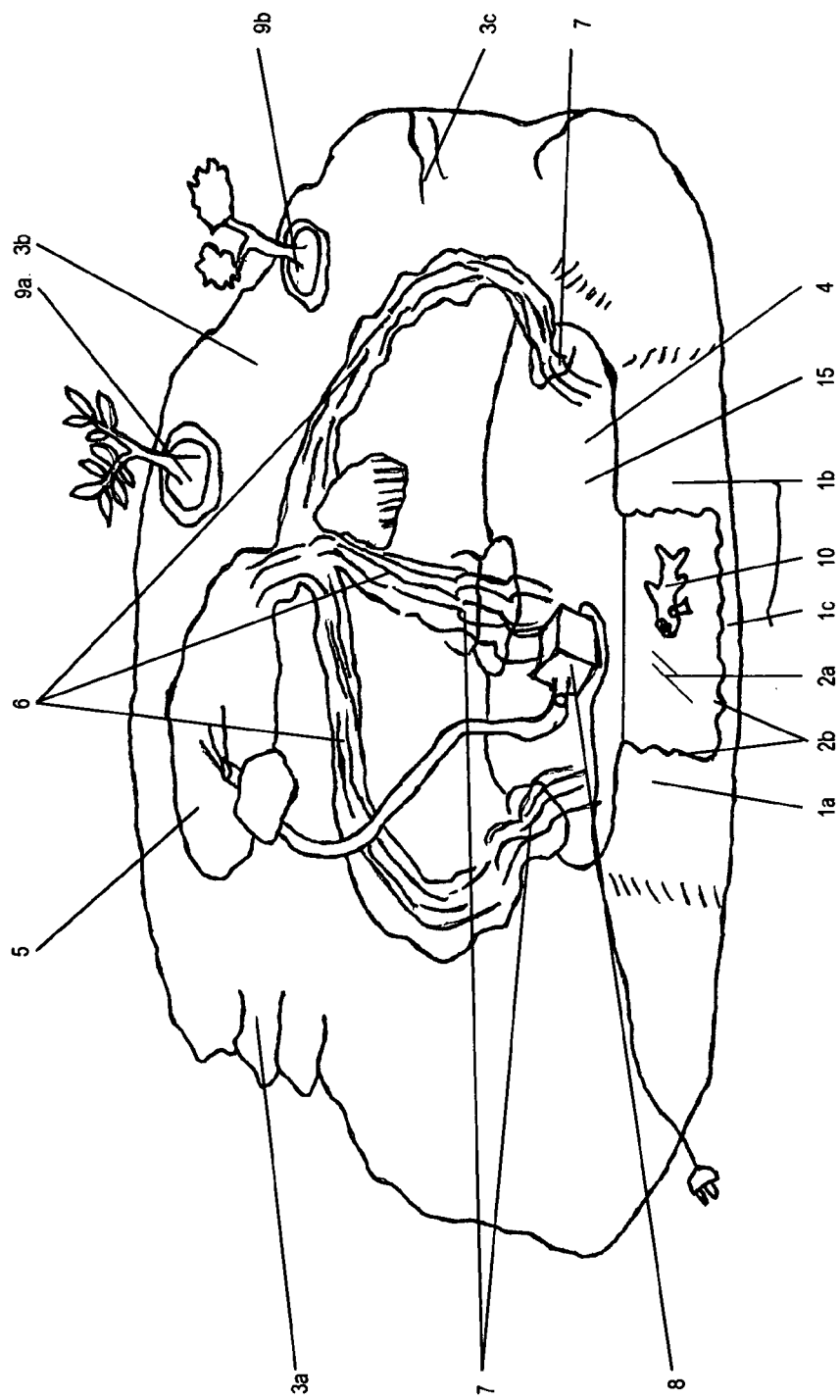
FIG. 18 shows the invention from the front; the upper pool is seen located on the rear Miniature Mountain.
Figure 19:
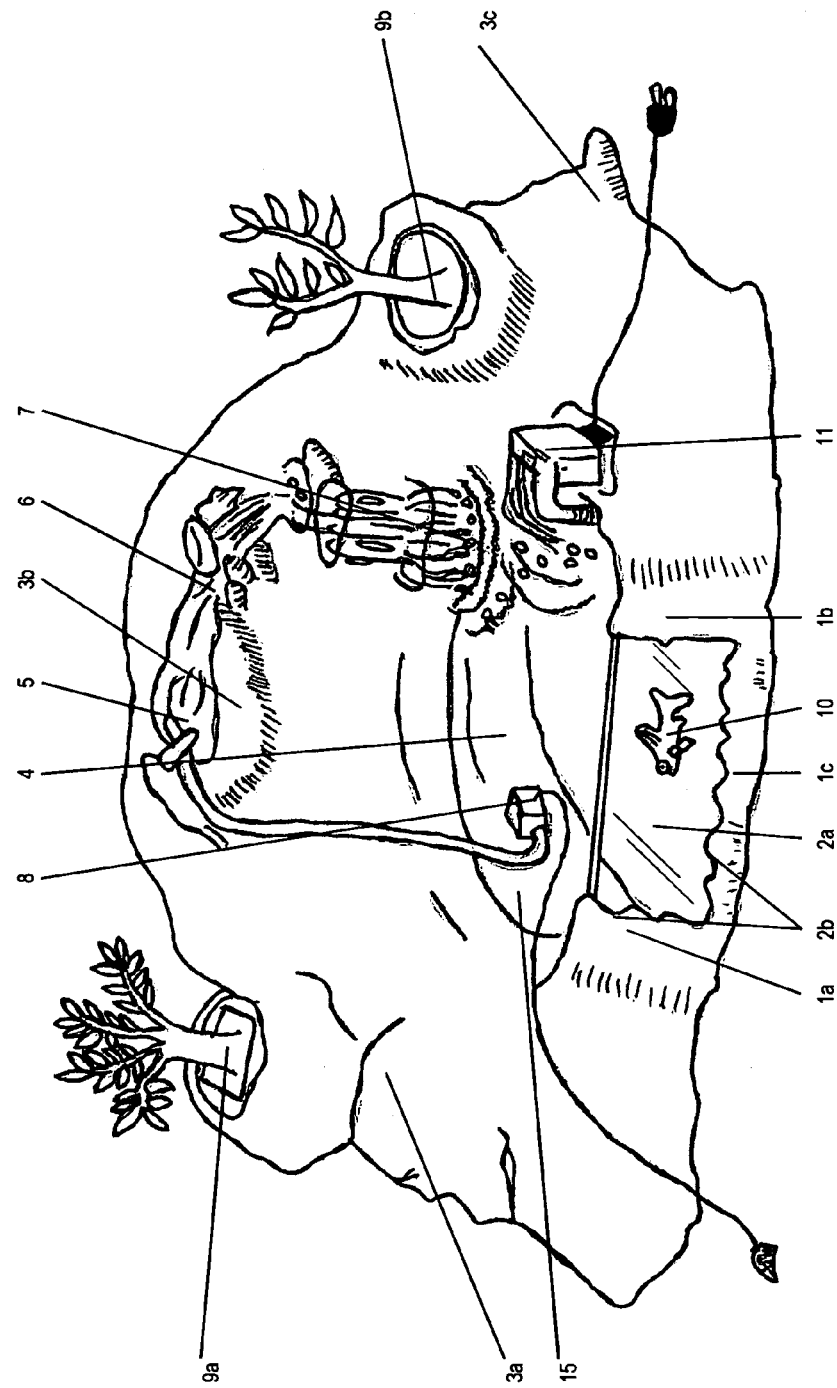
FIG. 19 shows the invention from the front; the upper pool is seen located on the rear Miniature Mountain.
Figure 20:
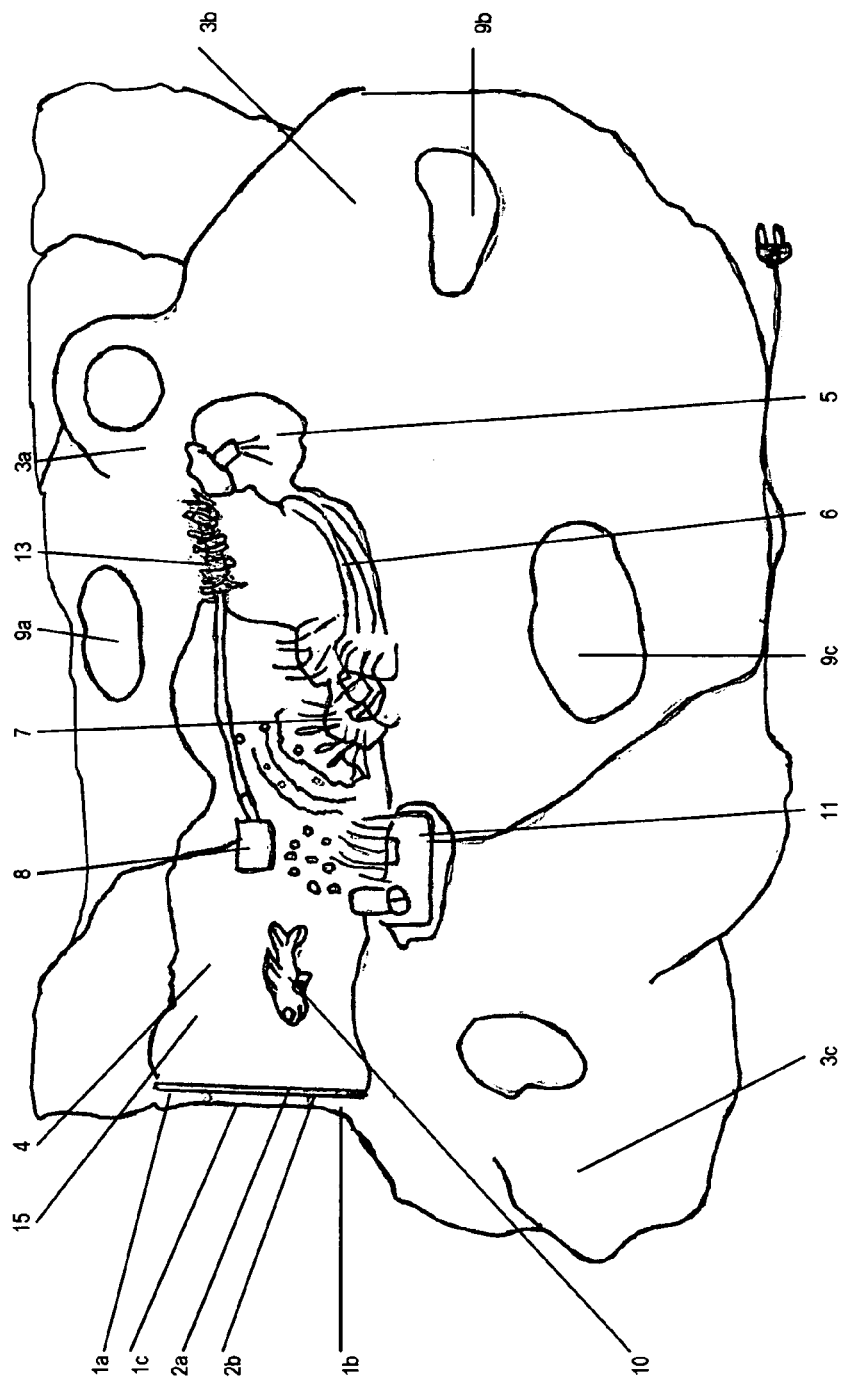
FIG. 20 shows the invention from the upper right side; the upper pool is seen located on the rear Miniature Mountain.
Figure 21:
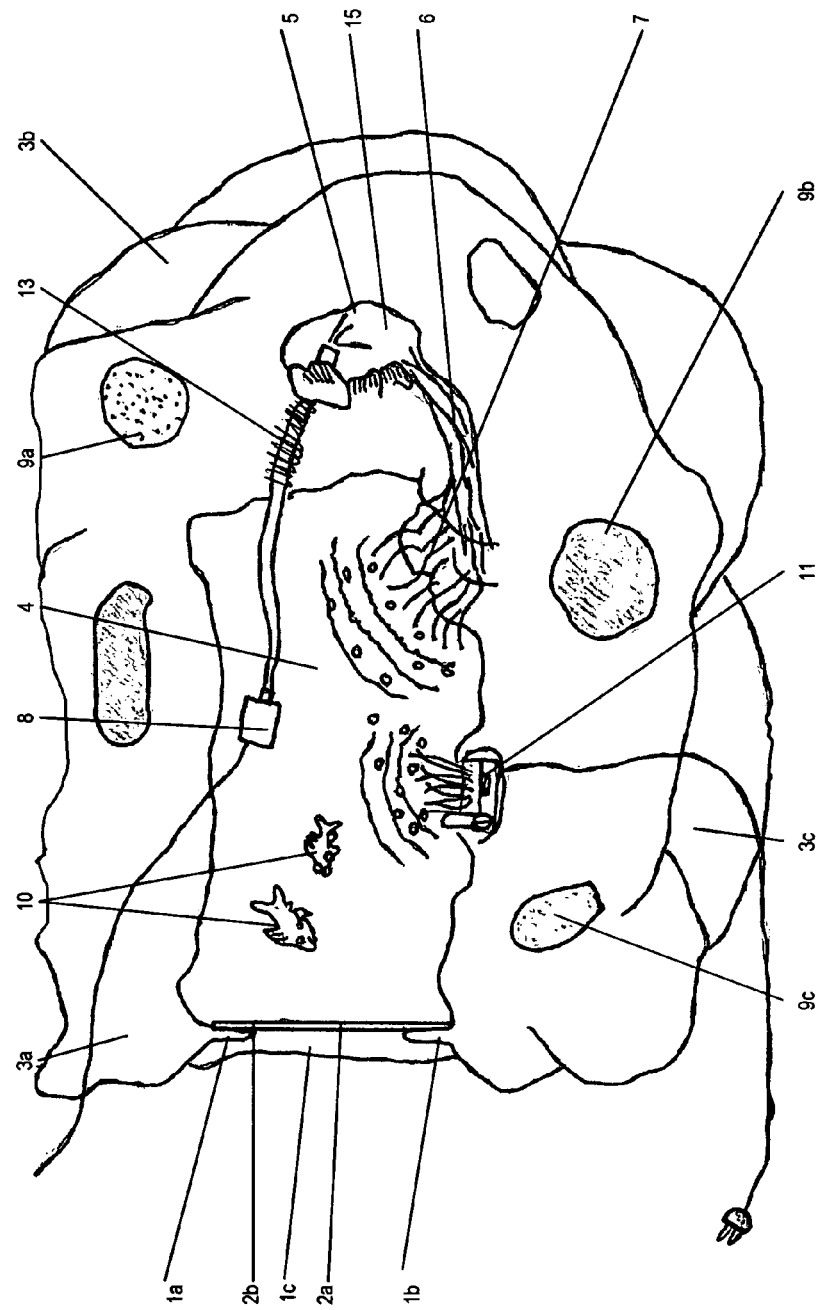
FIG. 21 shows the invention from the upper right side; the upper pool is seen located on the rear Miniature Mountain.
Figure 22:
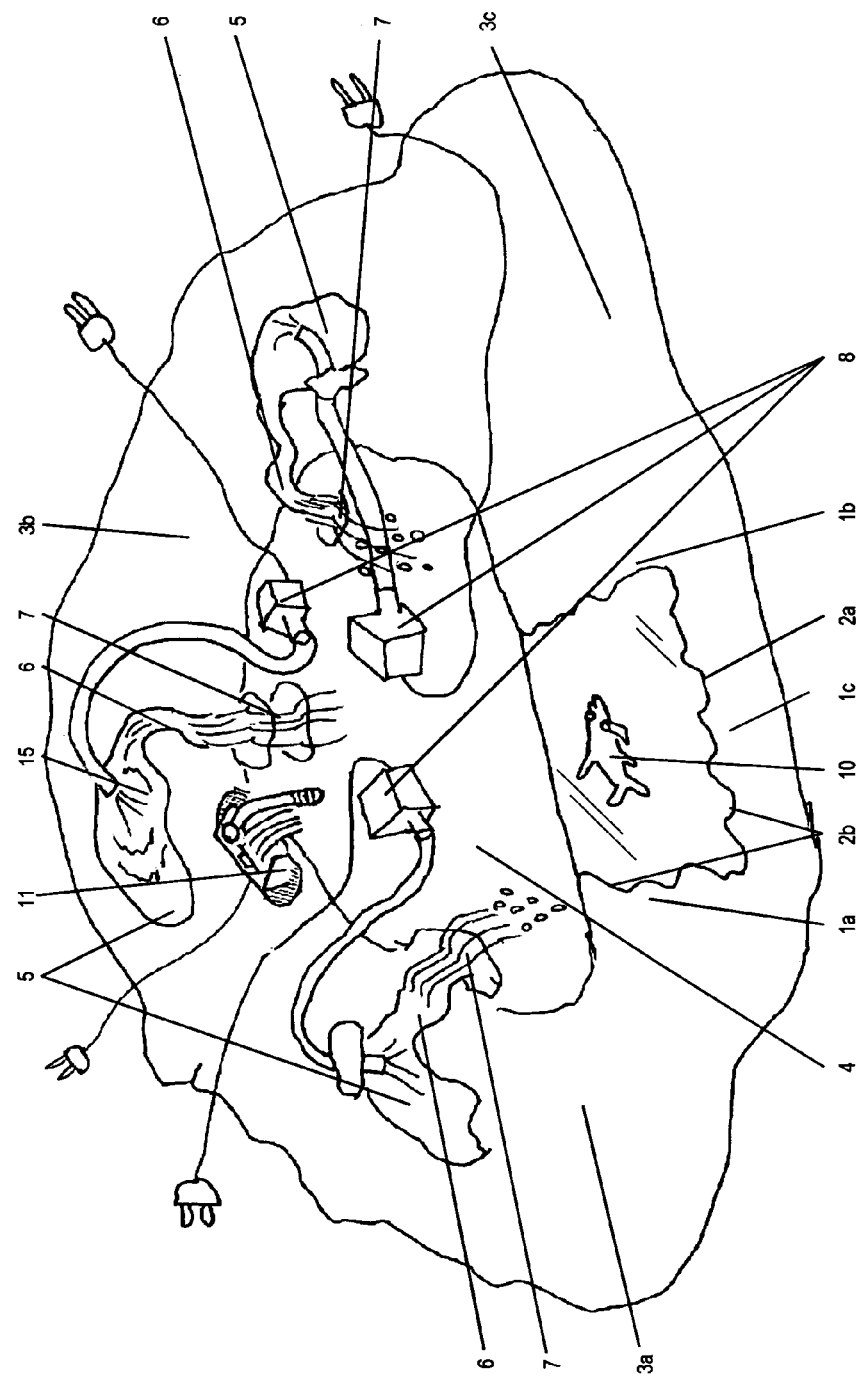
FIG. 22 shows the invention from the front; the upper pool is seen located on the rear Miniature Mountain.
Figure 23:
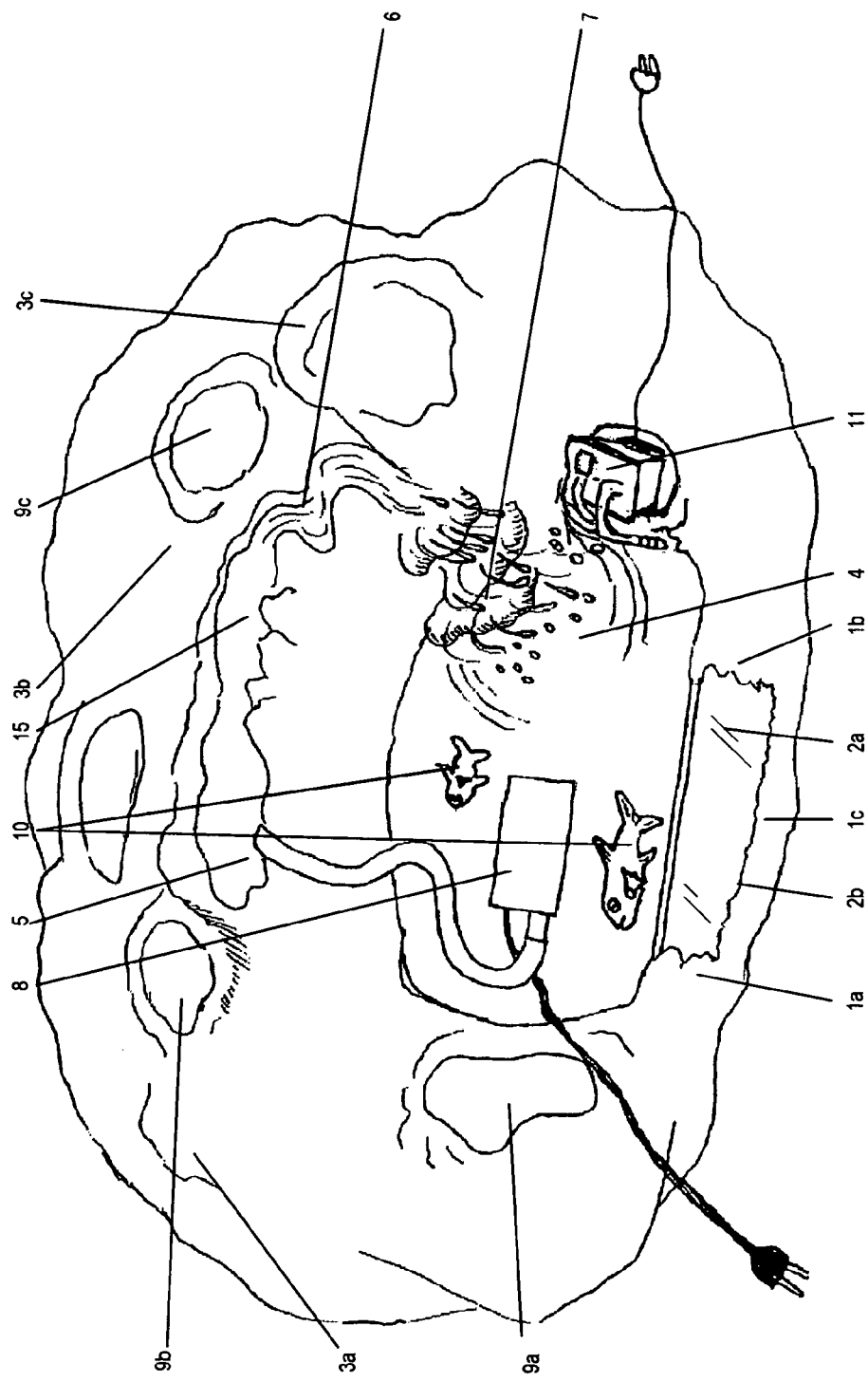
FIG. 23 shows the invention from the front; the upper pool is seen located on the rear Miniature Mountain.
Figure 24:
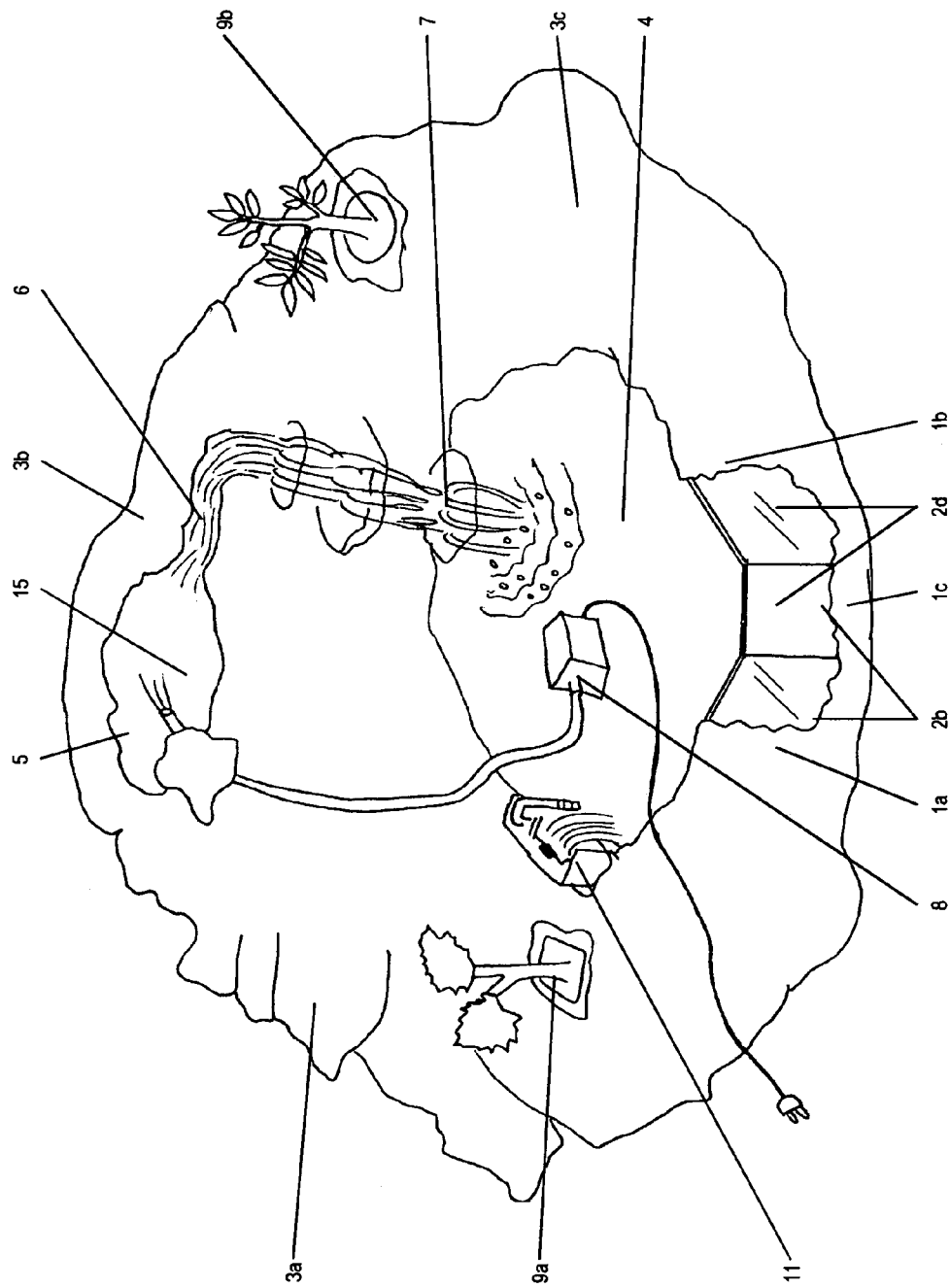
FIG. 24 shows the invention from the front; the upper pool is seen located on the rear Miniature Mountain.
Figure 25:
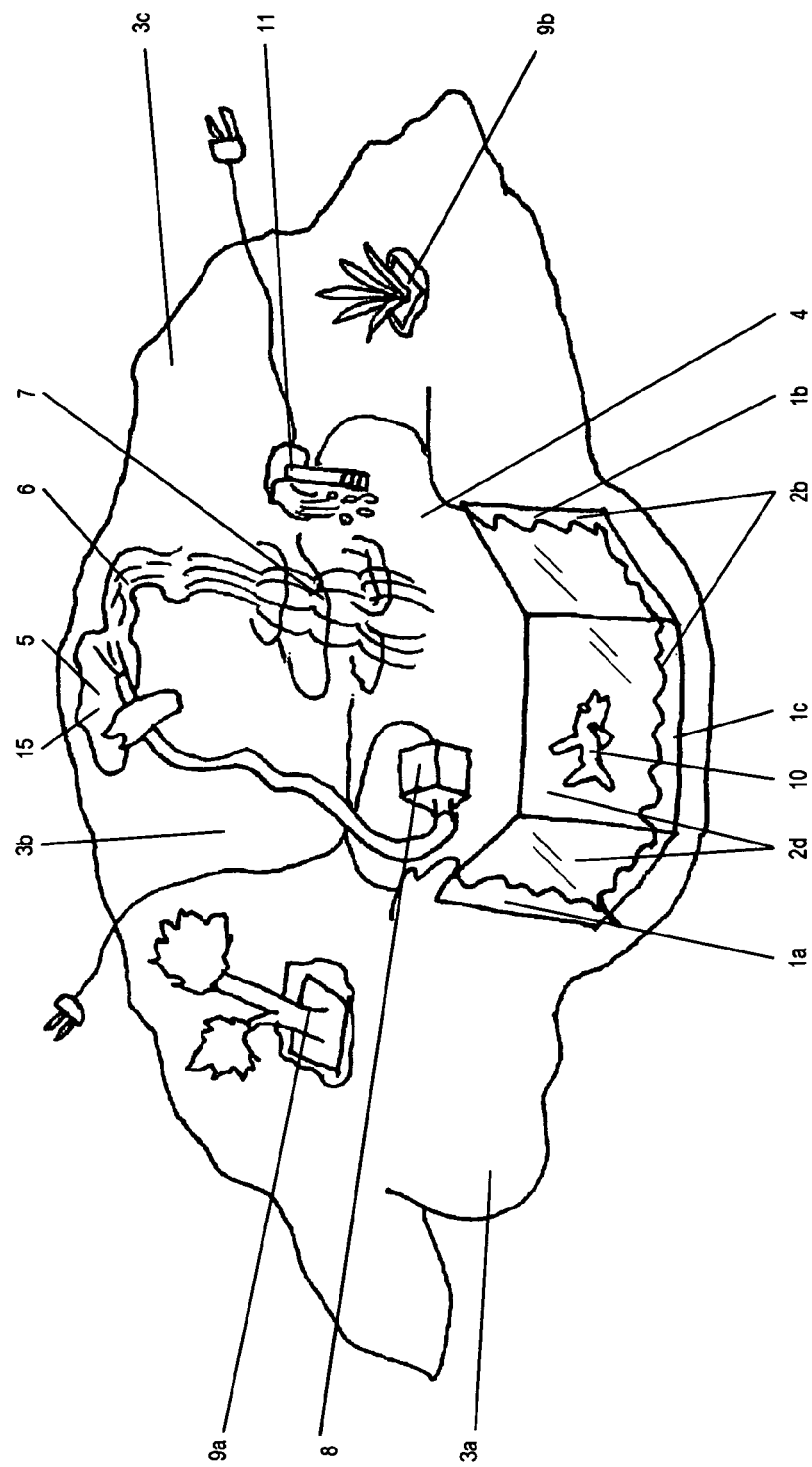
FIG. 25 shows the invention from the front; the upper pool is seen located on the rear Miniature Mountain.
Figure 26:
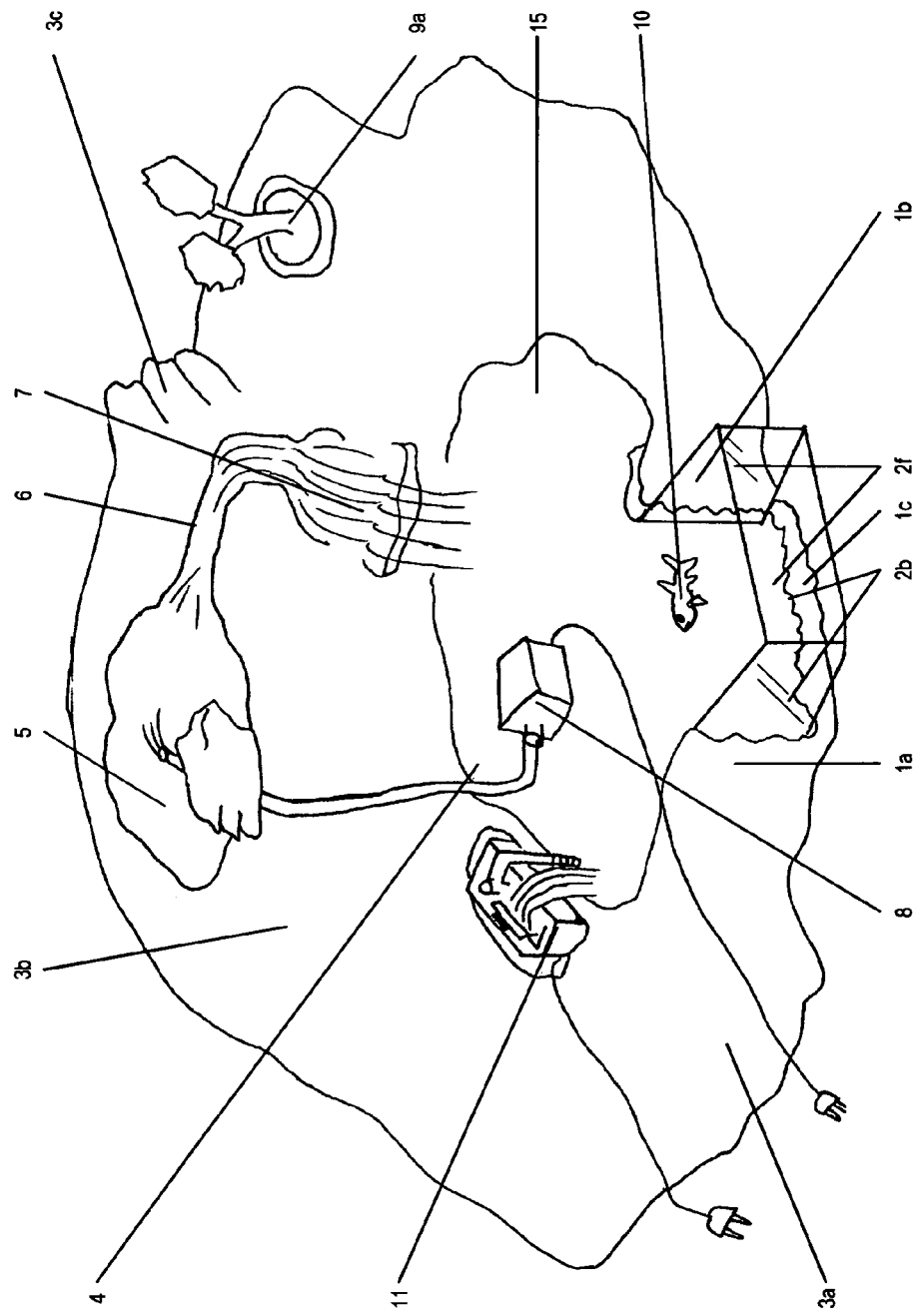
FIG. 26 shows the invention from the front; the upper pool is seen located on the rear Miniature Mountain.
Figure 27:
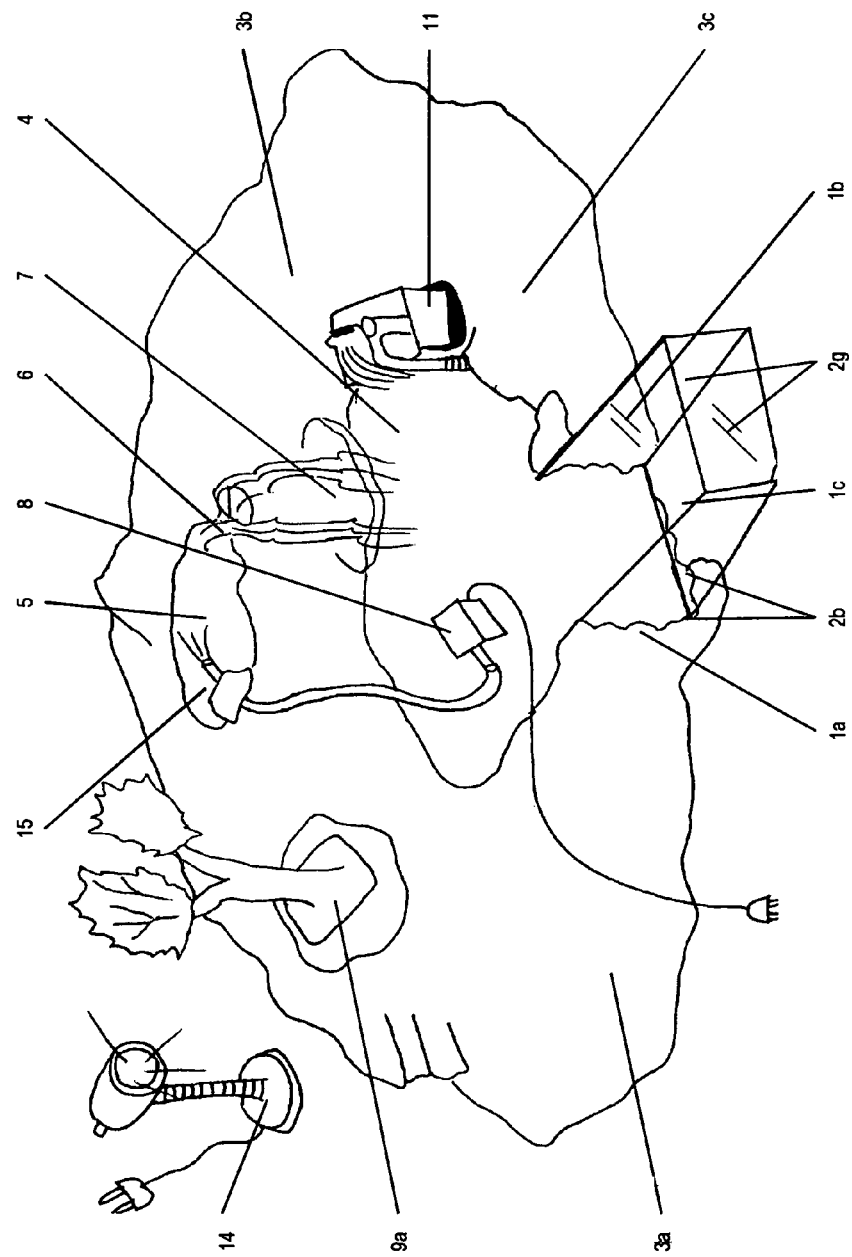
FIG. 27 shows the invention from the front; the upper pool is seen located on the rear Miniature Mountain.
Figure 28:
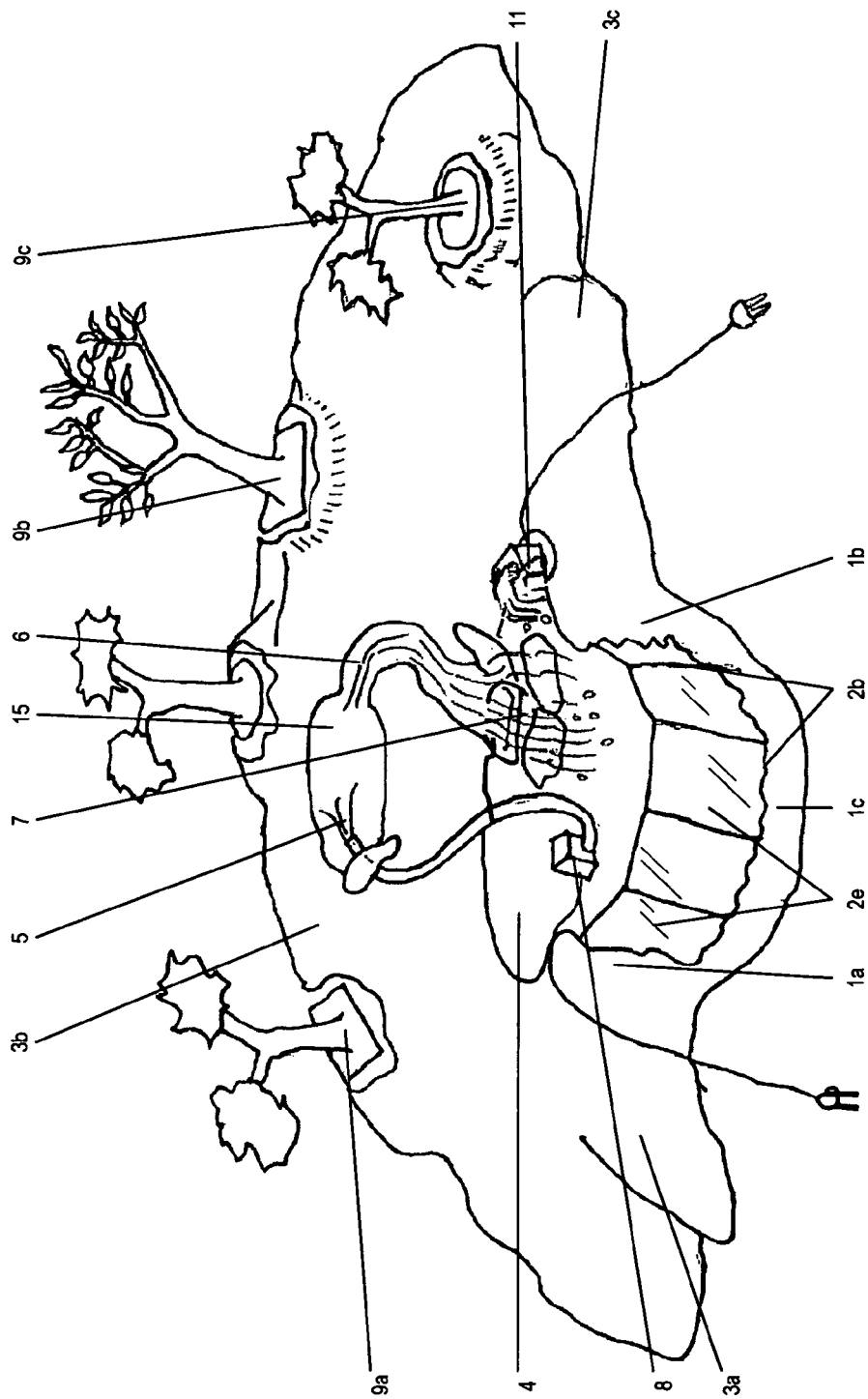
FIG. 28 shows the invention from the front; the upper pool is seen located on the rear Miniature Mountain.
Figure 29:
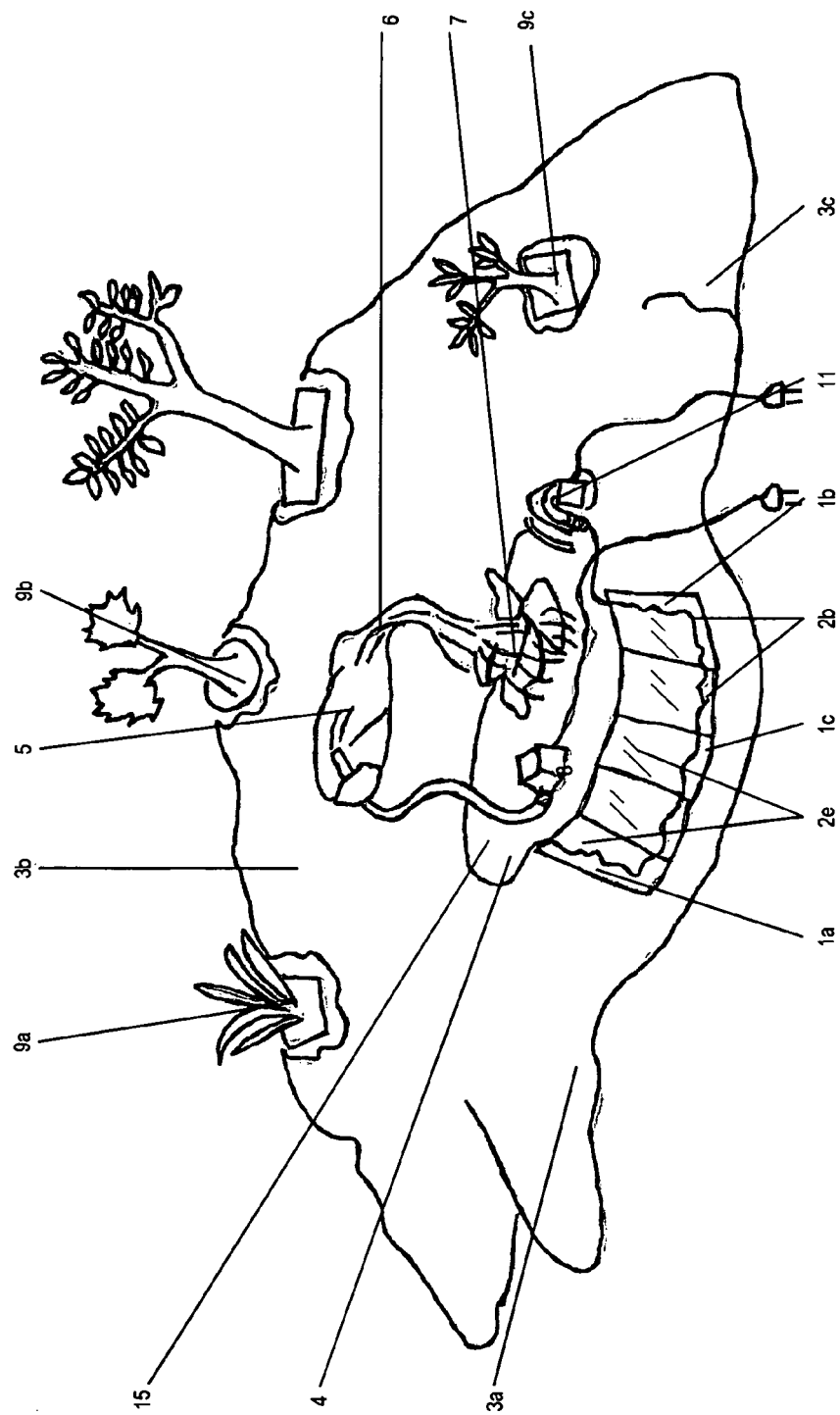
FIG. 29 shows the invention from the front; the upper pool is seen located on the rear Miniature Mountain.
Figure 30:
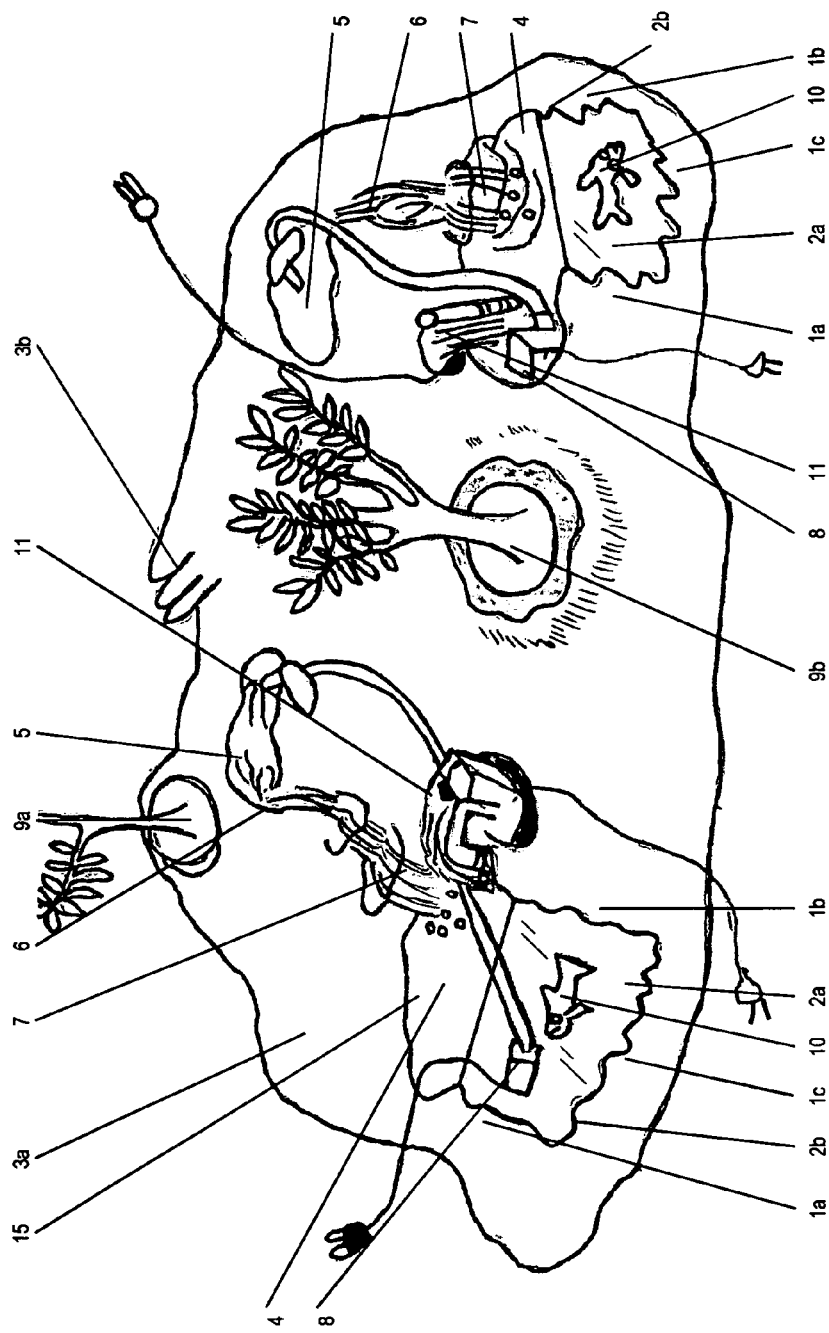
FIG. 30 shows the invention from the front; this version demonstrates 2 upper pools and 2 Main Basin Ponds.
Figure 31:
FIG. 31 shows the invention from the upper right side; the upper pool is seen located on the rear Miniature Mountain.
Figure 32:
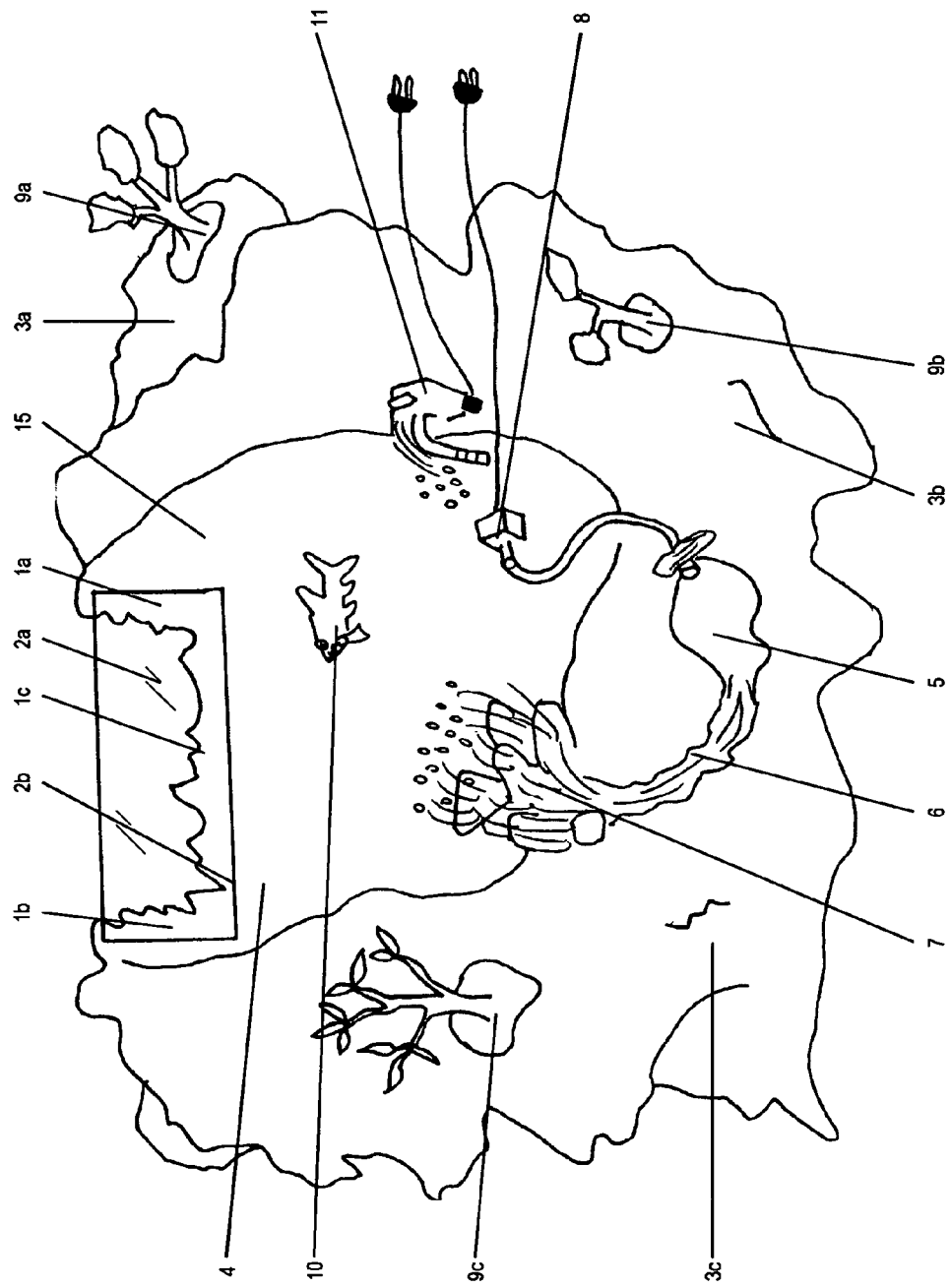
FIG. 32 shows the invention from the upper rear; the upper pool is seen located on the rear Miniature Mountain.
Figure 33:
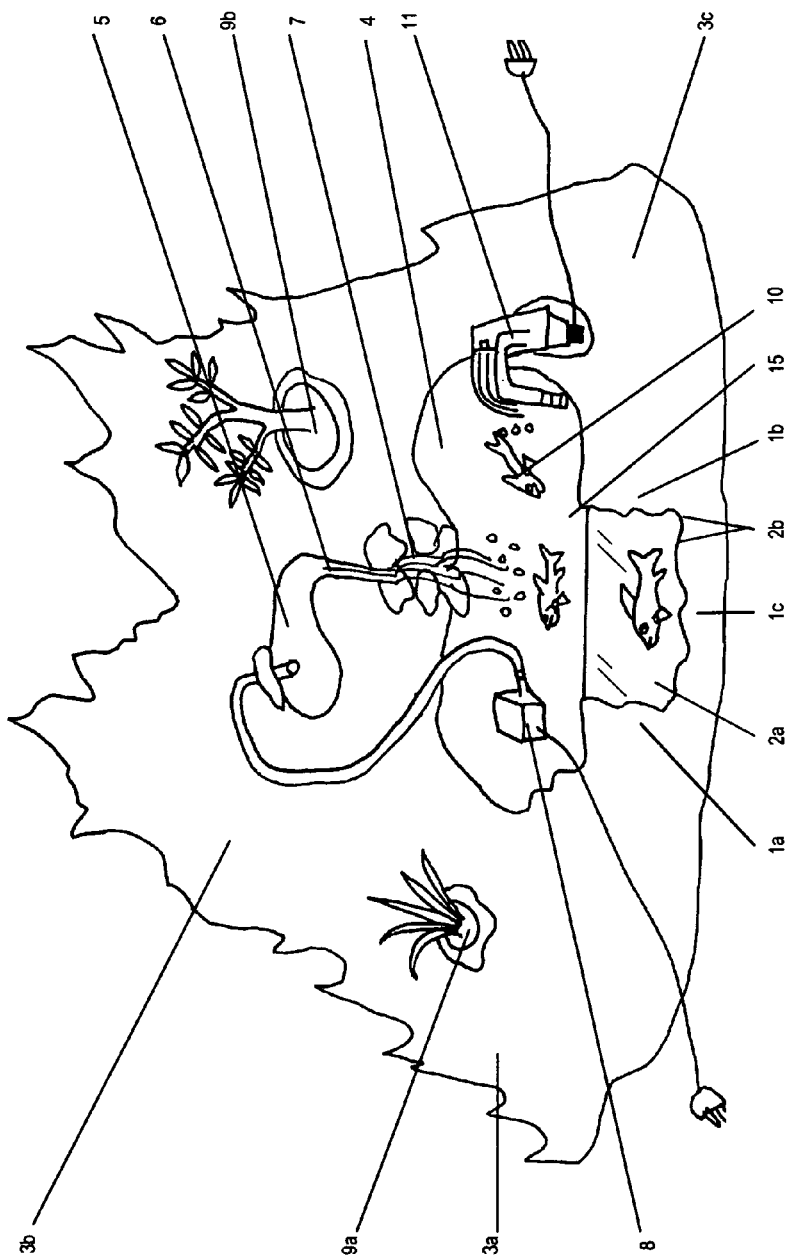
FIG. 33 shows the invention from the front; the upper pool is seen located on the rear Miniature Mountain.

My invention consists of a Main Basin Pond 4 surrounded and supported and shaped on three sides by "Miniature Mountains" 3a, 3b, 3c (FIG. 1) or Natural Looking Imitation Rocks 3a, 3b, 3c (FIG. 3, FIG. 4) or combinations thereof (FIG. 2) or any Imitation Rock Structures and a fourth side formed by a Pane of Glass 2a. The "Miniature Mountains" do not come around in front, nor do the Natural Looking Imitation Rocks nor any other Imitation Rock Structures come around in front (the front is the side closest to the viewer and the side without a "Miniature Mountain" or Natural Looking Imitation Rock or any Imitation Rock Structure; the front is where the Pane of Glass 2a goes); instead, here in front, I ingeniously adhere a Pane of Glass 2a onto the imitation rock surface of the Side "Miniature Mountains" 3a and 3c at Frame 1a and Frame 1b and to the Main Basin Pond 4 floor, Frame 1c, with Silicon Sealant 2b or other types of sealant 2c so that one may look at the live Fish 10 in the Main Basin Pond 4 from above, as with a traditional pond, and then go down below the water level and view the same live Fish 10 at eye level through the translucent Pane of Glass 2a. This is totally novel and unique. The Pane of Glass 2a is most commonly attached to the "Miniature Mountains" 3a and 3c at the Frames 1a, 1b, and 1c. The Pane of Glass 2a runs from the surface of Frame 1c on the Main Basin Pond 4 floor up towards the summits of the "Miniature Mountains" 3a and 3c (it may or may not be cut to reach the very tops of the summits of the "Miniature Mountains" 3a and 3c; generally, for aesthetic reasons, I prefer that the Pane of Glass 2a does not reach the top most summits of the "Miniature Mountains" 3a and 3c); and the Pane of Glass 2a runs from the surface of Frame 1a on the Left Side "Miniature Mountain" 3a to the surface of Frame 1b on the Right Side "Miniature Mountain" 3c. The Pane of Glass 2a is cut to fit this space. See my Illustrations.

Figure 37:
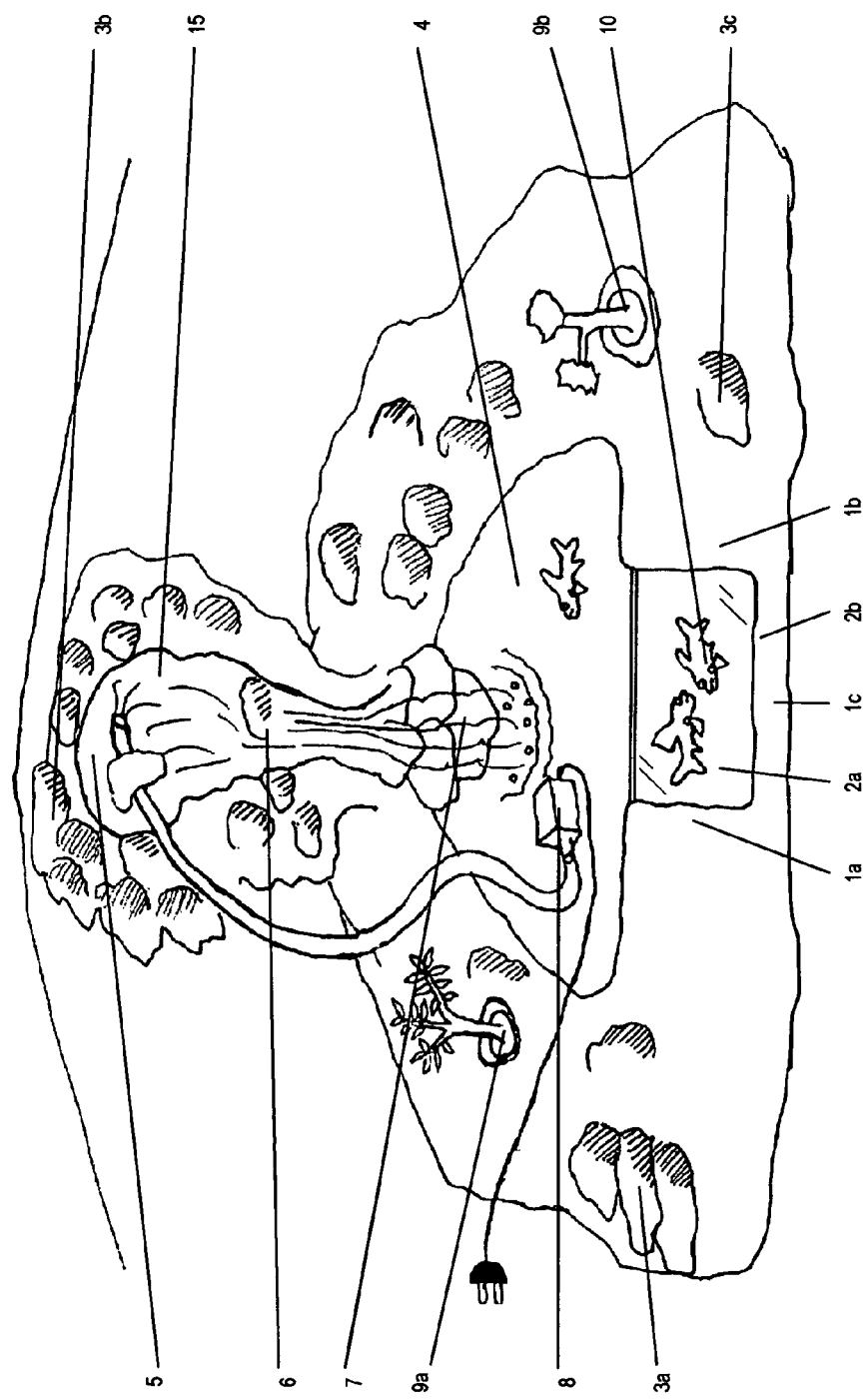
FIG. 37 shows the invention from the front; the upper pool is seen located on the rear Miniature Mountain.
Figure 38:
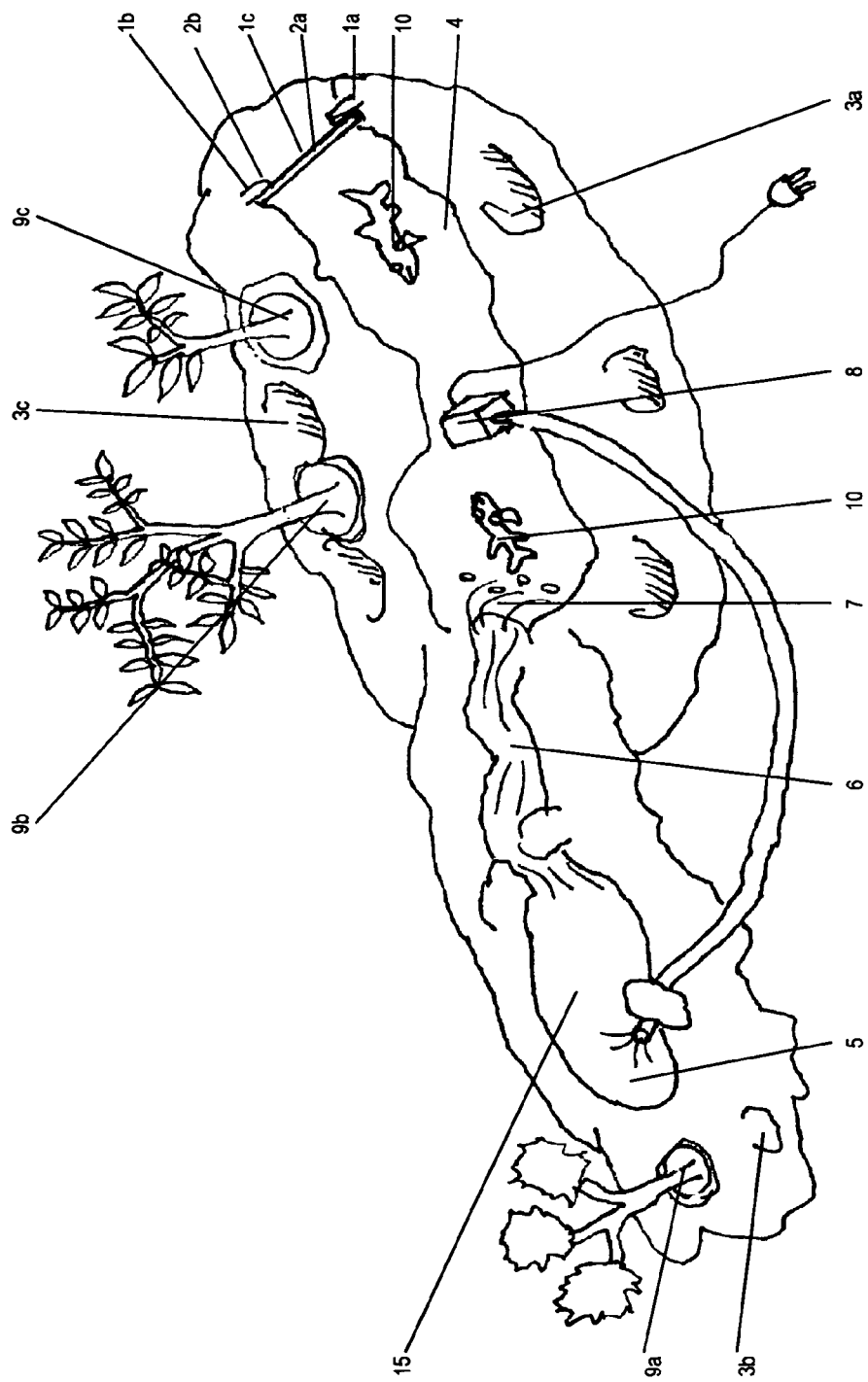
FIG. 38 shows the invention from the upper left; the upper pool is seen located on the rear Miniature Mountain.
Figure 39:
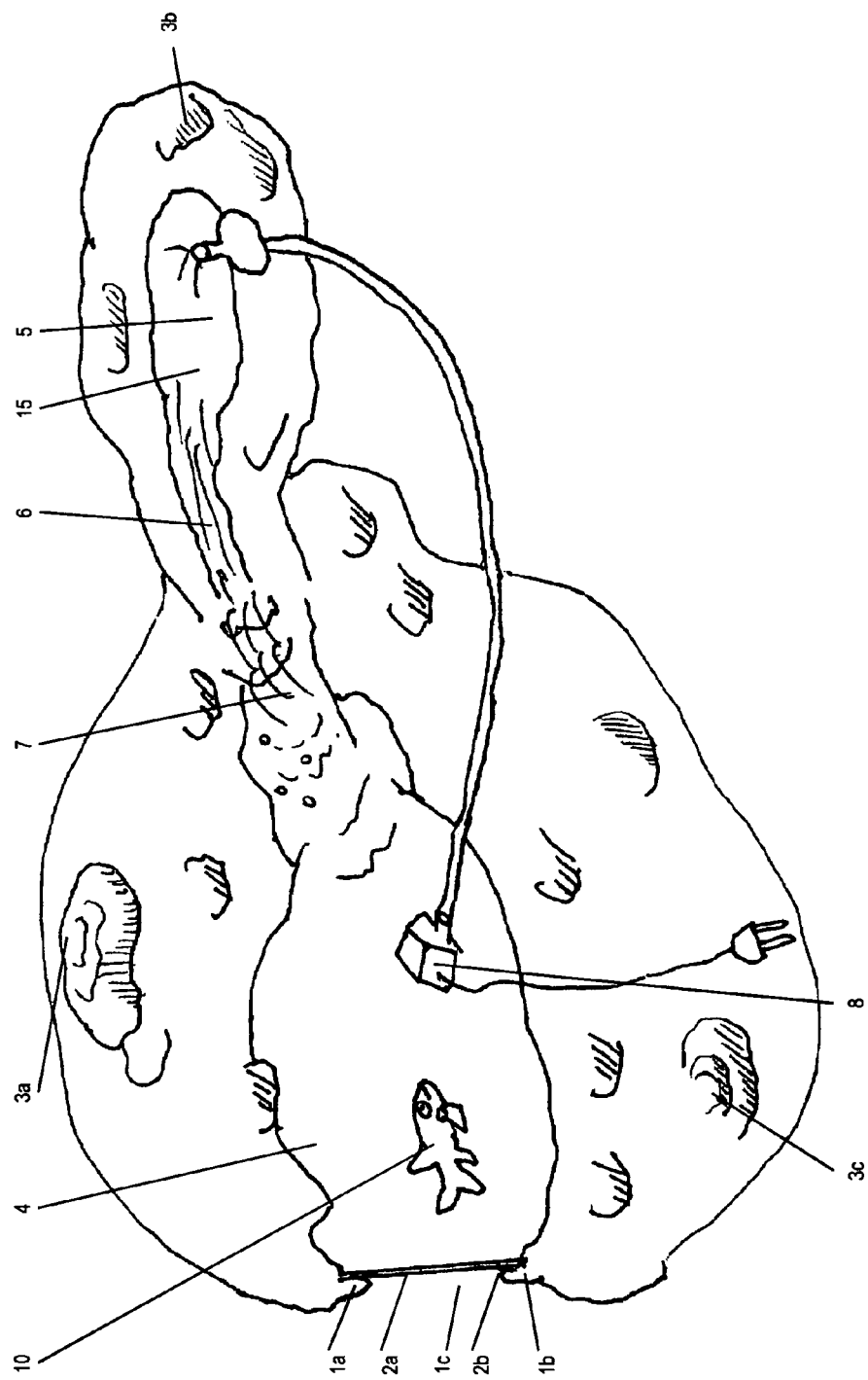
FIG. 39 shows the invention from the upper right; the upper pool is seen located on the rear Miniature Mountain.
Figure 40:
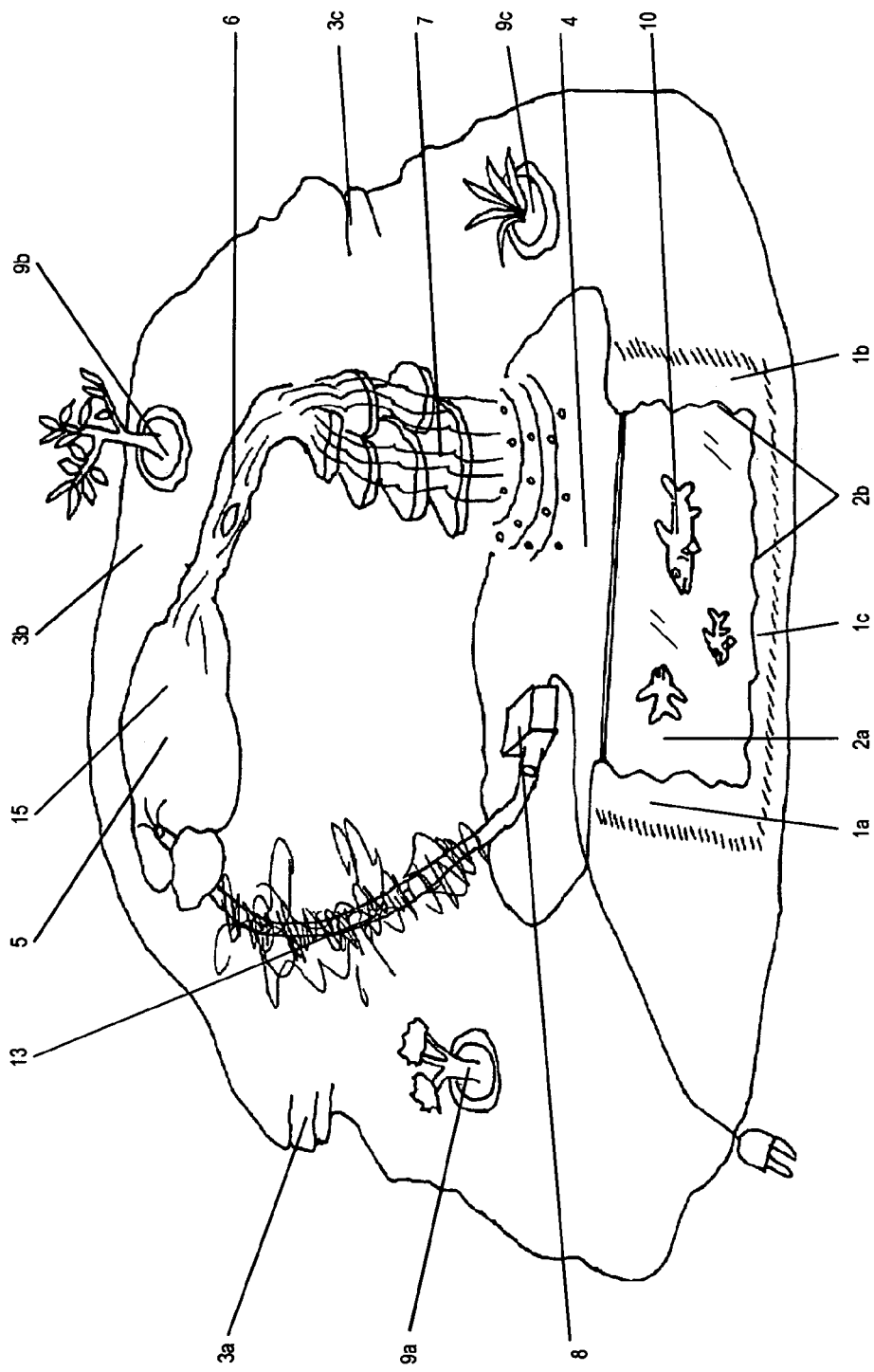
FIG. 40 shows the invention from the front; the upper pool is seen located on the rear Miniature Mountain.
Figure 41:
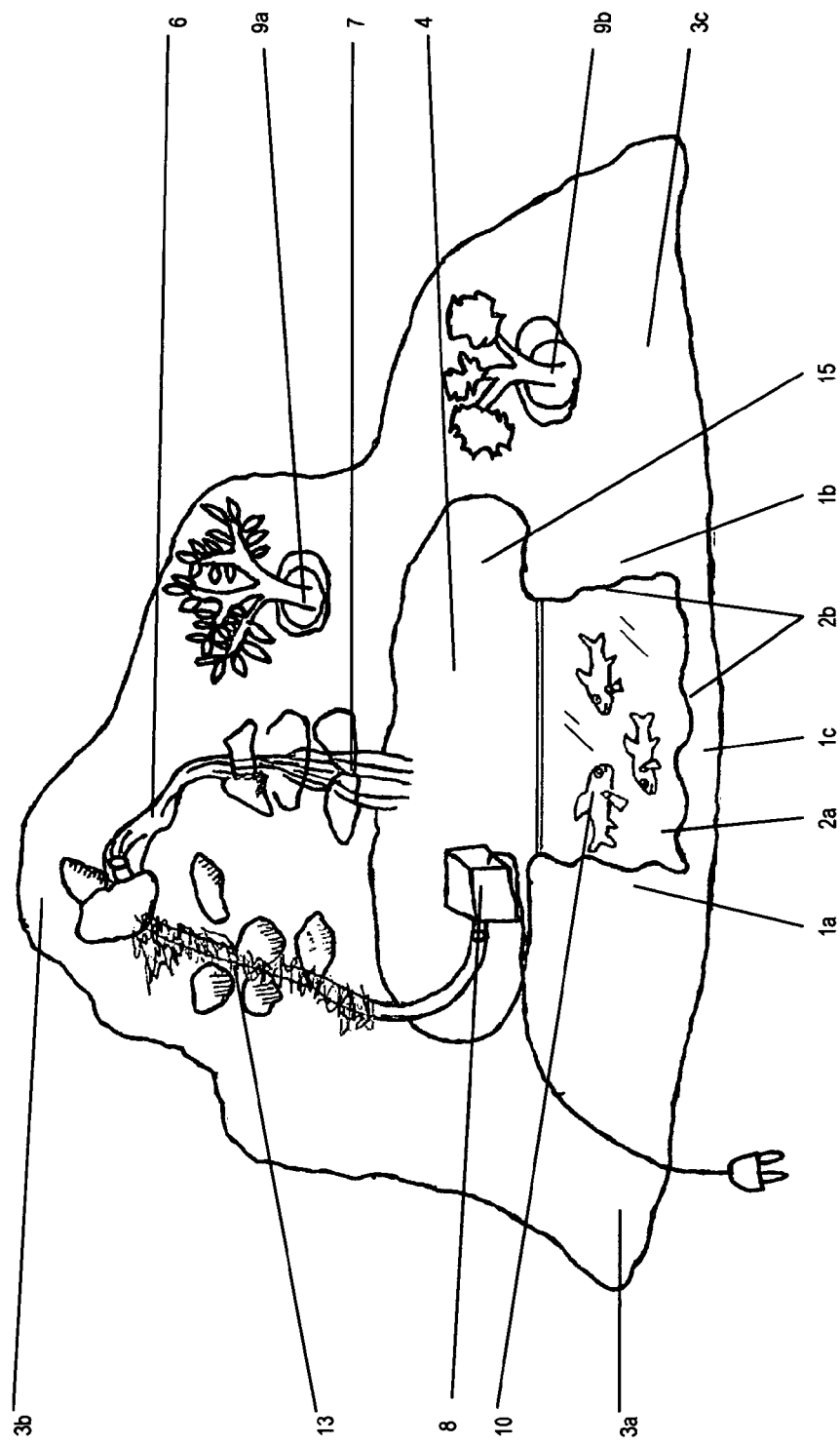
FIG. 41 shows the invention from the front; the upper pool is seen located on the rear Miniature Mountain.
Figure 42:
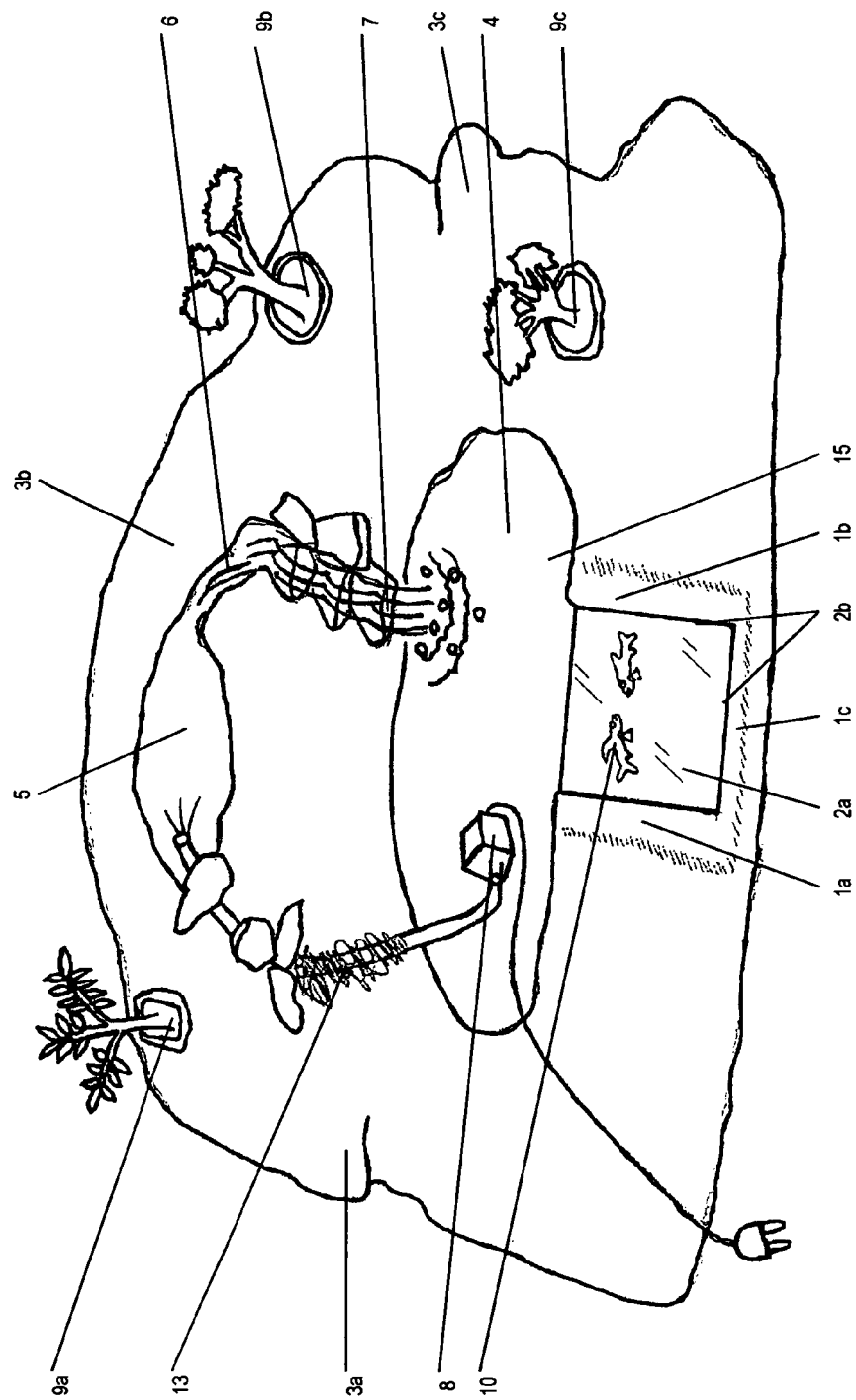
FIG. 42 shows the invention from the front; the upper pool is seen located on the rear Miniature Mountain.
Figure 43:
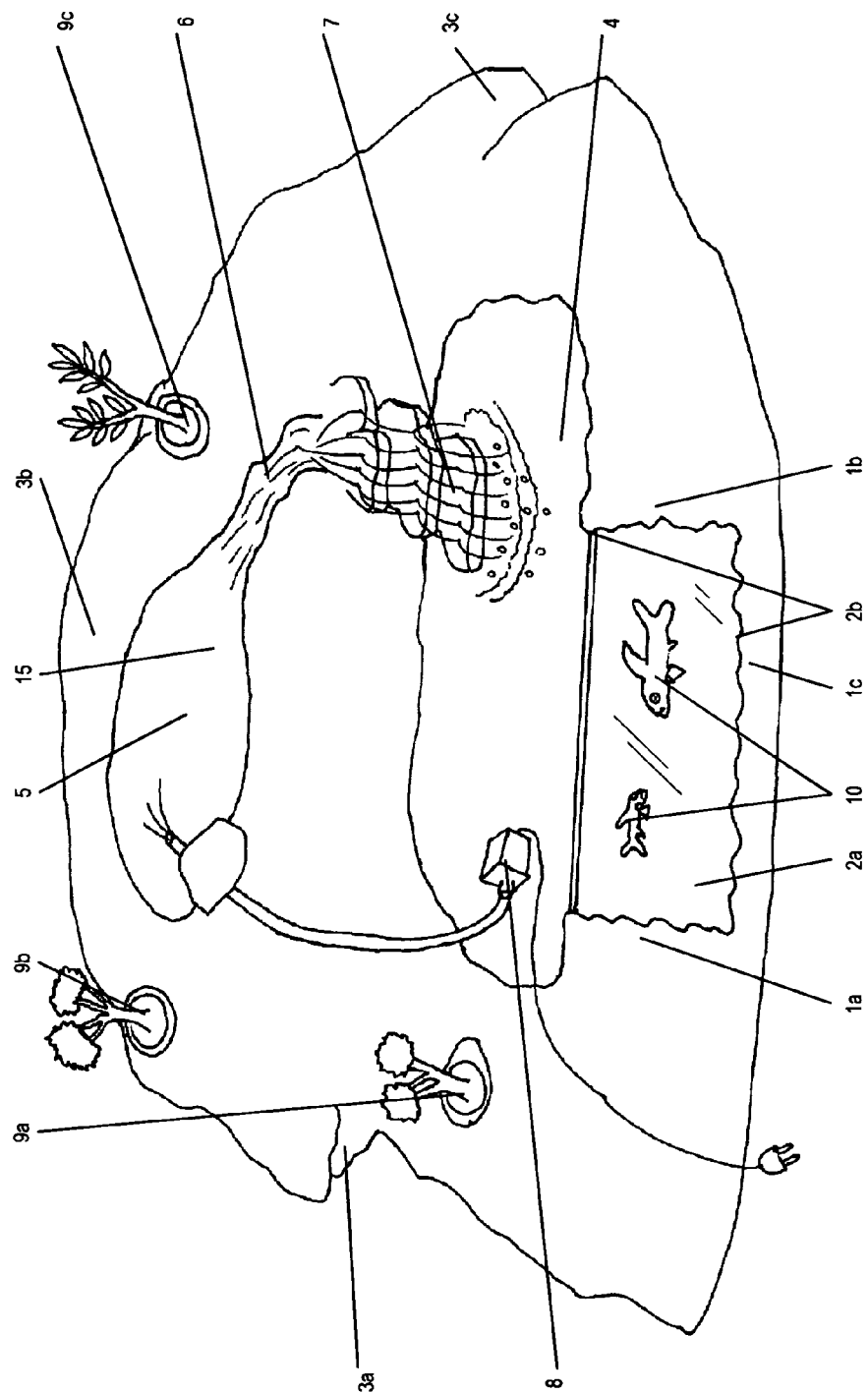
FIG. 43 shows the invention from the front; the upper pool is seen located on the rear Miniature Mountain.
Figure 44:
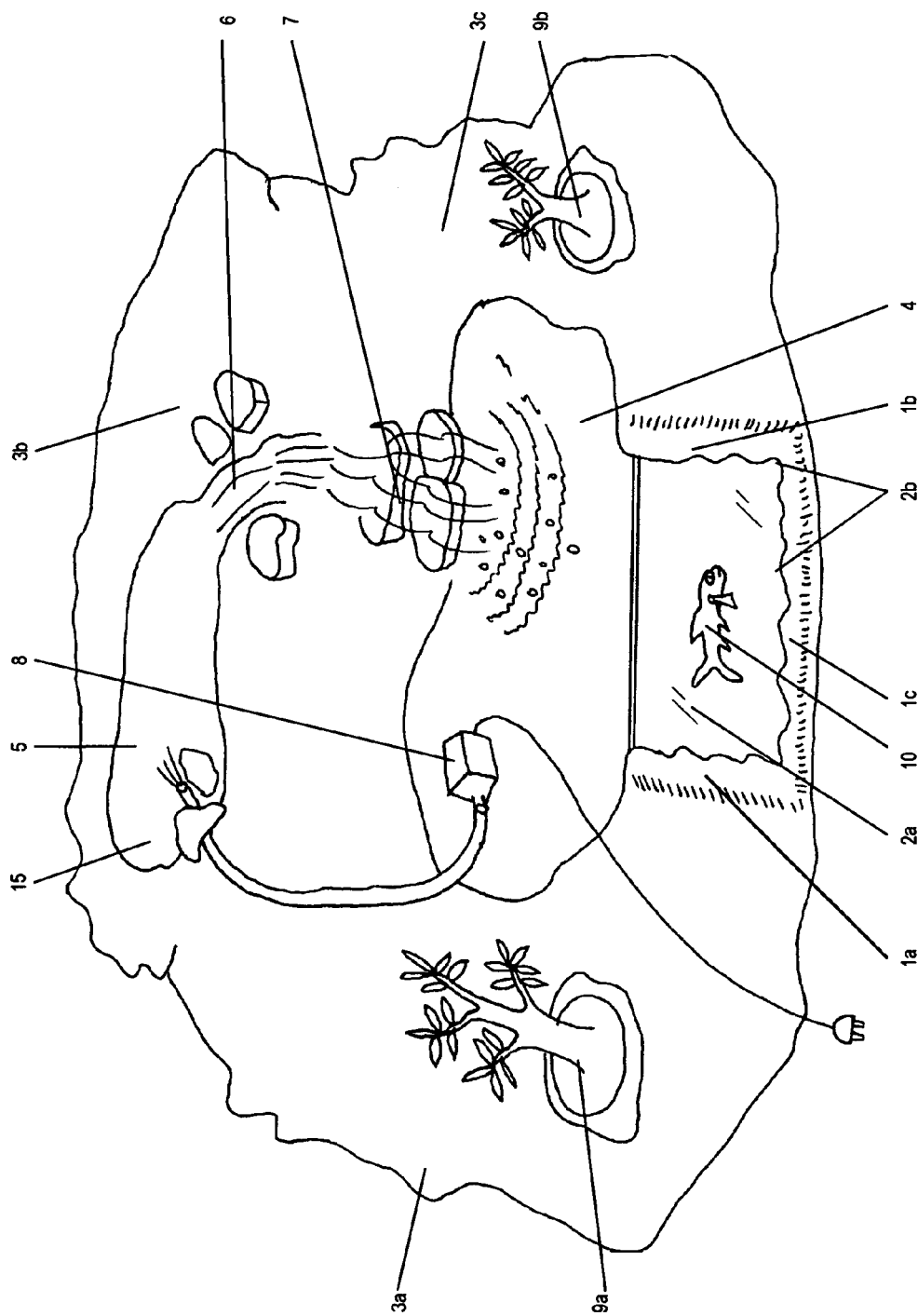
FIG. 44 shows the invention from the front; the upper pool is seen located on the rear Miniature Mountain.
Figure 45:
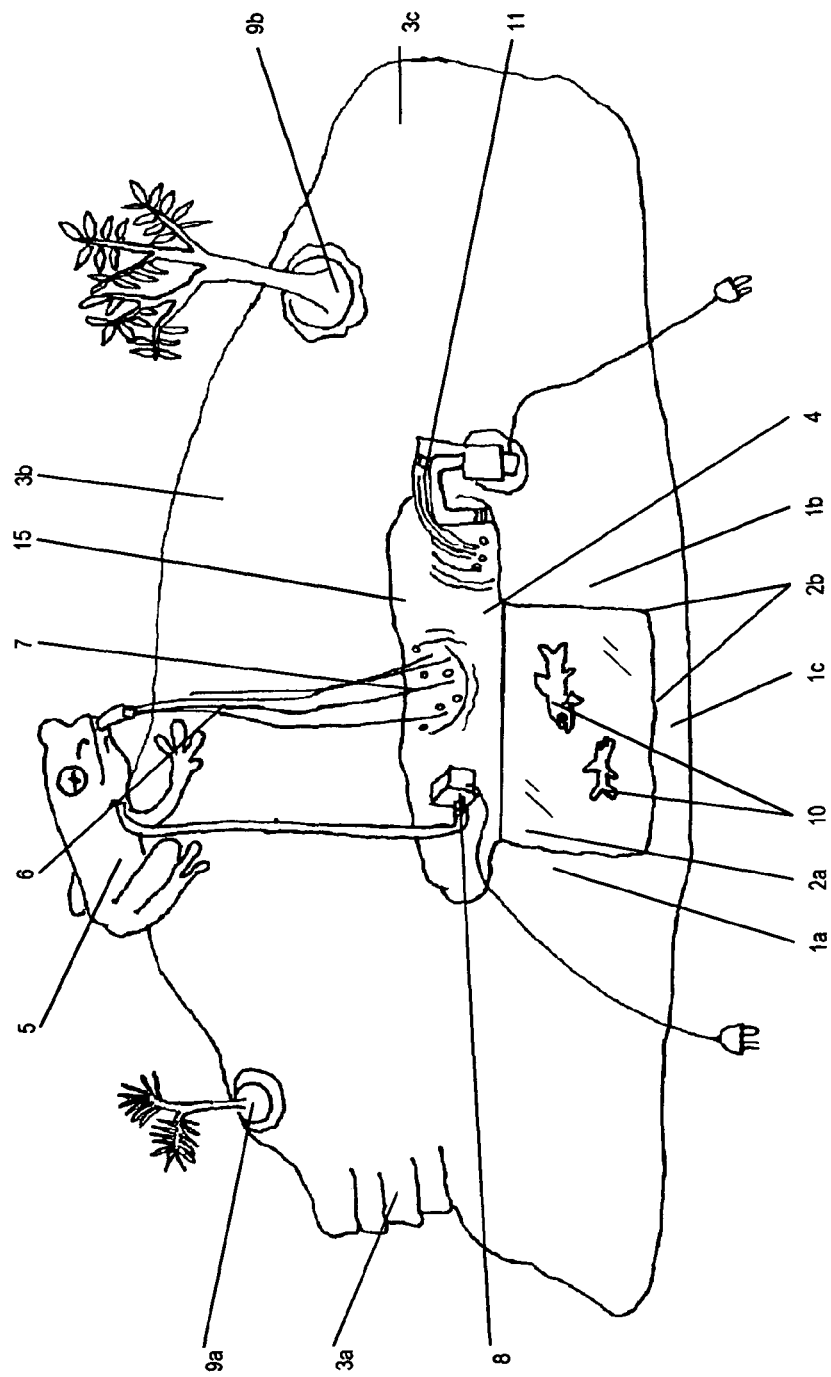
FIG. 45 shows the invention from the front; instead of an upper pool, a frog sculpture is seen located on the rear Miniature Mountain.
Figure 46:
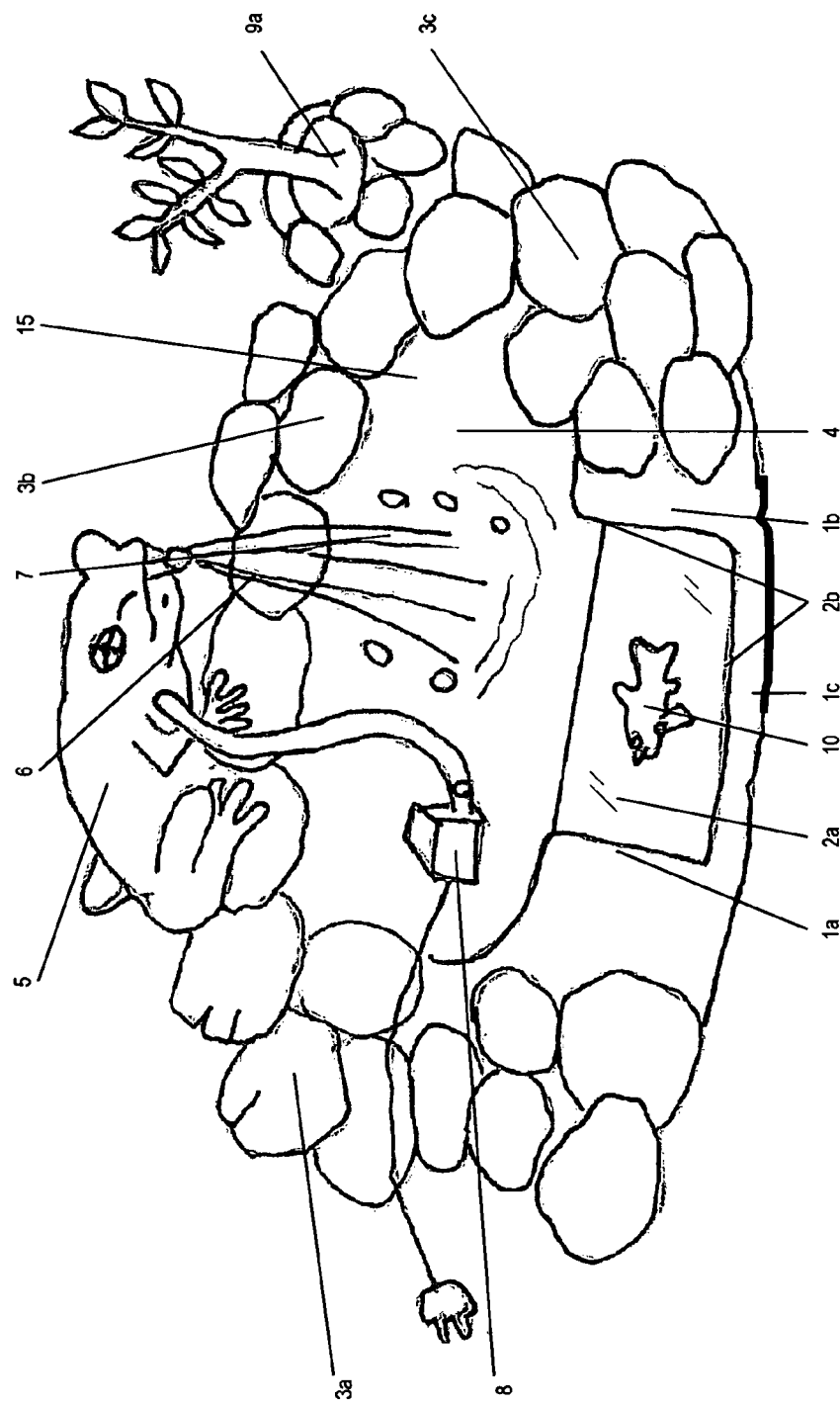
FIG. 46 shows the invention from the front; instead of an upper pool, a frog sculpture is seen located on the rear Miniature Mountain.
Figure 47:
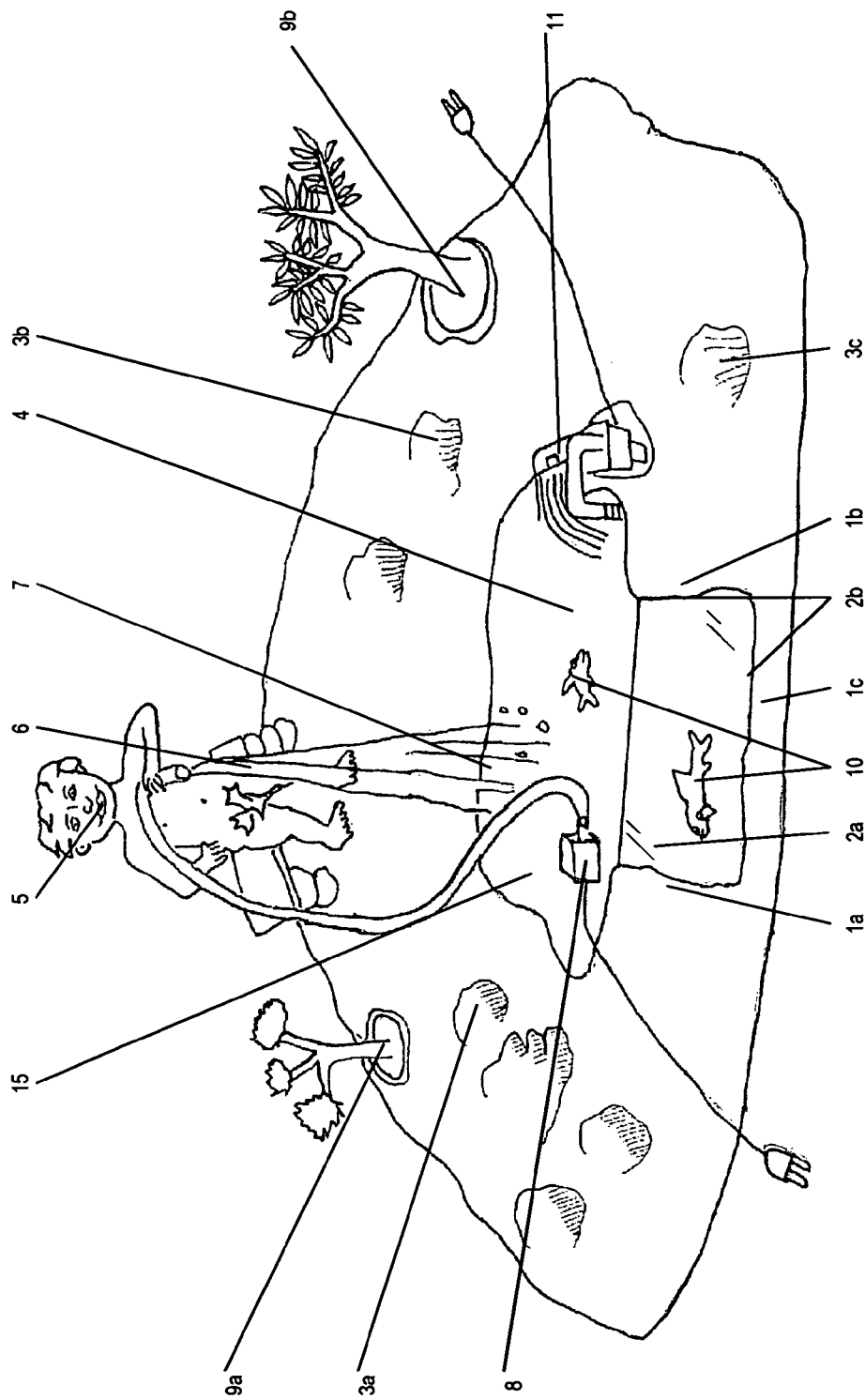
FIG. 47 shows the invention from the front; instead of an upper pool, a cherub sculpture is seen located on the rear Miniature Mountain.
Figure 48:
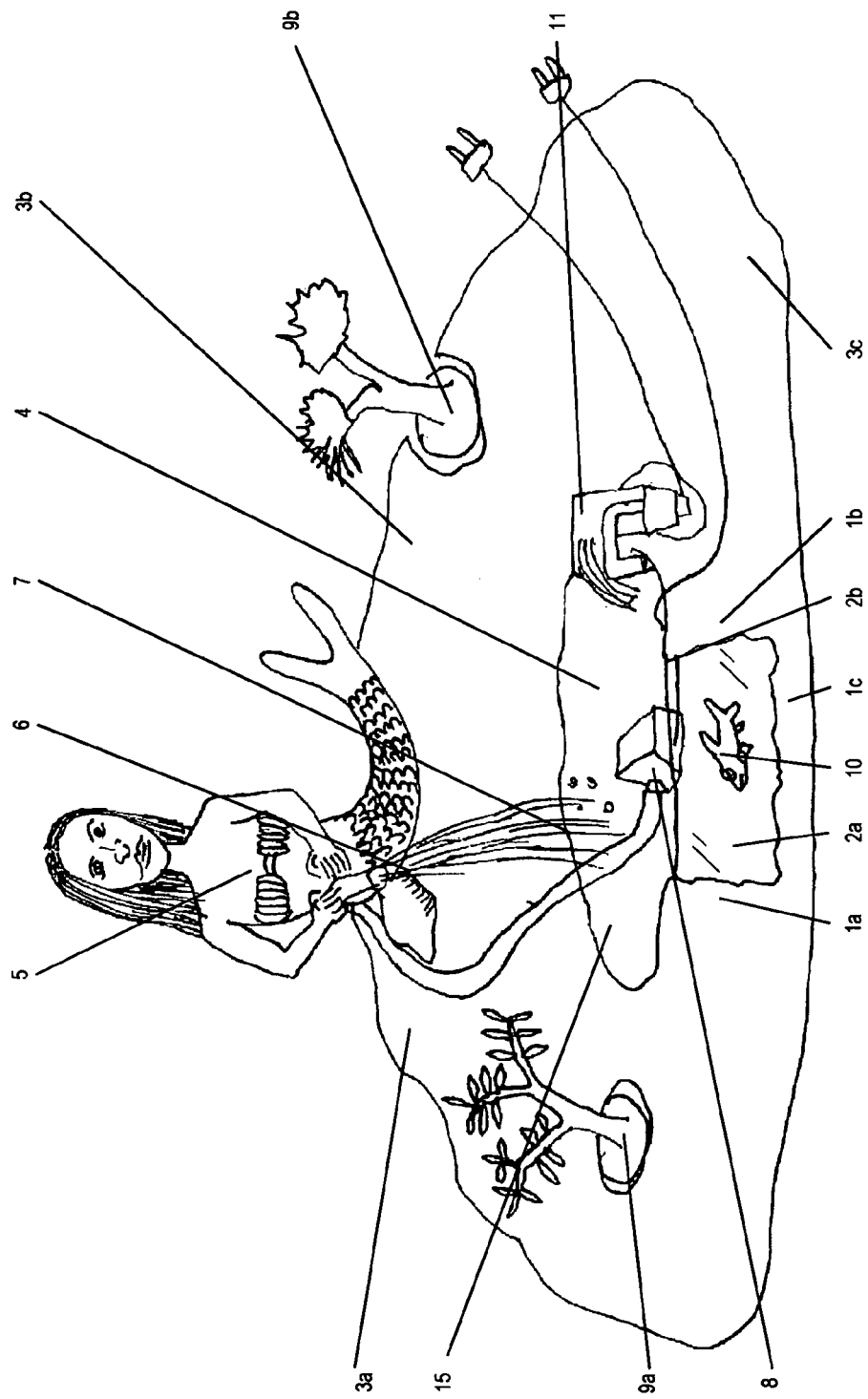
FIG. 48 shows the invention from the front; instead of an upper pool, a mermaid sculpture is seen located on the rear Miniature Mountain.
Figure 49:
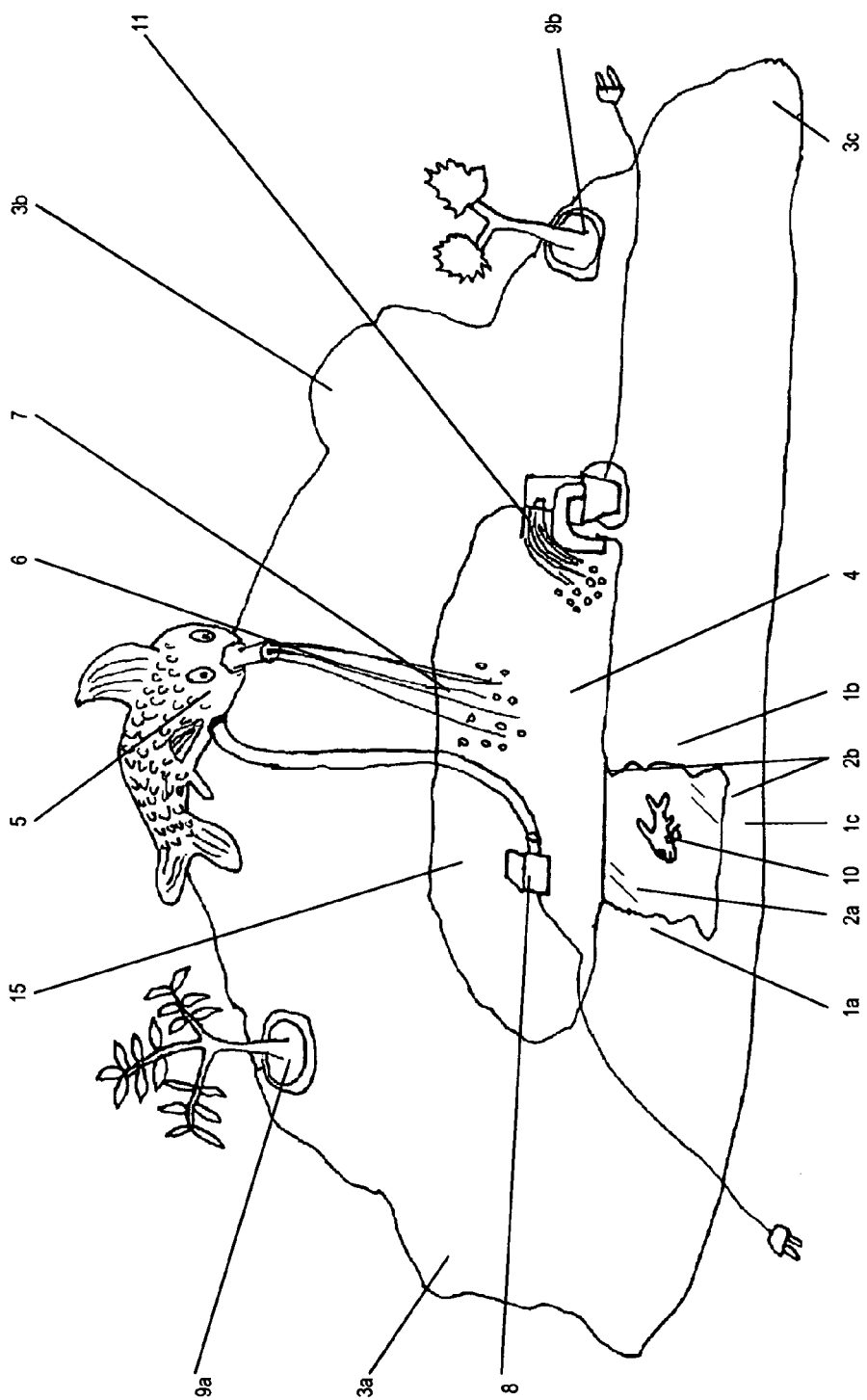
FIG. 49 shows the invention from the front; instead of an upper pool, a fish sculpture is seen located on the rear Miniature Mountain.
Figure 50:
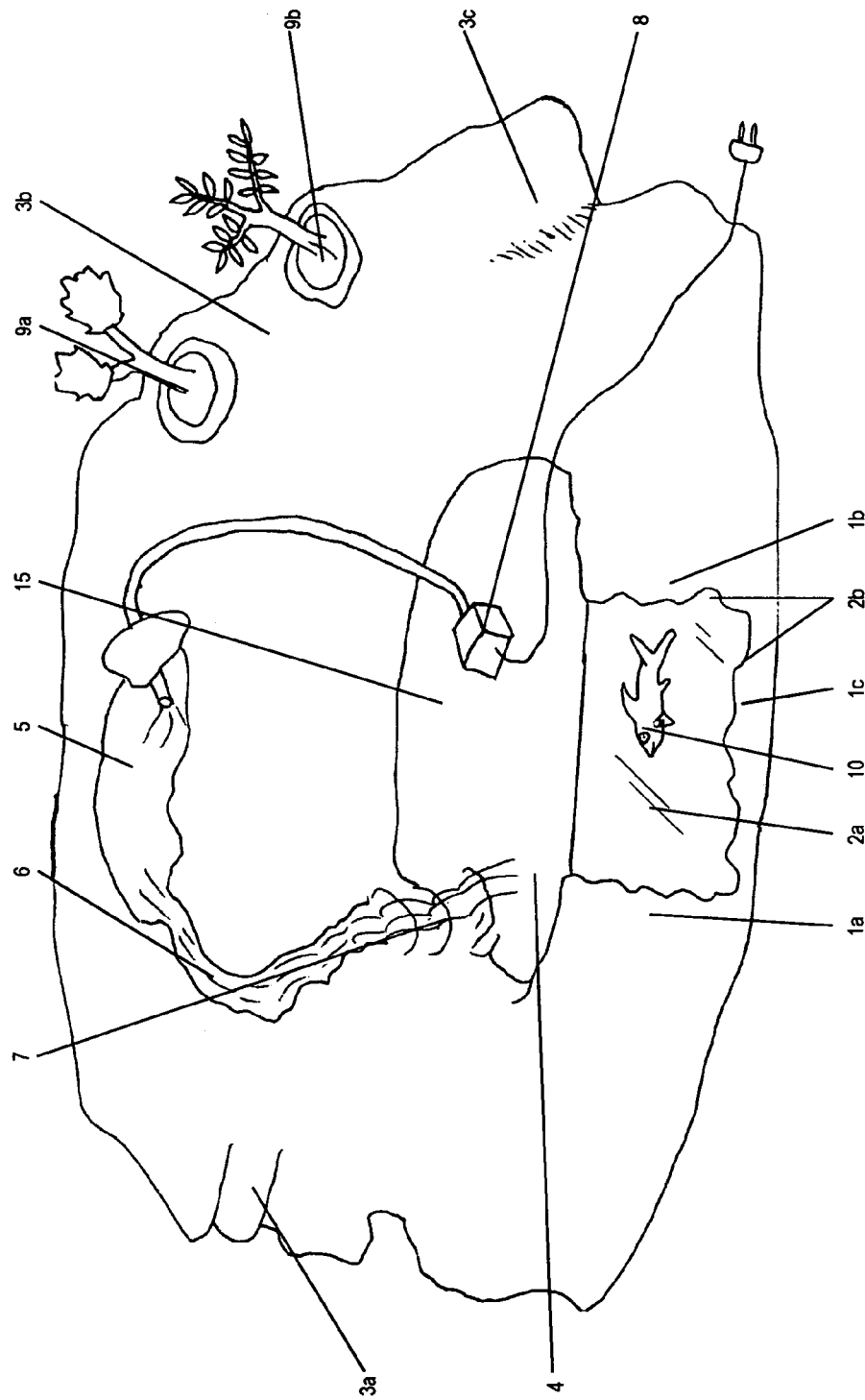
FIG. 50 shows the invention from the front; the upper pool is seen located on the rear Miniature Mountain.

I use ceramics clay (Cone 5 to Cone 10) to construct original models or prototypes of my device. Ceramics stoneware clay is an excellent medium in which to build "Microcosm Terrestrial and Aquatic Landscape Habitats." From these stoneware clay originals, Rubber Molds may be made to then reproduce the originals out of plastics, cast resin, polymer resins, polymers, polyester resins, polyethylene resin, fiber glass, cast stone and other media capable of producing imitation rock. Methods other than Mold Rubber and Rubber molds may be also used to mass produce the invention. I may use Press Molding and Vacuum Molding. Carved stone may be another medium for making a "Microcosm Terrestrial and Aquatic Landscape Habitat" complete with all its Elements. The "Microcosm Terrestrial and Aquatic Landscape Habitat" is a unique, functional, free standing pond and aquarium hybrid habitat for permanently keeping and breeding tropical fish and other aquatic life and terrestrial plants. It is free standing: stands on its own and does not need to be anchored to walls or floor. It does not go inside of a fish tank aquarium. Its bottom is flat and it stands on its own on any flat surface such as a desk, table, shelf, stand. Outdoor models (FIGS. 37, 38, 39) also possess a flat bottom and they may be placed on uneven ground. The "Microcosm Terrestrial and Aquatic Landscape Habitat" is so very unique. The "Miniature Mountains" 3a, 3b, 3c surround the Main Basin Pond 4 on three sides; instead of enclosing the whole Main Basin Pond 4 with artificial rock, I leave the front space where a fourth "Miniature Mountains" or Natural Looking imitation Rock or any other Imitation Rock Structures would logically go, open. After Kiln firing ceramics day prototypes, and after the Rubber Mold or Press Molding processes, here I attach a Pane of Glass 2a with Silicon Sealant 2b or other sealants 2c for underwater viewing of the Main Basin Pond 4 habitats and specimens like live Fish 10. Thus, I have a Pond, the Main Basin Pond 4, which may be viewed as a pond from above, with live Fish 10 swimming in the Main Basin Pond 4 and live vegetation planted into the "Miniature Mountains" 3a, 3b, 3c and then also, as with an aquarium, view the underwater habitats and live Fish 10 at eye level on the front side by virtue of the Pane of Glass 2a. This is entirely unique. When using "Microcosm Terrestrial and Aquatic Landscape Habitats" created with Mold Rubber and a Rubber Mold or by Press Molding and made out of materials other than clay such as plastics, polymer resins, fiberglass, polyethylene resin, polyester resins, cast stone, geopolymers, I adhere the Pane of Glass 2a to the front space, to the Frames 1a, 1b, 1c using Silicon Sealant 2b or other sealants 2c.

Figure 35:
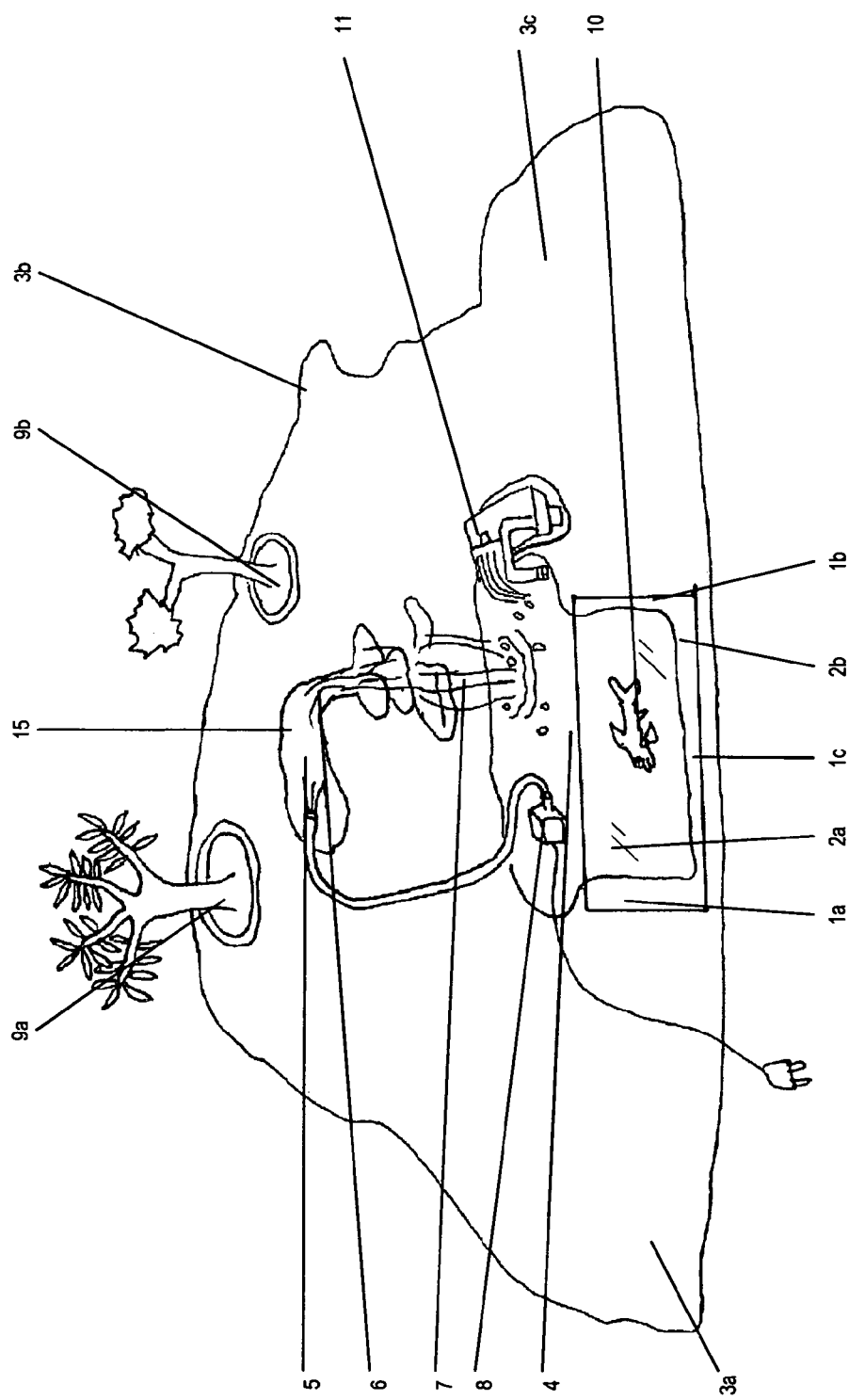
FIG. 35 shows the invention from the front; the upper pool is seen located on the rear Miniature Mountain.
Figure 36:
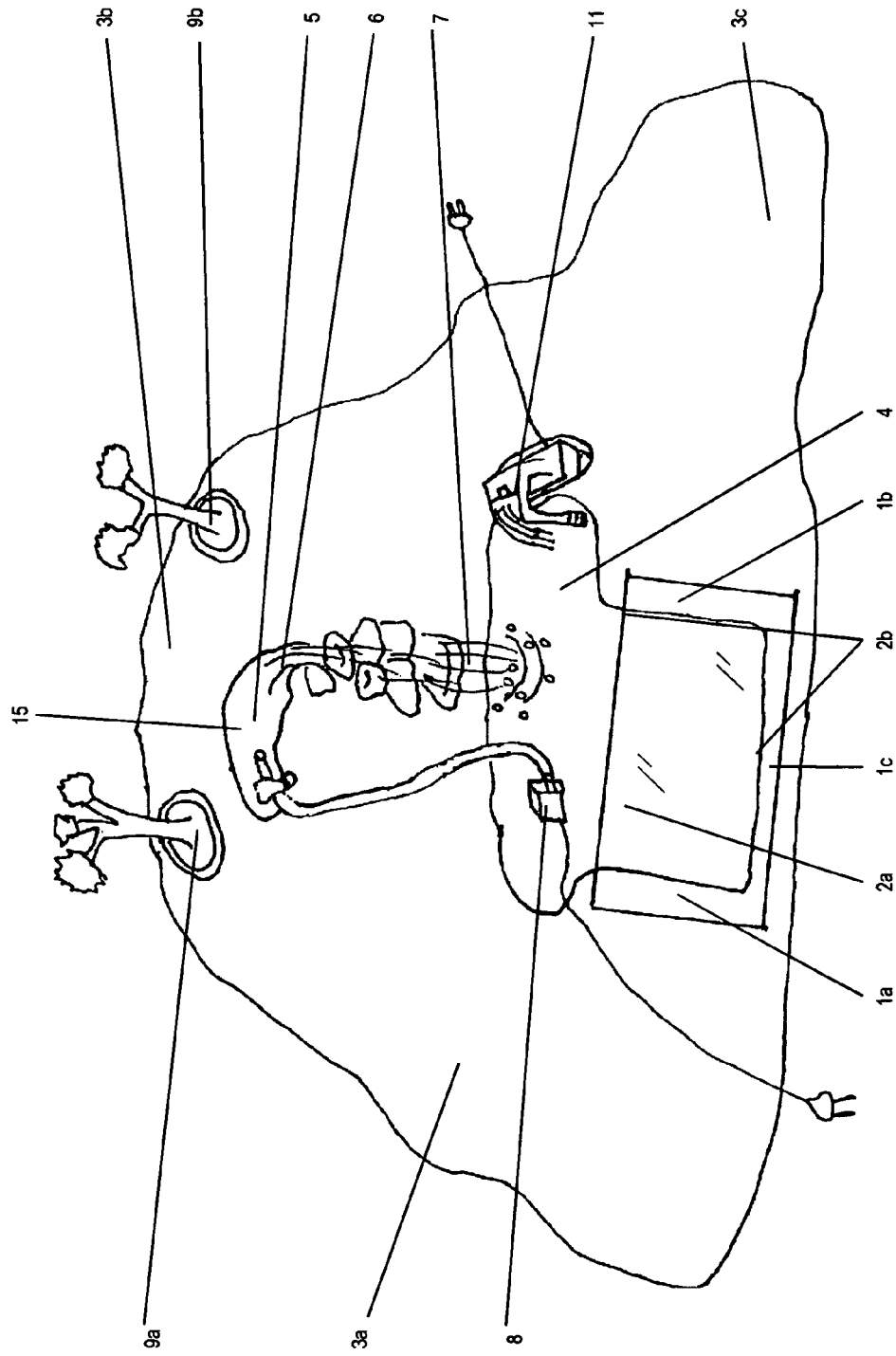
FIG. 36 shows the invention from the front; the upper pool is seen located on the rear Miniature Mountain.

My Main Basin Pond 4 is surrounded and shaped on three sides by "Miniature Mountains" 3a, 3b, 3c or Natural Looking Imitation Rocks 3a, 3b, 3c or hybrids thereof or by other Imitation Rock Structures 3a, 3b, 3c: Left Side "Miniature Mountain"/Natural Looking Imitation Rocks 3a, Rear Side "Miniature Mountain" 3b and Right Side "Miniature Mountain" 3c. The "Miniature Mountains" 3a, 3b, 3c are shaped into an approximately horseshoe shape, although it is slightly more circular on the Main Basin Pond 4 side than a regular horse shoe. Although the "Miniature Mountains" 3a, 3b, 3c are roughly horse shoe shaped, the Main Basin Pond 4 may take many shapes. The fourth, front side where a fourth "Miniature Mountain" or Natural Looking Imitation Rocks or any other Imitation Rock Structures are conspicuously absent (not formed into place), here I adhere a Pane of Glass 2a onto the imitation rock "Miniature Mountains" with Silicon Sealant 2b or other types of sealant 2c. I most often seal the Pane of Glass 2a onto the Frames 1a, 1b, 1c. Other times I seal the Pane of Glass 2a directly onto the imitation rock of the "Miniature Mountains." 3a and 3c (see FIGS. 35 and 36). One may look at the device from above, like a pond (Main Basin Pond 4) and observe Fish 10 swimming in the Main Basin Pond 4 with live terrestrial vegetation such as Bonsai Trees and other plants surrounding it in Pots (9a, 9b, 9 etc.) built into and onto the "Miniature Mountains" 3a, 3b, 3c, with Upper Pool 5, Water Course 6, Waterfalls 7 and one may then also look at the same live Fish 10 at eye level in their underwater habitats in the Main Basin Pond 4 through the Pane of Glass; 2a. This option to view live pond Fish 10 at eye level under the water level is unique in a waterfall pond and will sell very well in pet stores across the nation.

This device, the "Microcosm Terrestrial and Aquatic Landscape Habitat," is an improvement over existing artificial rock waterfalls. There are many imitation rock waterfalls on the market that make nice acoustic sounds from water falling from an upper pool down to a catch basin. Few to none of the desk top sized catch basins into which other peoples' waterfalls flow are large and deep enough for fish and other aquatic life, although some are. But in any case, the catch basin ponds (or pools) which the other peoples' Waterfalls go into are surrounded by artificial rock or other opaque materials on all sides. None of them (those for sale on the market) are formed of imitation rock (plastics, fiber glass, clays, polyester resins, polyethylene resin, cast stone and other imitation rock materials) AND a Pane of Glass 2a for eye level underwater viewing of fish and other aquatic life. My "Microcosm Terrestrial and Aquatic Landscape Habitat" is. The Water 15 goes in the Main Basin Pond 4 and through the Submersible, Electric, Aquatic, Fountain Pump 8 and up into the Upper Pool 5, down the optional Water Course 6, Waterfalls 7 and back into the Main Basin Pond 4. This circulation oxygenates the Water 15 in the Main Basin Pond 4 for the benef~of the live Fish 10 and other aquatic life kept in the Main Basin Pond 4.

The "Microcosm Terrestrial and Aquatic Landscape Habitat" is an artificial/imitation rock pond (Main Basin Pond 4) surrounded by artificial rock "Miniature Mountains" 3a, 3b, 3c or Natural Looking Imitation Rocks 3a, 3b, 3c on three sides and with a front side formed by a Pane of Glass 2a which allows for eye level underwater viewing of specimens like Fish 10 and other aquatic life forms such as mollusks, crustaceans, amphibians. The artificial/imitation rock material may be made of plastics, fiber glass, polyethylene resin, clays, polymer resins, polyester resins, cast stone, geopolymers and other imitation rock materials. I seek Patent on the device in any and every waterproof medium in which it can be produced. This is a totally unique device. The tropical fish industry is a multimillion dollar per year industry and I believe my invention will sell very well.

The Water 15 in the Main Basin Pond 4 is pumped up to the Upper Pool 5 by a Mechanical Submersible Electric Aquatic. Fountain Pump 8. Gravity does the rest to take the Water 15 down through the Water Course 6 and over the Waterfalls 7 back into the Main Basin Pond 4. Submersible, Electric Aquatic Fountain Pumps 8 may be purchased from most pet stores for around $20.00 to $100.00. These pumps require electricity to run. Their electric cords are grounded so that they may be safely submerged in Water 15. The cord must be plugged into a standard 110 Volt wall outlets, which is the type of outlet that is common in any American house. I favor "Laguna"® Brand Submersible Electric Aquatic Fountain Pumps 8. The tube on the Mechanical Submersible Electric Aquatic Fountain Pump 8 which brings water from the Main Basin Pond 4 up to the Upper Pool 5 may be camouflaged with Sphagnum Moss 13 spread over it or with tree bark, or creek stones or artificial stones, mulch or other materials; Sphagnum Moss is available at fine pet stores, animal feed stores and plant nurseries. Some varieties of Submersible, Electric, Aquatic, Fountain Pump 8 such as those made by Laguna®, Tetra®, Pond Master® act as filters of biological and chemical impurities; they utilize polyester and carbon filter pads to filter the Water 15. When such Pumps 8 is used, the Mechanical Box Filter 11 becomes unnecessary although still optional.

2. Description of the Related Art

The "Microcosm Terrestrial and Aquatic Landscape Habitat" is a unique, functional, free standing pond and aquarium hybrid habitat for keeping and breeding tropical and other Fish 10 and other aquatic life and terrestrial plants. It is free standing: stands on its own and does not need to be anchored to walls or floor. It does not go inside of a fish tank aquarium. It stands on its own. It is so very unique.

Davenport (1987) application Ser. No. 07/107,777, U.S. Pat. No. 4,788,938 invented, as he said in his ABSTRACT, "A floatable aquarium accessory formed to resemble a natural rocky shoreline setting. The invention provides a stable, *landscapable, and functional terrestrial surface within the aquarium into which it is inserted*." (Bold and italics mine) So, he invented an amphibious structure with waterfall that goes inside of an aquarium.

Figure 1:
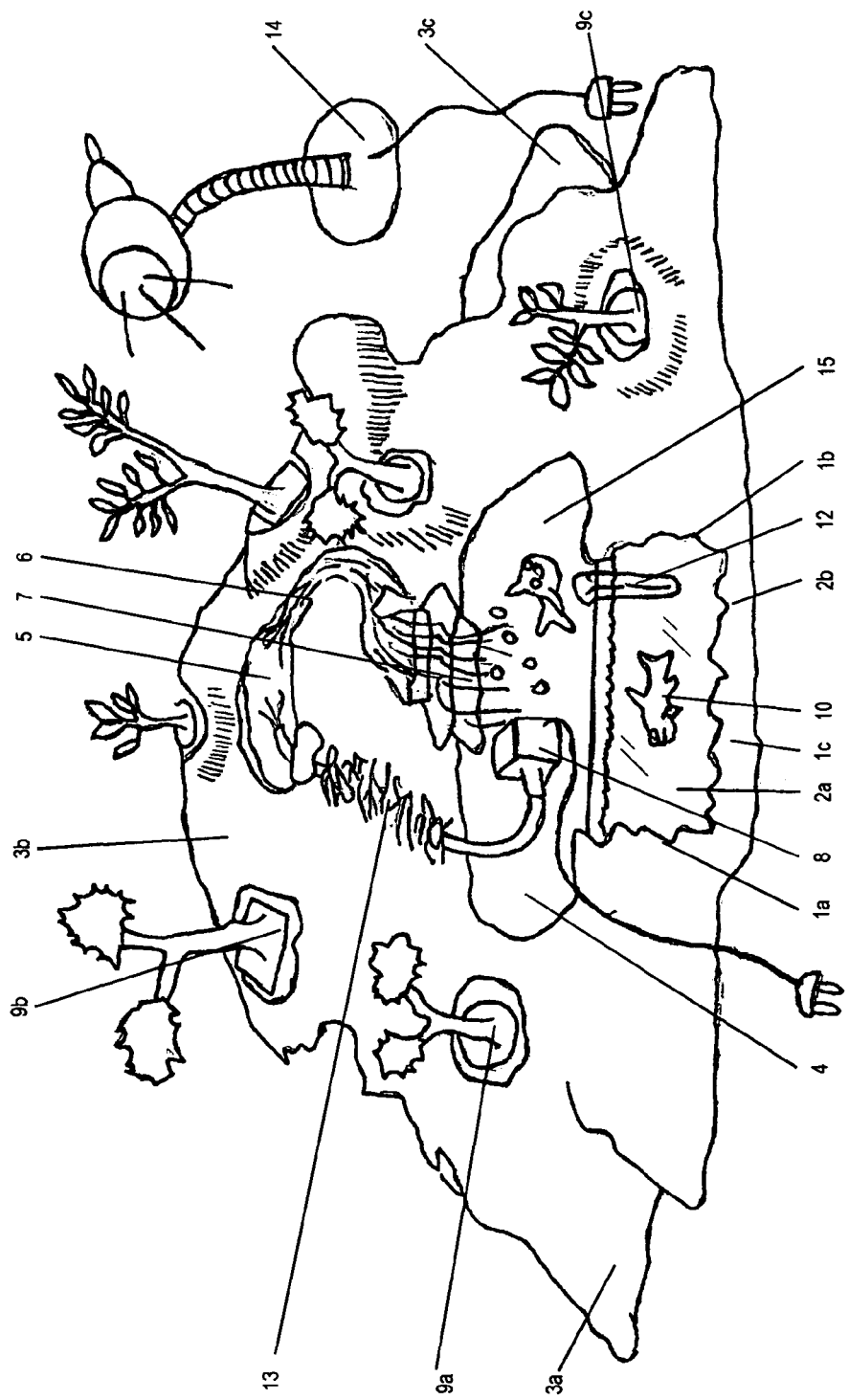
FIG. 1 shows the invention from the front; the upper pool is seen located on the rear Miniature Mountain.

Roland Horth (2003), application Ser. No. 10/094,892 U.S. Pat. No. 6,651,586 invented "A molded structure which may be placed *within a tank such as an aquarium* to provide separate land and water areas which are capable of providing realistic and healthy living environments for fish, amphibians and reptiles." Horth, ABSTRACT. Italics mine. Horth further goes on to say, "It would, therefore, be desirable to provide a structure which may be placed *within a tank*, and especially a relatively small tank, to allow a user to construct a viquarium." Horth, "BACKGROUND OF THE INVENTION." Italics mine. In this context Horth's "tank" refers to an aquarium. In his 2003 ABSTRACT, Horth says of his invention: [It is]"A molded structure which may be placed within a tank such as an aquarium to provide separate land and water areas which are capable of providing realistic and healthy living environments for fish, amphibians and reptiles. Preferably, the structure is molded such that it simulates realistic land and water environments." From Horth's "Detailed Description of the Preferred Embodiments":

"As illustrated in FIG. 1, a viquarium structure 10 is provided which is capable of providing a complex living environment and a complete ecosystem in a minimum of space. The structure is preferably molded from a water proof material such as polyester resin in a shape which simulates a realistic structure. The shape and size of the structure may vary as desired, however a preferred embodiment comprises a structure which is sufficiently small for placement within a ten gallon tank."

Figure 2:
FIG. 2 shows the invention from the front; the upper pool is seen located on the rear Miniature Mountain.

Also from Horth's "DETAILED DESCRIPTION OF THE PREFERRED EMBODIMENTS": "As illustrated in FIG. 2, the viquarium structure 10 is utilized within a tank 25 to form a complete ecosystem. First, the base of the tank is prepared by placing gravel or another suitable base material along the bottom of the tank. Next, the viquarium structure is placed on the base material within the tank. Water is then introduced into the tank with the result being that an underwater portion 30 of the viquanrum structure is submerged and a land portion 31 is above the water line."

In North's "SUMMARY OF THE INVENTION" he says: "The present invention features a molded structure which may be placed within a tank such as an aquarium to provide separate land and water areas which are capable of providing realistic and healthy living environments for fish, amphibians and reptiles."

Horth's invention has elements named similarly to mine, but his miniature mountains, upper pool, waterfall go inside a fish tank for support.

My "Miniature Mountains" 3a, 3b, 3c provide the structural support for the rest of my invention: the Upper Pool 5, Water Course 6, Waterfalls 7, the Water 15, the Main Basin Pond 4, the Pane of Glass 2a, the Frames 1a, 1b, 1c, the Pots 9a, 9b, 9 etc. for Bonsai Trees and other Terrestrial Plants, the Submersible, Electric, Aquatic Fountain Pump 8, the optional Mechanical Box Filter 11. Horth's invention relies upon a fish tank aquarium to support his device. My "Miniature Mountains" and Natural Looking Imitation Rocks do not go inside a fish tank aquarium nor rely on a fish tank aquarium in any way. My "Miniature Mountains" 3a, 3b, 3c or Natural Looking Imitation Rocks 3a, 3b, 3c support the whole device.

The "Miniature Mountains" 3a, 3b, 3c surround the Main Basin Pond 4 on three sides; instead of enclosing the whole Main Basin Pond 4 with artificial rock, instead I leave the front space where a fourth "Miniature Mountains" would logically go, open. After Kiln firing, and after the Rubber Mold or Press Molding processes, here I attach a Pane of Glass 2a with Silicon Sealant 2b or other sealants 2c for underwater viewing of the Main Basin Pond 4 habitats and specimens like live Fish 10. Thus I have a Pond, Main Basin Pond 4, with aquarium viewing option on its front side. This is entirely unique. When using "Microcosm Terrestrial and Aquatic Landscape Habitats" created with Mold Rubber and a Rubber Mold or by Press Molding and made out of materials other than clay such as plastics, polymer resins, fiberglass, polyethylene resin, polyester resins, cast stone, geopolymers, I also adhere the Pane of Glass 2a to the front space, to the Frames 1a, 1b, 1c using Silicon Sealant 2b or other sealants 2c.

I invented my new device while I was a student at the Clifford Furnace Ceramics School at the University at Buffalo. I have United States Post Office Certified letters mailed to myself and sealed with United States Postal Office date stamps containing drawings and specifications of the invention.

Figure 34:
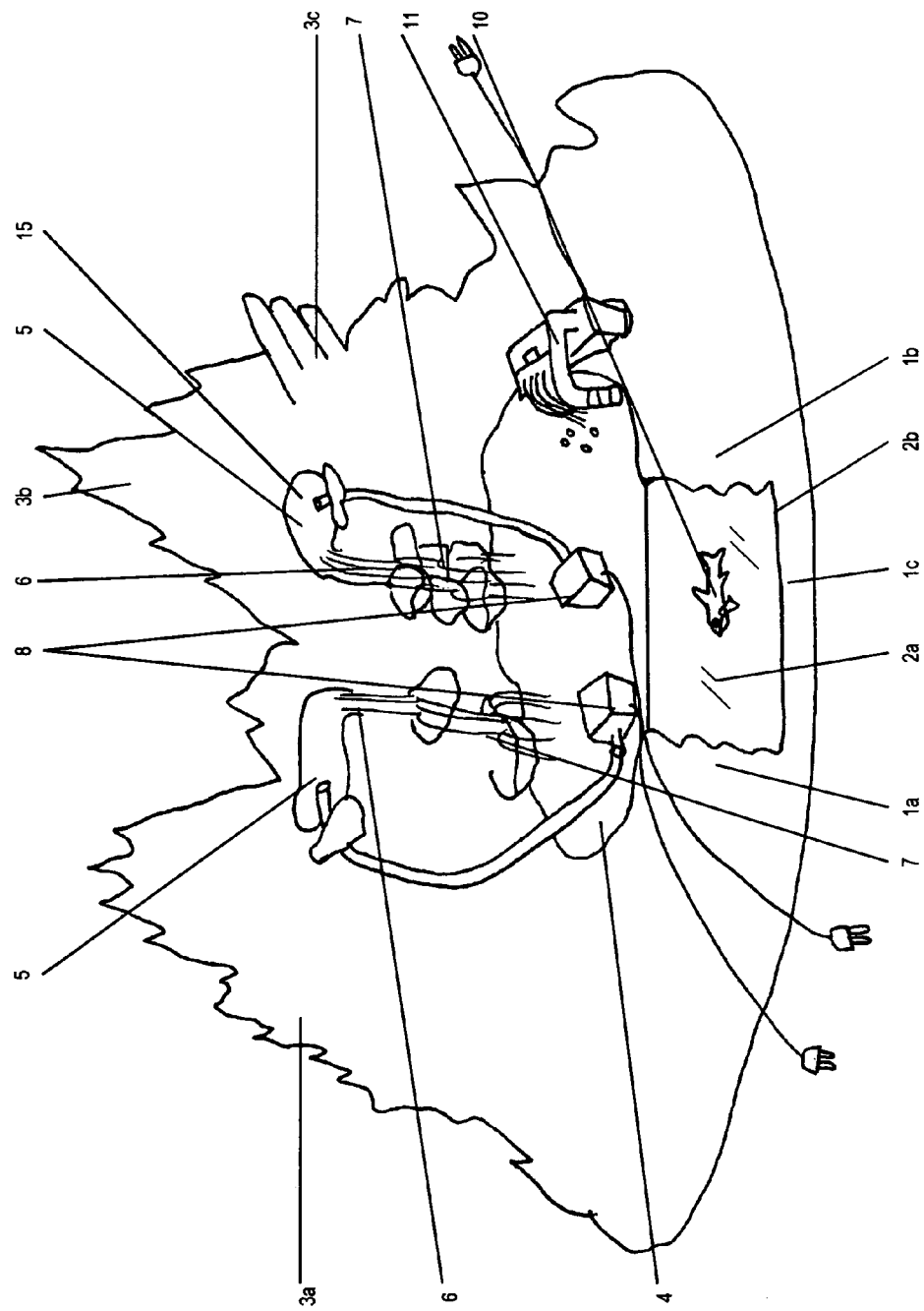
FIG. 34 shows the invention from the front; two upper pools are seen located on the rear Miniature Mountain.

Dissatisfied with traditional arrangements for keeping captive toads, I started making a basin, a ceramics clay pond to more naturalistically house my pets. Since the sculpture was to be kept indoors on a table or desk and not buried in the ground, I decided to make the exterior of the device sloping down and outward, away from the Main Basin Pond 4 to make the piece look like something out of nature. I did not want the sides of my pond to look like slanted walls nor sheer cliffs nor "phony mountains"; by "phony mountains" I mean mountain like structures which slope at too great a degree to be found in Nature with an upper pool for water on them. By "phony mountains" I mean all those imitation rock and waterfall pools on the market now. I may construct my "Miniature Mountains" to look like sheer sloping miniature mountains, but this is not my preferred embodiment. Nevertheless they are an option desired by some potential customers and I do make them; see FIGS. 34 and 35. The summits of my "Miniature Mountains", in my preferred embodiment, are not narrow ridges like most waterfall ponds on the market, although I may make them narrow like that and indeed some customers may like the narrow, sheer slope look. I wanted my "Miniature Mountains" 3a, 3b, 3c to slope down at naturalistically feasible degrees. I had the idea to make the structures which support and shape the Pond (Main Basin Pond 4) look like "Miniature Mountains" or Bonsai mountains around the Pond (Main Basin Pond Element 4). It is important to realize that I made the "Miniature Mountains" 3a, 3b, 3c with summits as wide or wider, as long or longer and higher than the Main Basin Pond 4 which they enclose. From their summits, the "Miniature Mountains" 3a, 3b, 3c slope away from the Main Basin Pond 4 and down at 35 degrees, 25 degrees, 15 degrees and 65 degrees, and 120 degrees and 45 degrees, and all degrees in between, more and less, depending on how I wish to shape a particular "Microcosm Terrestrial and Aquatic Landscape Habitat". I made the summits and slopes of the "Miniature Mountains" so that they would accommodate the Upl~er Pool 5 and Pots 9a, 9b, 9 etc. for Bonsai Trees and other Terrestrial Plants. I laid soft, wet clay over cardboard boxes which would then get burned to dust in bisque firing; I made the under frame of cardboard boxes so that I could slab onto it ¼" inch to 2" inch or more thick slabs of wet clay. I made the under frame of cardboard boxes approximately "horse shoe" or crescent shaped. The under-frame and resulting "Miniature Mountains" 3a, 3b, 3c are slightly more circular on the Main Basin Pond 4 side of the "Miniature Mountains" 3a, 3b, 3c than a regular horseshoe; although the "Miniature Mountains" are approximately horseshoe shaped, the Main Basin Pond 4 may take various shapes; refer to the FIGURE Drawings. The Main Basin Pond 4 is constructed inside the "horse shoe" of tiered boxes. I blend together "pancakes" of ceramics clay to form the Main Basin Pond 4. The floor of the Main Basin Pond 4 blends and melds together with the "walls" or slopes of the Main Basin Pond 4 on three sides; these "walls" or slopes then arise from the Main Basin Pond 4 Floor to meld with the surrounding "Miniature Mountains" 3a, 3b, 3c. The "walls" or slopes of the Main Basin Pond 4 meld together with the surrounding clay of the "Miniature Mountains" 3a, 3b, 3c which are formed over the tiered cardboard boxes. The "Miniature Mountains" surround the Main Basin Pond 4 on three sides. The "Miniature Mountains" 3a, 3b, 3c slope down from their summits, away from the Main Basin Pond 4. The Upper Pool 5 is constructed built into and/or onto one of the side "Miniature Mountains" 3a or 3c or into and/or onto the rear "Miniature Mountain" 3b. From the Upper Pool 5 follows a Water Course 6 which is a rivulet depression sometimes surrounded by imitation rocks to channel the water in the Water Course 6 into the Waterfalls 7. The Water Course 6 is a rivulet depression into the surface of the "Miniature Mountain" on which the Upper Pool 5 is constructed, or it may be not a rivulet but only formed by imitation rocks. The Water Course 6 may also be formed on more than one "Miniature Mountain." After the Water Course 6 is the Waterfalls 7, which is made of intricately formed imitation rocks that take the Water 15 in a finished "Microcosm Terrestrial and Aquatic Landscape Habitat" back into the Main Basin Pond 4. The Water 15 in the Main Basin Pond 4 is pumped up to the Upper Pool 5 by a Mechanical Submersible Electric Aquatic Fountain Pump 8. Gravity does the rest to take the Water 15 down through the Water Course 6 and over the Waterfalls 7 and back into the Main Basin Pond 4. The imitation rock Waterfalls 7 splashes and flows into the Main Basin Pond 4. The Waterfalls 7 oxygenate the Water 15 in the Main Basin Pond 4 for the benefit of the Fish 10 and other aquatic life contained therein. The Waterfalls 7 is acoustically pleasing. The Waterfalls 7 is also something which many people find intriguing to watch. Submersible, Electric Aquatic Fountain Pumps 8 may be purchased from most pet stores for around $20.00 to $100.00. These pumps require electricity to run. Their electric cords are grounded so that they may be safely submerged in Water 15. The cord must be plugged into a standard 110 Volt wall outlets, which is the type of outlet that is common in any American house. I use "Laguna"® Brand Submersible Electric Aquatic Fountain Pumps 8. The tube on the Mechanical Submersible Electric Aquatic Fountain Pump 8 which brings Water 15 from the Main Basin Pond 4 up to the Upper Pool 5 may be camouflaged with Sphagnum Moss 13 spread over it or with tree bark, or creek stones or artificial stones, mulch or other materials; Sphagnum Moss is available at fine pet stores, animal feed stores and plant nurseries. Some varieties of Submersible, Electric, Aquatic, Fountain Pump 8 such as those made by Laguna®, Tetra®, Pond Master® act as filters of biological and chemical impurities; they utilize polyester and carbon filter pads to filter the Water 15. When such Pumps 8 are used, the Mechanical Box Filter 11 becomes unnecessary although still optional. Pots 9a, 9b, 9c, 9d, 9 etc. are built into and/or onto the "Miniature Mountains" 3a, 3b, 3c for Bonsai Trees and other terrestrial plants. In the front, the Frames 1a, 1b are formed melded into the Left Side "Miniature Mountain" 3a and Right Side "Miniature Mountain" 3c, from the Main Basin Pond 4 Floor up towards the summits of the "Miniature Mountains" 3a and 3c. In line with these Frames 1a and 1b is the Frame 1c which is formed melded into the Main Basin Pond 4 Floor between Frame 1 a and Frame 1c. The Pane of Glass 2a is adhered with Silicon Sealant 2b or other sealants 2c to these Frames 1a, 1b, 1c. The "Miniature Mountains" 3a, 3b, 3c surround the Main Basin Pond 4 on three sides. They are built in the prototype phase of development out of clay ¼" to 2" or more thick over tiered cardboard boxes shaped into an approximate "horse shoe" which get incinerated to ash when the "Microcosm Terrestrial and Aquatic Landscape Habitat" is kiln fired. The first tier of boxes, closest to the Main Basin Pond 4 was, in my first prototype, shaped into a horse shoe or crescent shape that was two to three shoe boxes or/and cardboard milk cartons, and/or other types of boxes, high; the second, more outer tier of boxes was one to two boxes high; the third outer tier of horseshoe shaped boxes was one box high; and the outer most tier was created out of densely crumpled news paper. The edges of each tier of cartons or other boxes was softened and contoured with taped on crumpled newspaper. Thus, the clay which I formed over the cardboard boxes made three connected, naturalistically curving "Miniature Mountains" 3a, 3b, 3c. I contoured the clay so that the clay surface imitated natural rock; I pressed creek stones against the still moist day to give the surface an imitation creek rock texture.

I made Pots 9a through 9k, 9 etc. built into the structure of "Miniature Mountains" 3a, 3b, 3c or Natural Looking Imitation Rocks 3a, 3b, 3c which later house Bonsai trees and other terrestrial plants.

The Bonsai trees and other plants stay in the Pots I buy them in or put them in and these go into the Pots 9a, 9b, 9 etc. which I build into and onto the "Miniature Mountains" 3a, 3b, 3c. Thus, if I over water the Bonsai Trees or other plants I need only remove the tree in its pot and take a towel or rag to soak up the extra moisture that hits the Pot (9a, 9b, 9 etc.) built into the "Miniature Mountains" 3a, 3b, 3c. Sometimes I camouflage the pot with creek stones or artificial "rocks."

The soft, wet day of the Pots 9a, 9b, 9c, 9d, 9 etc. melds and bonds to the soft, wet clay of the entire piece and then bisque fires in a kiln to become solid, connected and rock hard. The cardboard boxes which support the wet clay get burned away when the dry clay is kiln fired.

On the top or sides of the Rear or Side Natural Looking Imitation Rocks or "Miniature Mountains" 3a, 3b, 3c which frame the Main Basin Pond 4, I construct an Upper Pool 5 for Water 15. After kiln firing, and after making copies of the clay prototypes with Rubber Molds or Press Molds or other molds using materials such as plastics, fiber glass, polyester resins, polyethylene resins, other polymers and other materials, the Upper Pool 5 is one with the "Miniature Mountain" on top of which it is constructed. In my preferred embodiment the Upper Pool 5 is located on the summit of the Rear "Miniature Mountain" or Rear Natural Looking Imitation Rocks (both designated by 3b). Or the Upper Pool/s 5 is/are located on one or more of the Side "Miniature Mountains" 3a, 3c, on their summit or sides, or also on the Rear "Miniature Mountain" 3b. The Upper Pool 5 may be complemented by natural rocks or imitation rocks made of such materials such as plastics, polymers, fiber glass, clays, polyester resin, and polyethylene resin and sometimes by a well blended-in pot for a Bonsai Tree or it may be unadorned.

From this Upper Pool 5 follows an optional Water Course 6 which is a rivulet depressed into the imitation rock, clay surface of the Rear or Side "Miniature Mountains" 3b, 3a, 3c, respectively. This Water Course 6 is lined with pieces of materials such as plastics, fiber glass, clays, polymer resins, polyester resins, polyethylene resin, cast stone shaped as "rocks" and these simulated "rocks", although they appear to be stacked and spread out randomly, as with a real stream, function to contain (channel) the stream of water which issues forth from the Upper Pool 5 through the Water Course 6 to the Waterfalls 7 (see FIGS. 4, 5, 6, 7, 8, 13, 15, 16, 19, 44).

The Water Course 6 may twist and curve or run straight; it finishes at the Waterfalls 7 which is made of pieces of materials such as plastics, fiber glass, clays, polyester resins, polyethylene resin or polymer resins or other materials designed to look like rocks, which are arranged to give the Waterfalls 7 a splashing effect. The rocks of the Waterfall 7 are often quite intricate and are attached to Rear "Miniature Mountain" 3b alone or they are attached to the Rear "Miniature Mountains" and to one or both of the Side "Miniature Mountains" 3c or 3a. Since either Side "Miniature Mountain" 3a, 3c may support its own Upper Pool 5, either side "Miniature Mountain" may support an ensuing Water Course 6 and Waterfalls 7. In any of these configurations the Waterfall 7 pours directly back into the Main Basin Pond 4, thereby oxygenating the Water 15. The Waterfalls 7 is a beautiful cascade of water over imitation rocks into the Main Basin Pond 4. The Waterfalls 7 are built of intricately arranged imitation rocks and with water running through them, they are acoustically pleasing. Besides oxygenating the Water 15 for the benefit of the live Fish 10 and other creatures kept in the Main Basin Pond 4, watching the water flow down the Waterfalls 7 is intriguing for many people.

In particular examples of my "Microcosm Terrestrial and Aquatic Landscape Habitat" I have positioned a Pot 9a next to the Water Course 6 to keep water in the Water Course 6 from splashing out of the unit (see FIG. 1). Another Pot 9b has been positioned next to the Waterfalls 7 to keep water in the Waterfalls 7 from splashing out of the unit (see FIG. 1). These Pots 9a, 9b, 9 etc. are not always necessary.

I built the device this far, then Eureka really struck me. I realized that I would only be able to look at my toads from above if I enclosed all sides of the Main Basin Pond 4 with sloping walls or "Miniature Mountains" or Natural Looking Imitation Rocks. Why not leave the front side of the Main Basin Pond 4 open—no fourth, front imitation rock slope/ "Miniature Mountain" nor artificial rock wall like so many other waterfalls on the market. I could then adhere a Pane of Glass 2a there with Silicon Sealant 2b or other types of Sealant 2c alter bisque and glaze firing in a kiln and thus hybridize pond AND aquariumM!

With the "Miniature Mountains" 3a, 3b, 3c gently rolling back, forest of vegetation (Pots 9a through 9k, 9 etc.) surrounding the Main Basin Pond 4 on the "Miniature Mountains," Upper Pool 5, Water Course 6, Waterfalls 7, Water 15 and Main Basin Pond 4 composed of Imitation rock "Miniature Mountains" 3a, 3b, 3c and Pane of Glass 2a I decided this device would be perfect not only for toads, but especially for tropical fish. This is totally novel and unique! I believe that my invention, the "Microcosm Terrestrial and Aquatic Landscape Habitat" will sell extremely well in pet stores!!! Using Mold Rubber and Rubber Molds and by Press Molding, I create "Microcosm Terrestrial and Aquatic Landscape Habitats" out of plastics, fiber glass, clays, polyester resins, polyethylene resin and other imitation rock materials. Mold Rubber and Rubber Molds were discussed previously in this BACKGROUND OF THE INVENTION and are also discussed more thoroughly in the DETAILED DESCRIPTION OF THE INVENTION further down. There are other means for mass producing "Microcosm Terrestrial and Aquatic Landscape Habitats" out of imitation rock materials besides Mold Rubber and Rubber Molds such as Press Molding. Vacuum Molding is an option. Carved stone may be another medium for making a "Microcosm Terrestrial and Aquatic Landscape Habitat" replete with all its elements.

I decided when creating subsequent models of this invention that Natural Looking imitation Rocks 3a, 3b, 3c, hybrids of Natural Looking Imitation Rocks and "Miniature Mountains" 3a, 3b, 3c and various other structural designs could satisfactorily take the place of "Miniature Mountains" for the 3a, 3b, 3c structures. See FIGS. 3, 4, and most of the other FIGURES show "Miniature Mountains" 3a, 3b, 3c with, natural looking imitation rocks melded in. Bonsai trees are favorable, I say, but they are optional. The "Microcosm Terrestrial and Aquatic Landscape Habitat" would yet be a "Microcosm Terrestrial and Aquatic Landscape Habitat" without terrestrial plants. The Upper Pool 5 is also optional. As an alternative to the Upper Pool 5, or inside the Upper Pool 5, I can position a decorative statuary fountain piece such as a frog, mermaid, fish, cherub or etc. where the Upper Pool 5 goes. In this situation, the tube from the Submersible, Electric, Aquatic Fountain Pump 8 goes inside the statues' mouth or hands and Water 15 spurts down into the Main Basin Pond 4 this way. See FIGS. 44, 45, 46, 47, 48.

I love viewing my Fish 10, amphibians, crustaceans and mollusks in the "Microcosm Terrestrial and Aquatic Landscape Habitat." It is a joy to watch them from above, as with a traditional pond (Main Basin Pond 4) with "Miniature Mountains" 3a, 3b, 3c, an Upper Pool 5, Water Course 6, Waterfalls 7, Water 15, plants 9a, 9b, 9c, 9d, 9 etc. surrounding the Main Basin Pond 4, AND then get to go down below the water level and look at the same fish and other aquatic life at eye level through the Pane of Glass 2a in their underwater habitats. With forest of Bonsai Trees planted in place on the naturalistically sloping "Miniature Mountains", the "Microcosm Terrestrial and Aquatic Landscape Habitat" is ever so nice to ponder. In some units of my device the Bonsai Trees make a real forest around the Main Basin Pond 4.

"The Microcosm Terrestrial and Aquatic Landscape Habitat" is a unique, functional,~free standing pond and aquarium hybrid habitat for keeping and breeding tropical fish and other aquatic life and terrestrial plants. It is free standing: stands on its own and does not need to be anchored to walls or floor. It does not go inside of a fish tank aquarium. It stands on its own. When using plastics, polymer resins, cast resins, polyester resins, cast stone, clays, fiber glass and glass, I may make the "Microcosm Terrestrial and Aquatic Landscape Habitat" for outdoor use. See FIGS. 37, 38 and 39.

Davenport (1987) application Ser. No. 07/107,777, U.S. Pat. No. 4,788,938 invented, as he said in his ABSTRACT, "A floatable aquarium accessory formed to resemble a natural rocky shoreline setting. The invention provides a stable, landscapable, and functional terrestrial surface within the aquarium into which it is inserted." (Italics and bold pdnt mine) So, he invented an amphibious structure with waterfalls that goes inside of an aquarium.

Roland Horth (2003), application Ser. No. 10/094,892 U.S. Pat. No. 6,651,586 invented "A molded structure which may be placed within a tank such as an aquarium to provide separate land and water areas which are capable of providing realistic and healthy living environments for fish, amphibians and reptiles." Horth ABSTRACT.

Horth further goes on the say, "it would, therefore, be desirable to provide a structure which may be placed within a tank, and especially a relatively small tank, to allow a user to construct a viquarium." Horth, BACKGROUND OF THE INVENTION. Italics mine. By saying "tank" Horth means an aquarium. From his ABSTRACT 2003, Horth says of his invention: [It is]"A molded structure which may be placed within a tank such as an aquarium to provide separate land and water areas which are capable of providing realistic and healthy living environments for fish, amphibians and reptiles. Preferably, the structure is molded such that it simulates realistic land and water environments."

Also from Horth's "DETAILED DESCRIPTION OF THE PREFERRED EMBODIMENTS": As illustrated in FIG. 2, the viquadum structure 10 is utilized within a tank 25 to form a complete ecosystem. First, the base of the tank is prepared by placing gravel or another suitable base material along the bottom of the tank. Next, the viquarium structure is placed on the base material within the tank. Water is then introduced into the tank with the result being that an underwater portion 30 of the viquarium structure is submerged and a land portion 31 is above the water line.

My "Microcosm Terrestrial and Aquatic Landscape Habitat" is very different from Davenport and Horth's inventions and my "Microcosm Terrestrial and Aquatic Landscape Habitat" deserves its own patent. The "Microcosm Terrestrial and Aquatic Landscape Habitat" is very different from all other inventions of which I was made aware in the "Office Action Summary" from the United States Patent and Trademark Office. The "Microcosm Terrestrial and Aquatic Landscape Habitat" is significantly different from all other inventions which I have found in stores or on the internet. The "Microcosm Terrestrial and Aquatic Landscape Habitat" is significantly different from all other inventions.

I claim:

1. A freestanding pond device for live fish and other aquatic life consisting of an open top and a four sided main basin pond surrounded, shaped and supported on three of said sides by miniature mountains, imitation rocks, or any combination thereof; the miniature mountains and/or imitation rocks comprising a rear wall and two opposing side walls; a fourth side of said sides comprising a pane of glass; said pane of glass being adhered to the miniature mountains and/or imitation rocks; an upper pool located on top of said rear wall or opposing side walls, water from said upper pool flowing into a water course and then from said water course into waterfalls that deliver the water into said main basin pond to circulate and oxygenate the water of said main basin pond for the benefit of the live fish and other aquatic life contained therein; a submersible pump located in said main basin pond and circulating water from said main basin pond up to said upper pool, the water flowing down said water course and over the waterfalls back into said main basin pond via gravity.

* * * * *